US010764889B2

(12) United States Patent
Mochizuki et al.

(10) Patent No.: US 10,764,889 B2
(45) Date of Patent: Sep. 1, 2020

(54) COMMUNICATION SYSTEM

(71) Applicant: Mitsubishi Electric Corporation, Chiyoda-ku (JP)

(72) Inventors: Mitsuru Mochizuki, Tokyo (JP); Noriyuki Fukui, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 50 days.

(21) Appl. No.: 16/069,285

(22) PCT Filed: Jan. 27, 2017

(86) PCT No.: PCT/JP2017/002868
§ 371 (c)(1),
(2) Date: Jul. 11, 2018

(87) PCT Pub. No.: WO2017/135159
PCT Pub. Date: Aug. 10, 2017

(65) Prior Publication Data
US 2019/0021085 A1   Jan. 17, 2019

(30) Foreign Application Priority Data

Feb. 3, 2016 (JP) ................................. 2016-019016

(51) Int. Cl.
*H04W 72/04* (2009.01)
*H04L 12/26* (2006.01)
(Continued)

(52) U.S. Cl.
CPC ......... *H04W 72/0446* (2013.01); *H04L 43/16* (2013.01); *H04W 16/32* (2013.01);
(Continued)

(58) Field of Classification Search
CPC . H04W 72/0446; H04W 72/04; H04W 72/02; H04W 52/02; H04W 76/27;
(Continued)

(56) References Cited

U.S. PATENT DOCUMENTS

2015/0223212 A1* 8/2015 Der Velde ............. H04L 5/0032
370/329
2017/0202025 A1* 7/2017 Ouchi .................... H04W 76/28

FOREIGN PATENT DOCUMENTS

EP          3 154 295 A1     4/2017
WO    WO 2015/115860 A1     8/2015
WO    WO 2015/186824 A1    12/2015

OTHER PUBLICATIONS

ITRI, "BSR Trigger for Uplink Split Bearer", 3GPP TSG-RAN WG2 Meeting#90, May 25-29, 2015, Fukuoka, Japan, R2-152359 (Year: 2015).*

(Continued)

Primary Examiner — Shailendra Kumar
(74) Attorney, Agent, or Firm — Oblon, McClelland, Maier & Neustadt, L.L.P.

(57) ABSTRACT

A communication system capable of a stable communication operation between a base station device and a communication terminal device. A UE is configured to communicate with an MeNB directly or through a SeNB. The UE is set to transmit, to the MeNB and the SeNB, transmission data addressed to the MeNB when an amount of the transmission data exceeds a predetermined threshold. The UE is set to transmit the transmission data not to the SeNB but to the MeNB when the amount is smaller than or equal to the threshold. The threshold is changed so that the transmission data is transmitted to the MeNB and the SeNB, when the SeNB is set to communicate with the UE with radio (Continued)

resources periodically allocated and the amount of the transmission data is smaller than or equal to the threshold.

8 Claims, 32 Drawing Sheets

(51) Int. Cl.
*H04W 76/27* (2018.01)
*H04W 16/32* (2009.01)
*H04W 48/16* (2009.01)
*H04W 52/02* (2009.01)
*H04W 72/02* (2009.01)

(52) U.S. Cl.
CPC .......... *H04W 48/16* (2013.01); *H04W 52/02* (2013.01); *H04W 52/0203* (2013.01); *H04W 72/02* (2013.01); *H04W 72/04* (2013.01); *H04W 76/27* (2018.02); *Y02D 70/00* (2018.01); *Y02D 70/24* (2018.01)

(58) Field of Classification Search
CPC . H04W 48/16; H04W 52/0203; H04W 16/32; H04L 43/16; Y02D 70/00; Y02D 70/24
See application file for complete search history.

(56) References Cited

OTHER PUBLICATIONS

Alcatel-Lucent et al., "SPS in split mode", 3GPP TSG-RAN WG2 Meeting #85bis, Valencia, Spain, Mar. 31-Apr. 4, 2014, R2-141504 (Year: 2014).*
Extended European Search Report dated Sep. 20, 2019, in Patent Application No. 17747316.2, 8 pages.
International Search Report dated Apr. 4, 2017 in PCT/JP2017/002868 filed Jan. 27, 2017.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.0.0, Jun. 2015, pp. 1-254 Pages.
"LS on HNB/HeNB Open Access Mode," 3GPP TSG-SA1 #42 S1-083461, Oct. 2008, 2 Pages.
"3rd Generation Partnership Project; Technical Specification Group Radio Access Network; Evolved Universal Terrestrial Radio Access (E-UTRA); Further advancements for E-UTRA physical layer aspects (Release 9)," 3GPP TR 36.814 V9.0.0, Mar. 2010, pp. 1-104.
"3rd Generation Partnership Project; Technical Specification Group Radio Access Network; Feasibility study for Further Advancements for E-UTRA (LTE-Advanced) (Release 10)," 3GPP TR 36.912 V10.0.0, Mar. 2011, 252 Pages.
"Scenarios, requirements and KPIs for 5G mobile and wireless system," Seventh Framework Programme, ICT-317669-METIS/D1.1, [URL: https://www.metis2020.com/documents/deliverables/], Apr. 29, 2013, 83 Pages.
"LS on monitoring PDCCH with SPS C-RNTI in DC," 3GPP TSG-RAN WG2 Meeting #87Bis R2-144662, Oct. 2014, 1 Page.
ITRI, "BSR Trigger for Uplink Split Bearer," 3GPP TSG-RAN WG2 Meeting#90 Tdoc R2-152359, May 2015, pp. 1-2.
"3rd Generation Partnership Project; Technical Specification Group Radio Access Network; Evolved Universal Terrestrial Radio Access (E-UTRA); Base Station (BS) conformance testing (Release 13)," 3GPP TS 36.141 V13.0.0, Jul. 2015, pp. 1-266.
"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.8.0, Dec. 2015, pp. 1-77.
BlackBerry UK Limited, "Application of Retrievable Configuration to Facilitate Enhanced State Transition," 3GPP TSG-RAN WG2 Meeting #92 R2-156668, Nov. 2015, pp. 1-3.

* cited by examiner

F I G . 1
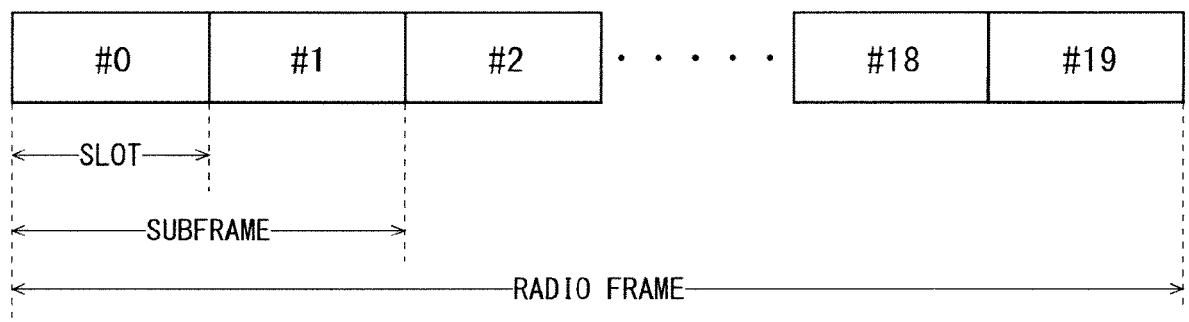

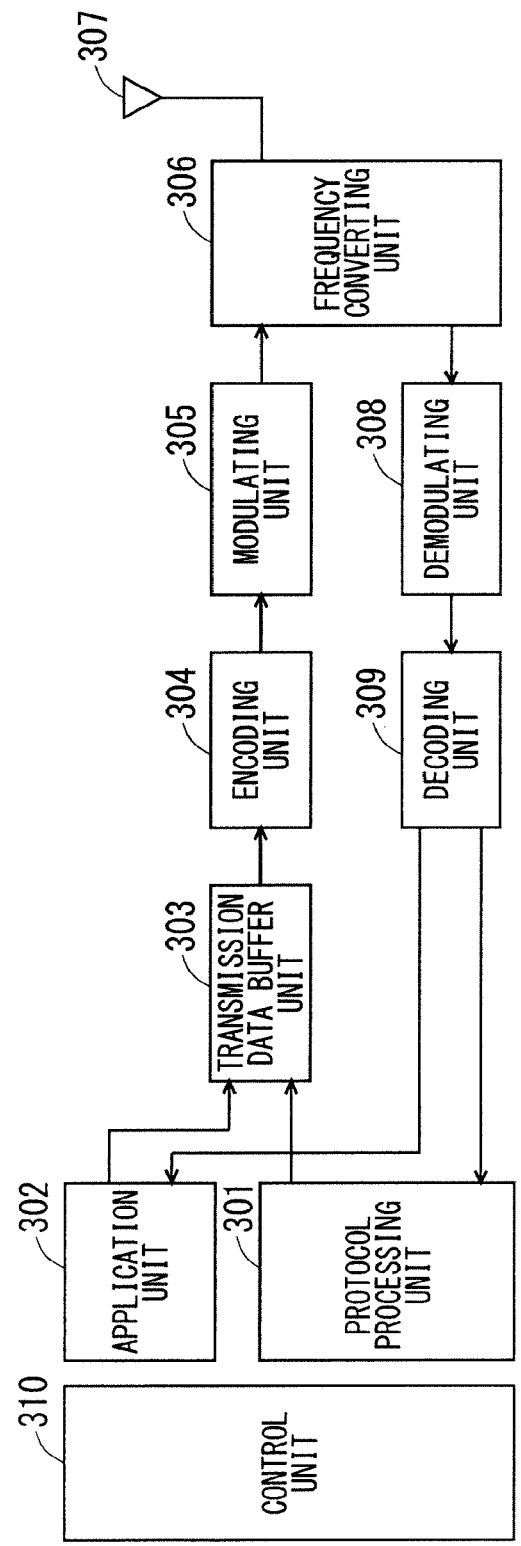

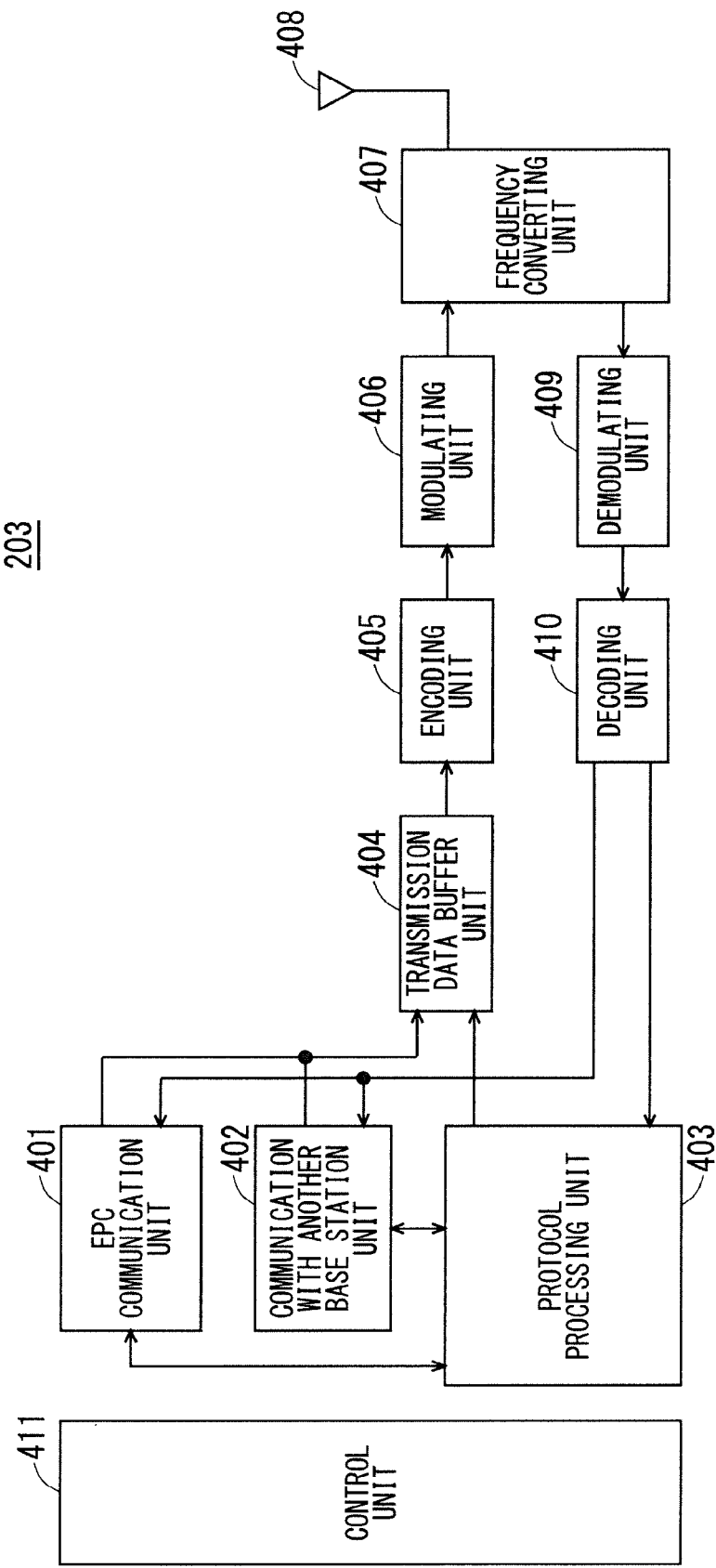

F I G. 5
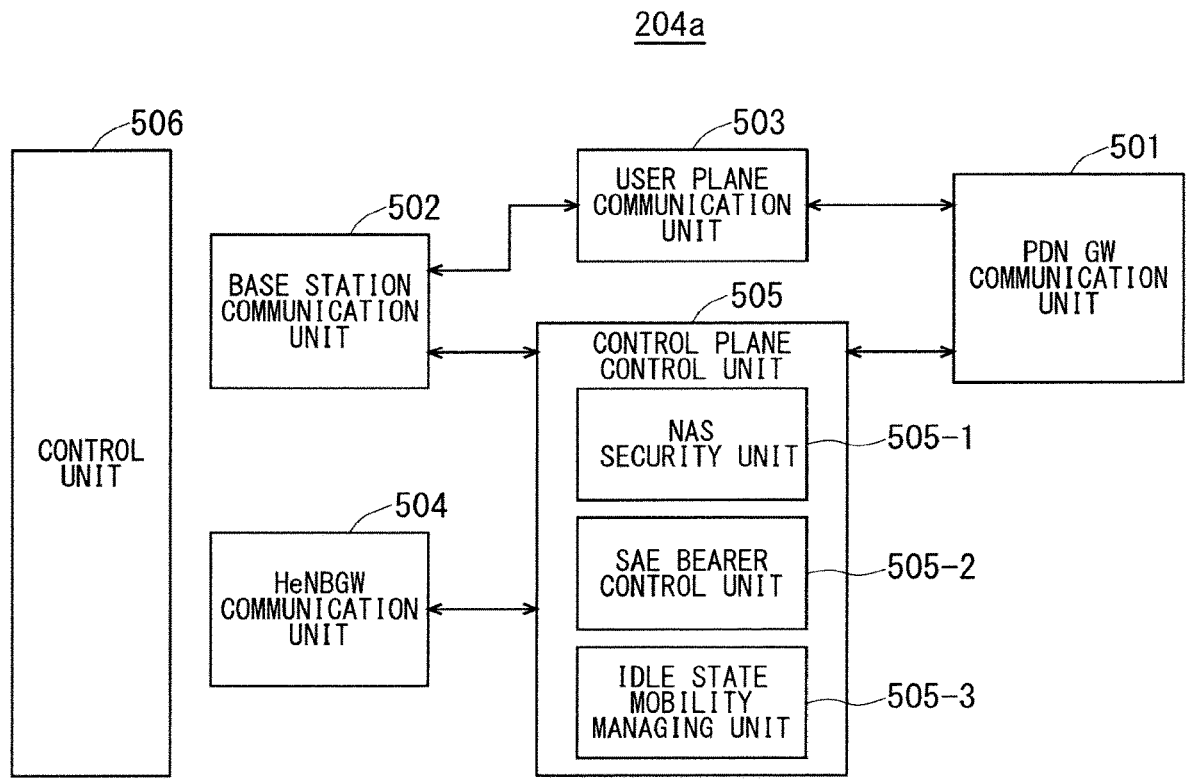

F I G. 6
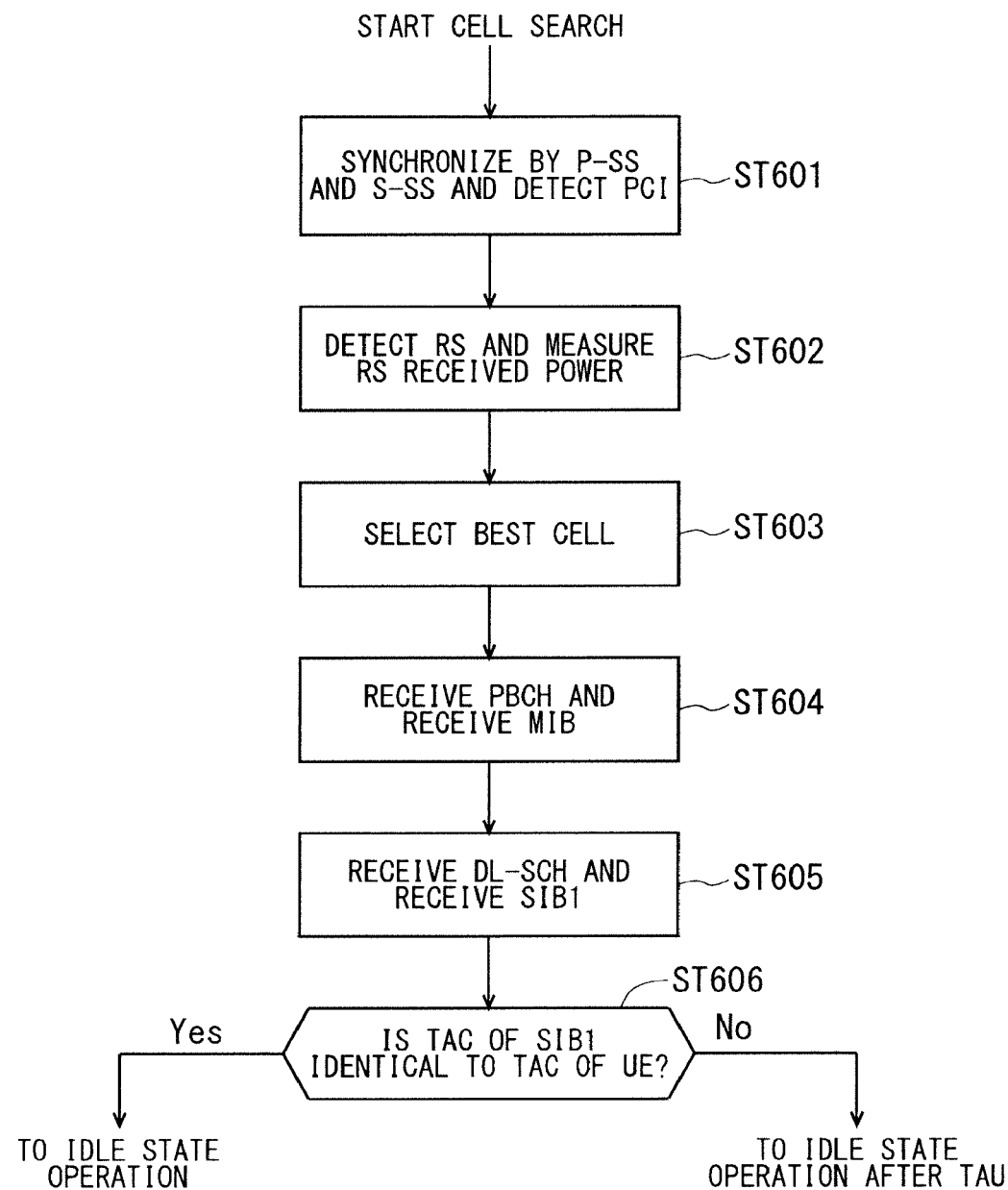

F I G . 9
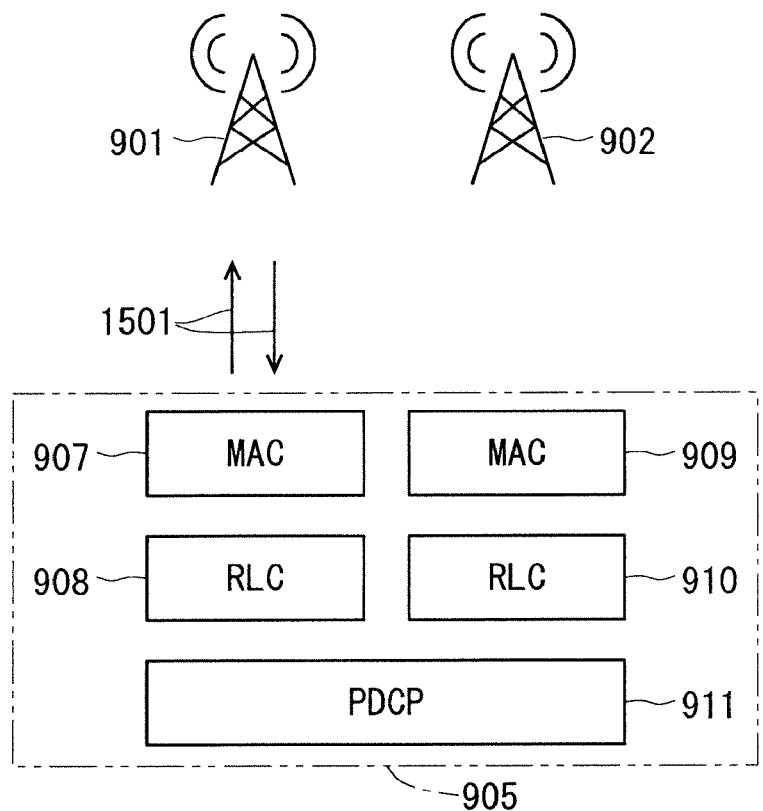
F I G . 1 0
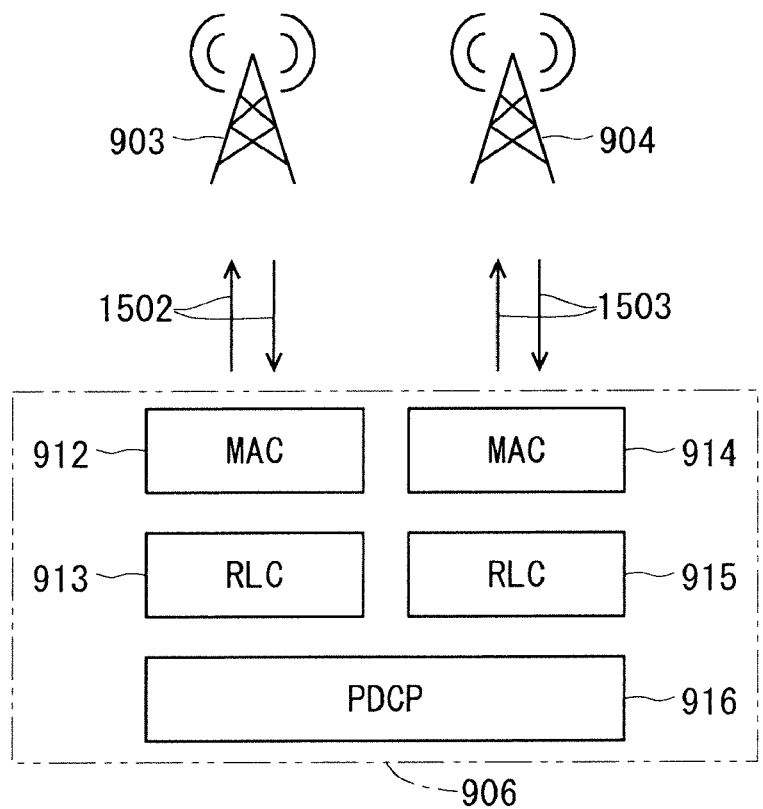

F I G . 1 7
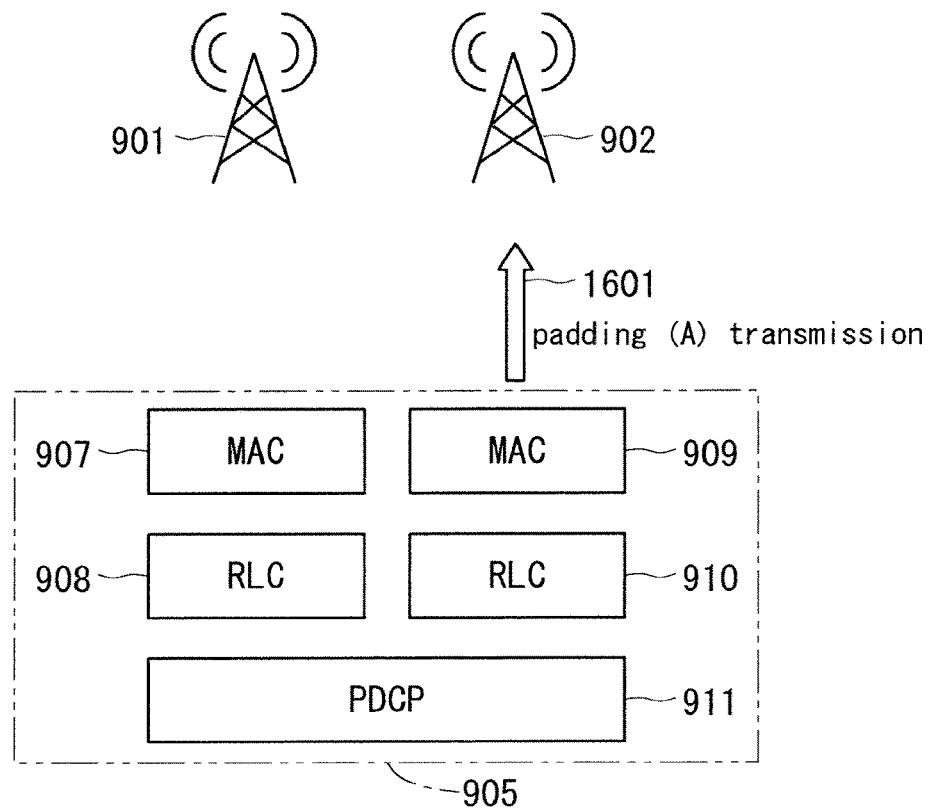
F I G . 1 8
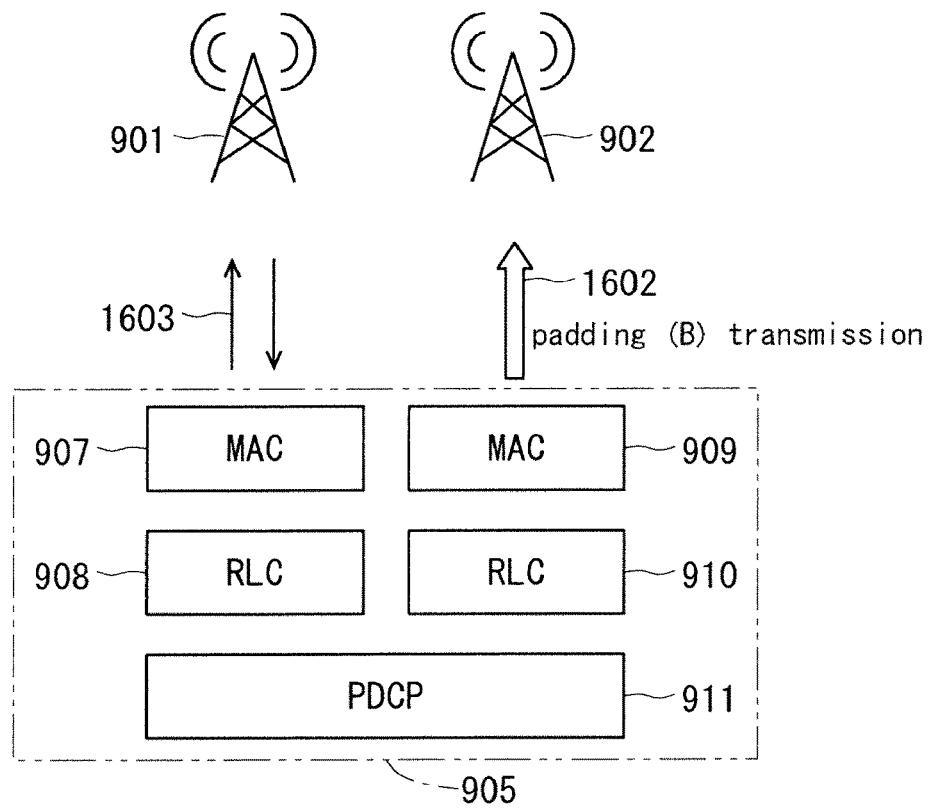

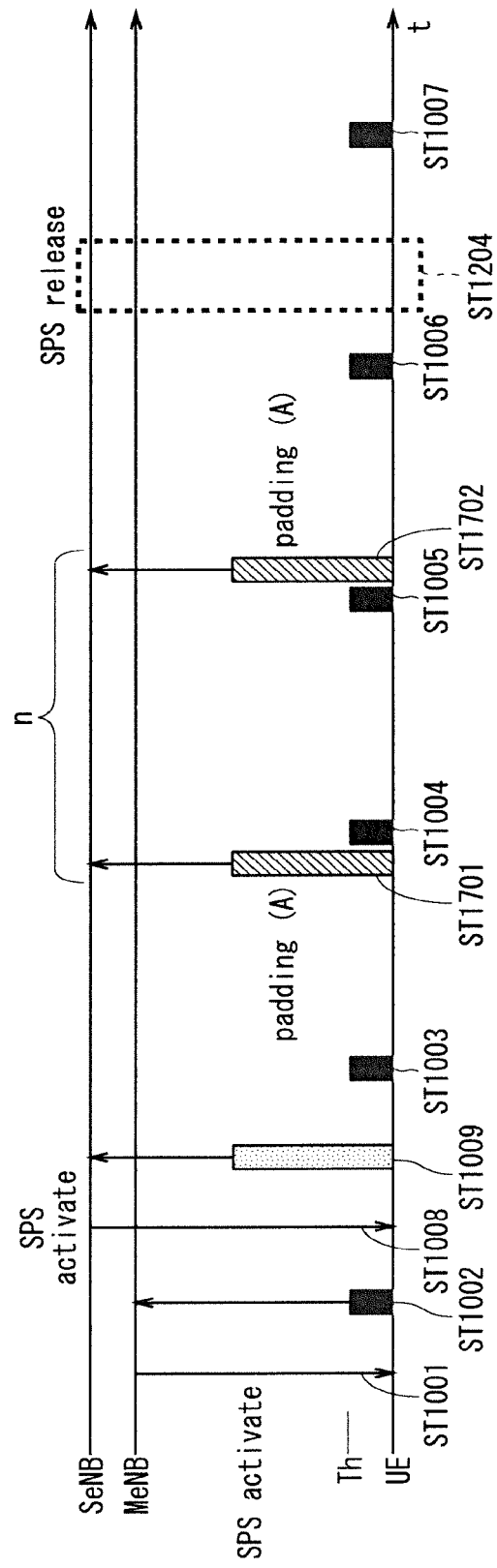

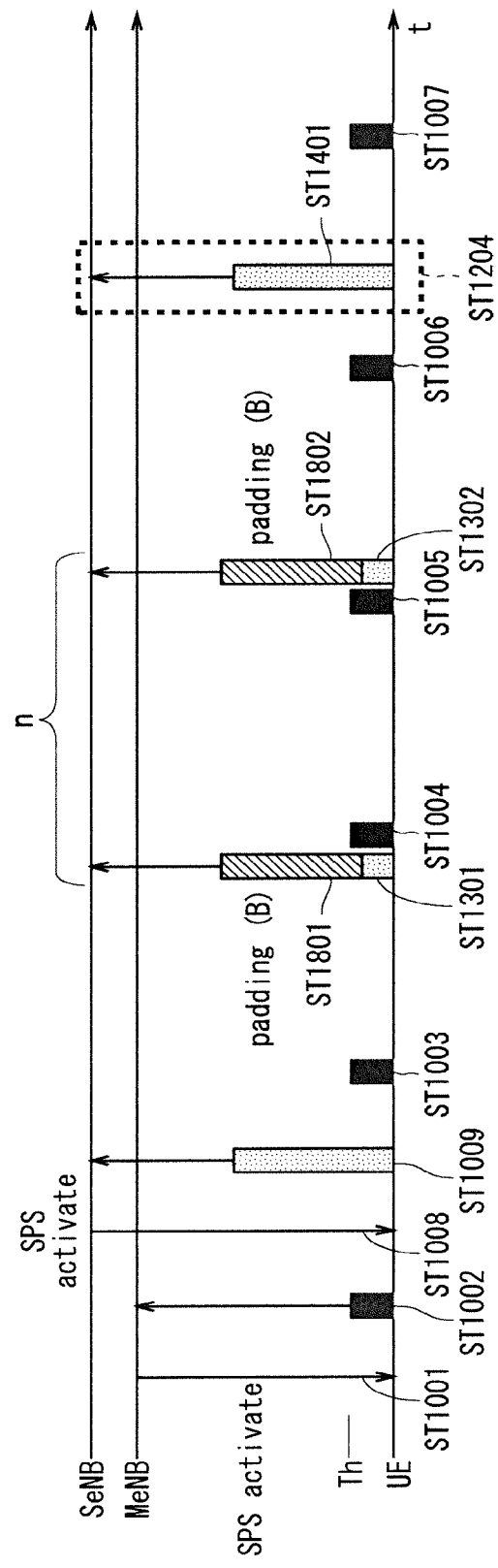

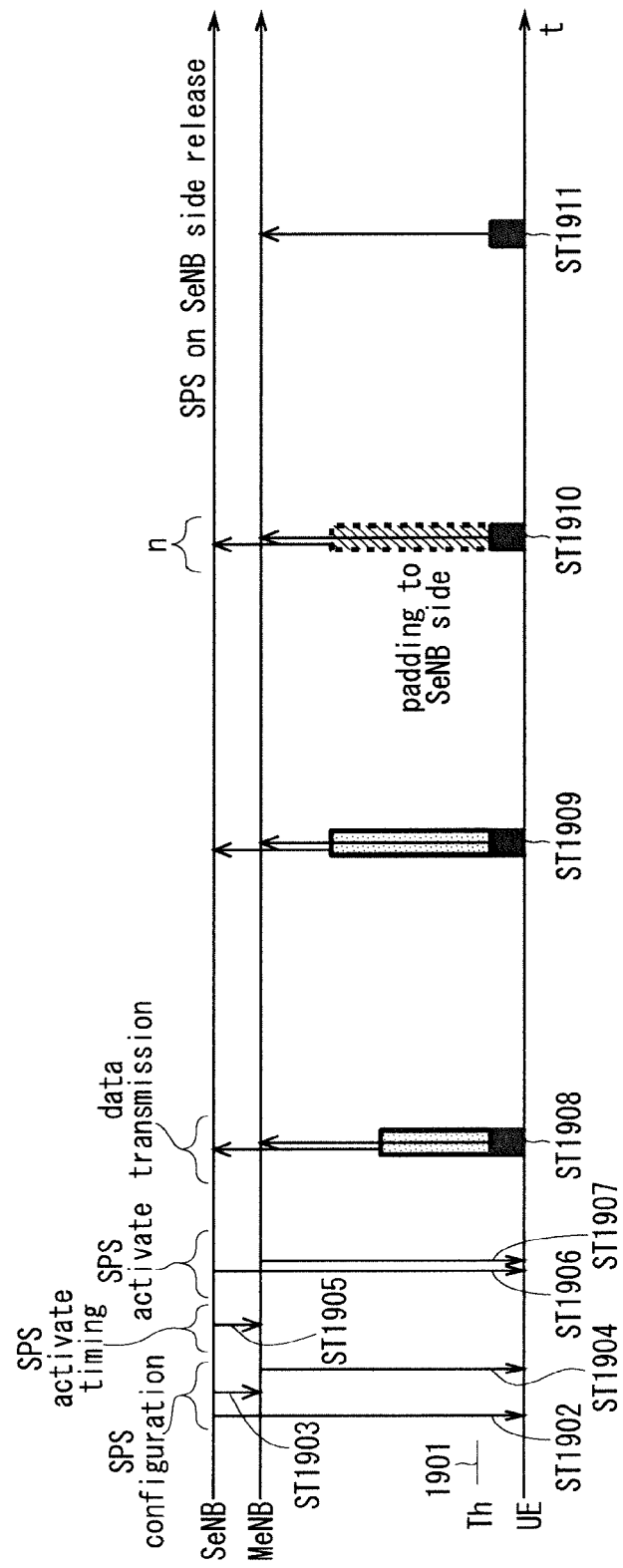

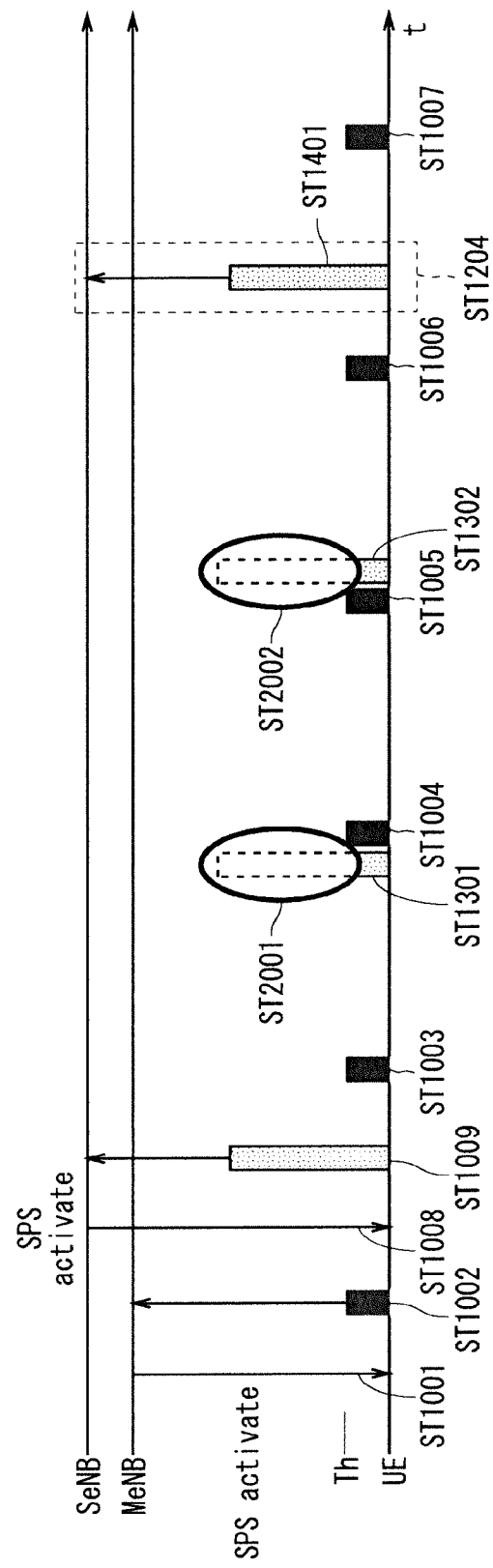

F I G. 3 1
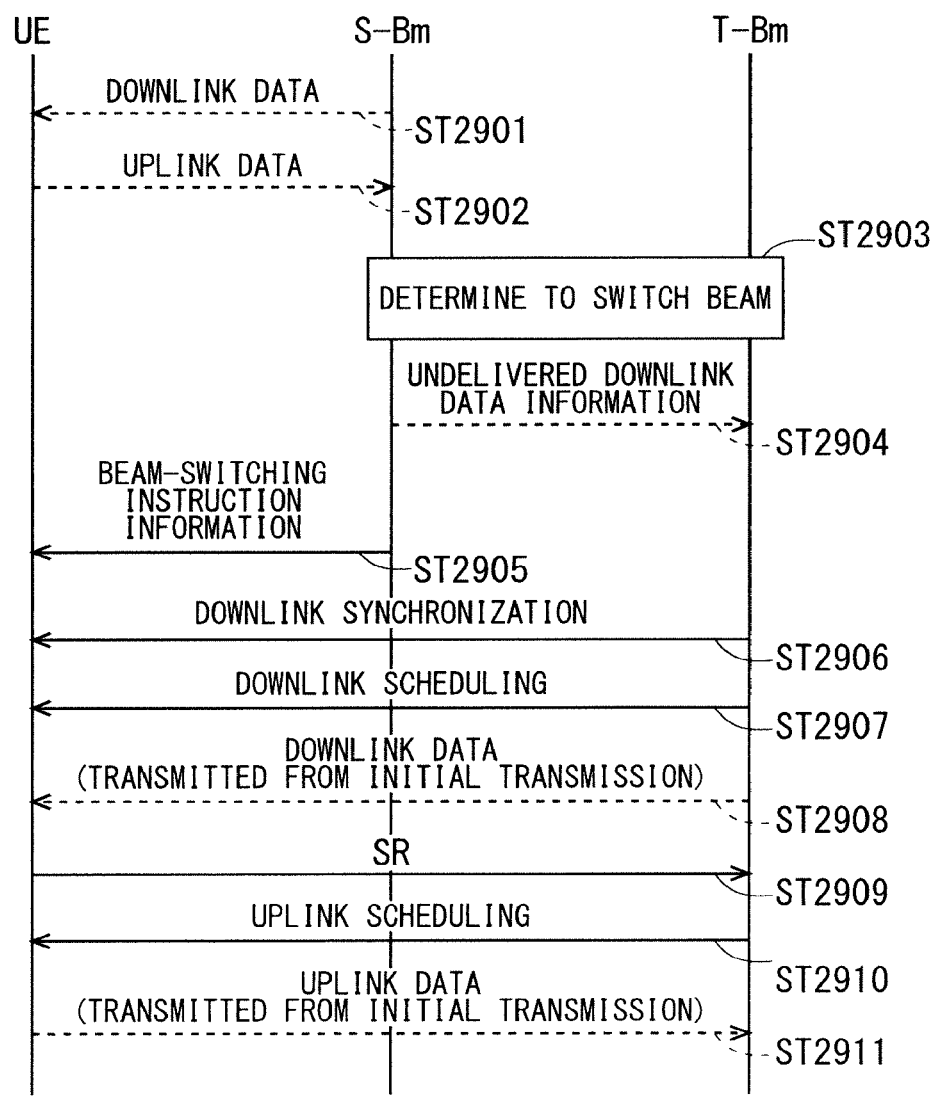

COMMUNICATION SYSTEM

TECHNICAL FIELD

The present invention relates to a communication system in which radio communication is performed between a communication terminal device such as a user equipment device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network, which will be hereinafter collectively referred to as a network as well (for example, see Non-Patent Documents 1 to 10). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, t is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in the case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below.

The closed subscriber group (CSG) cell is a cell in which subscribers who are allowed use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by communication terminals (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

Further, 3GPP is pursuing specifications standard of long term evolution advanced (LTE-A) as Release 10 (see Non-Patent Documents 3 and 4). The LTE-A is based on the LTE radio communication system and is configured by adding several new techniques to the system.

Carrier aggregation (CA) is studied for the LTE-A system, in which two or more component carriers (CCs) are aggregated to support wider transmission bandwidths up to 100 MHz. Non-Patent Document 1 describes the CA.

In the case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

The traffic flow of a mobile network is on the rise, and the communication rate is also increasing. It is expected that the communication rate will be further increased when the operations of the LTE and the LTE-A are fully initiated.

Furthermore, 3GPP is studying the use of small eNBs (hereinafter also referred to as "small-scale base station devices") configuring small cells to satisfy tremendous traffic in the future. In an example technique under study, etc., a large number of small eNBs will be installed to configure a large number of small cells, thus increasing spectral efficiency and communication capacity. The specific techniques include dual connectivity (abbreviated as DC) in which a UE communicates with two eNBs through connection thereto. Non-Patent Document 1 describes the DC.

Among eNBs that perform dual connectivity (DC), one of them may be referred to as a master eNB (abbreviated as MeNB), and the other may be referred to as a secondary eNB (abbreviated as SeNB).

For increasingly sophisticated mobile communications, the fifth generation (hereinafter also referred to as "5G") radio access system is studied, whose service is aimed to be launched in 2020 and afterward. For example, in the Europe, an organization named METIS summarizes the requirements for 5G (see Non-Patent Document 5).

Among the requirements in the 5G radio access system are a system capacity 1000 times as high as, a data transmission rate 100 times as high as, a data latency one tenth ($\frac{1}{10}$) as low as, and simultaneously connected communication terminals 100 times as many as those in the LTE system, to further reduce the power consumption and device cost.

To satisfy such requirements, increasing the transmission capacity of data using broadband frequencies, and increasing the transmission rate of data through increase in the spectral efficiency are being studied. To realize these, the techniques enabling the spatial multiplexing such as the Multiple Input Multiple Output (MIMO) and the beamforming using a multi-element antenna are being studied.

PRIOR-ART DOCUMENTS

Non-Patent Documents

Non-Patent Document 1: 3GPP TS36.300 V13.0.0
Non-Patent Document 2: 3GPP S1-083461
Non-Patent Document 3: 3GPP TR 36.814 V9.0.0
Non-Patent Document 4: 3GPP TR 36.912 V10.0.0
Non-Patent Document 5: "Scenarios, requirements and KPIs for 5G mobile and wireless system", [online], Apr. 30, 2013, ICT-317669-METIS/D1.1, [Searched on Jan. 25, 2016], Internet <https://www.metis2020.com/documents/deliverables/>
Non-Patent Document 6: 3GPP R2-144662
Non-Patent Document 7: 3GPP R2-152359
Non-Patent Document 8: 3GPP TS 36.141 V13.0.0
Non-Patent Document 9: 3GPP TS36.321 V12.8.0
Non-Patent Document 10: 3GPP R2-156668

SUMMARY

Problems to be Solved by the Invention

In the DC, split bearers are supported. In the split bearers, Semi-Persistent Scheduling (SPS) is supported not only for the MeNB but also for the SeNB (see Non-Patent Document 6).

3GPP proposes a method based on double reporting and threshold (abbreviated as DRAT) as a method for transmitting a Buffer Status Report (abbreviated as BSR) when an uplink split bearer is executed (see Non-Patent Document 7). With application of the DRAT in an uplink split bearer, the UE transmits data to one predetermined eNB but not to the other eNB when the amount of uplink data is smaller than or equal to a DRAT threshold.

However, operations of the SPS when the amount of the uplink data is smaller than or equal to the DRAT threshold, for example, whether the UE can perform padding transmission etc. are neither defined nor discussed.

Without any definition of the operations of the SPS, an implicit release function in response to the padding transmission does not normally work. This causes an unstable operation between the eNB and the UE, which may cause a malfunction.

The object of the present invention is to provide a communication system capable of a stable communication operation between a base station device and a communication terminal device.

Means to Solve the Problems

A communication system according to the present invention includes a first base station device, a second base station device, and a communication terminal device capable of radio communication with the first base station device and the second base station device, wherein the communication terminal device is configured to communicate with the first base station device via a first path for direct communication with the first base station device, and via a second path for communication with the first base station device through the second base station device, the communication terminal device is set to transmit, to the first base station device and the second base station device, transmission data addressed to the first base station device when an amount of the transmission data exceeds a predetermined threshold, and to transmit the transmission data not to the second base station device but to the first base station device when the amount of the transmission data is smaller than or equal to the threshold, and the threshold is changed so that the communication terminal device transmits the transmission data to the first base station device and the second base station device, when the second base station device is set to communicate with the communication terminal device with radio resources periodically allocated and the amount of the transmission data is smaller than or equal to the threshold.

A communication system according to the present invention includes a first base station device, a second base station device, and a communication terminal device capable of radio communication with the first base station device and the second base station device, wherein the communication terminal device is configured to communicate with the first base station device via a first path for direct communication with the first base station device, and via a second path for communication with the first base station device through the second base station device, the communication terminal device is set to transmit, to the first base station device and the second base station device, transmission data addressed to the first base station device when an amount of the transmission data is larger than or equal to a predetermined threshold, and to transmit the transmission data not to the second base station device but to the first base station device when the amount of the transmission data is smaller than the threshold, and the threshold is changed so that the communication terminal device transmits the transmission data to the first base station device and the second base station device, when the second base station device is set to communicate with the communication terminal device with radio resources periodically allocated and the amount of the transmission data is smaller than the threshold.

A communication system according to the present invention includes a first base station device, a second base station device, and a communication terminal device capable of radio communication with the first base station device and the second base station device, wherein the communication terminal device is configured to communicate with the first base station device via a first path for direct communication with the first base station device, and via a second path for communication with the first base station device through the second base station device, the communication terminal device is set to transmit, to the first base station device and the second base station device, transmission data addressed to the first base station device when an amount of the transmission data exceeds a predetermined threshold, and to transmit the transmission data not to the second base station device but to the first base station device when the amount of the transmission data is smaller than or equal to the threshold, and the communication terminal device is set to transmit the transmission data to the first base station device and to transmit an end signal to the second base station device, when the second base station device is set to communicate with the communication terminal device with radio resources periodically allocated and the amount of the transmission data is smaller than or equal to the threshold, the end signal representing an end of the communication with the radio resources periodically allocated.

A communication system according to the present invention includes a first base station device, a second base station device, and a communication terminal device capable of radio communication with the first base station device and the second base station device, wherein the communication terminal device is configured to communicate with the first base station device via a first path for direct communication with the first base station device, and via a second path for communication with the first base station device through the second base station device, the communication terminal device is set to transmit, to the first base station device and the second base station device, transmission data addressed to the first base station device when an amount of the transmission data is larger than or equal to a predetermined threshold, and to transmit the transmission data not to the second base station device but to the first base station device when the amount of the transmission data is smaller than the threshold, and the communication terminal device is set to transmit the transmission data to the first base station device and to transmit an end signal to the second base station device, when the second base station device is set to communicate with the communication terminal device with radio resources periodically allocated and the amount of the transmission data is smaller than the threshold, the end signal representing an end of the communication with the radio resources periodically allocated.

Effects of the Invention

According to the communication system of the present invention, the threshold is changed so that the transmission data is transmitted to the first base station device and the second base station device, when the second base station device is set to communicate with the communication terminal device with radio resources periodically allocated and the amount of the transmission data is smaller than or equal to the threshold. Consequently, the second base station device can communicate with the communication terminal device with the radio resources periodically allocated. Thus, the communication system capable of a stable communication operation between the first and second base station devices and the communication terminal device can be provided.

According to the communication system of the present invention, the threshold is changed so that the transmission data is transmitted to the first base station device and the second base station device, when the second base station device is set to communicate with the communication terminal device with radio resources periodically allocated and the amount of the transmission data is smaller than the threshold. Consequently, the second base station device can communicate with the communication terminal device with the radio resources periodically allocated. Thus, the communication system capable of a stable communication operation between the first and second base station devices and the communication terminal device can be provided.

According to the communication system of the present invention, the communication terminal device is set to transmit the transmission data to the first base station device and to transmit an end signal to the second base station device, when the second base station device is set to communicate with the communication terminal device with radio resources periodically allocated and the amount of the transmission data is smaller than or equal to the threshold, the end signal representing an end of the communication with the radio resources periodically allocated. Consequently, the second base station device can end the communication with the communication terminal device with the radio resources periodically allocated. Thus, the communication system capable of a stable communication operation between the first and second base station devices and the communication terminal device can be provided.

According to the communication system of the present invention, the communication terminal device is set to transmit the transmission data to the first base station device and to transmit end signal to the second base station device, when the second base station device is set to communicate with the communication terminal device with radio resources periodically allocated and the amount of the transmission data is smaller than the threshold, the end signal representing an end of the communication with the radio resources periodically allocated. Consequently, the second base station device can end the communication with the communication terminal device with the radio resources periodically allocated. Thus, the communication system capable of a stable communication operation between the first and second base station devices and the communication terminal device can be provided.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 3 is a block diagram showing the configuration of a user equipment 202 shown in FIG. 2, which is a communication terminal according to the present invention.

FIG. 4 is a block diagram showing the configuration of a base station 203 shown in FIG. 2, which is a base station according to the present invention.

FIG. 5 is a block diagram showing the configuration of an MME according to the present invention.

FIG. 6 is a flowchart showing an outline from a cell search to an idle state operation performed by a communication terminal (UE) in the LTE communication system.

FIG. 9 illustrates a transmission method based on the DRAT.

FIG. 10 illustrates a transmission method based on the DRAT.

FIG. 17 illustrates a method for performing padding transmission in the absence of the uplink transmission data and performing the padding transmission in the presence of the uplink transmission data in a different manner.

FIG. 18 illustrates a method for performing the padding transmission in the absence of the uplink transmission data and performing the padding transmission in the presence of the uplink transmission data in a different manner.

FIG. 19 illustrates a method for performing the padding transmission in the absence of the uplink transmission data and performing the padding transmission in the presence of the uplink transmission data in a different manner.

FIG. 20 illustrates a method for performing the padding transmission in the absence of the uplink transmission data and performing the padding transmission in the presence of the uplink transmission data in a different manner.

FIG. 21 illustrates a method for allowing the 1st eNB to have the same SPS settings as those of the 2nd eNB.

FIG. 22 illustrates a method for preventing the padding transmission when the implicit release is not performed.

FIG. 31 illustrates an example sequence on a method for applying a target beam from initial transmission of data under a HARQ process according to the second modification of the thirteenth embodiment.

DESCRIPTION OF EMBODIMENTS

First Embodiment

Figure 2:
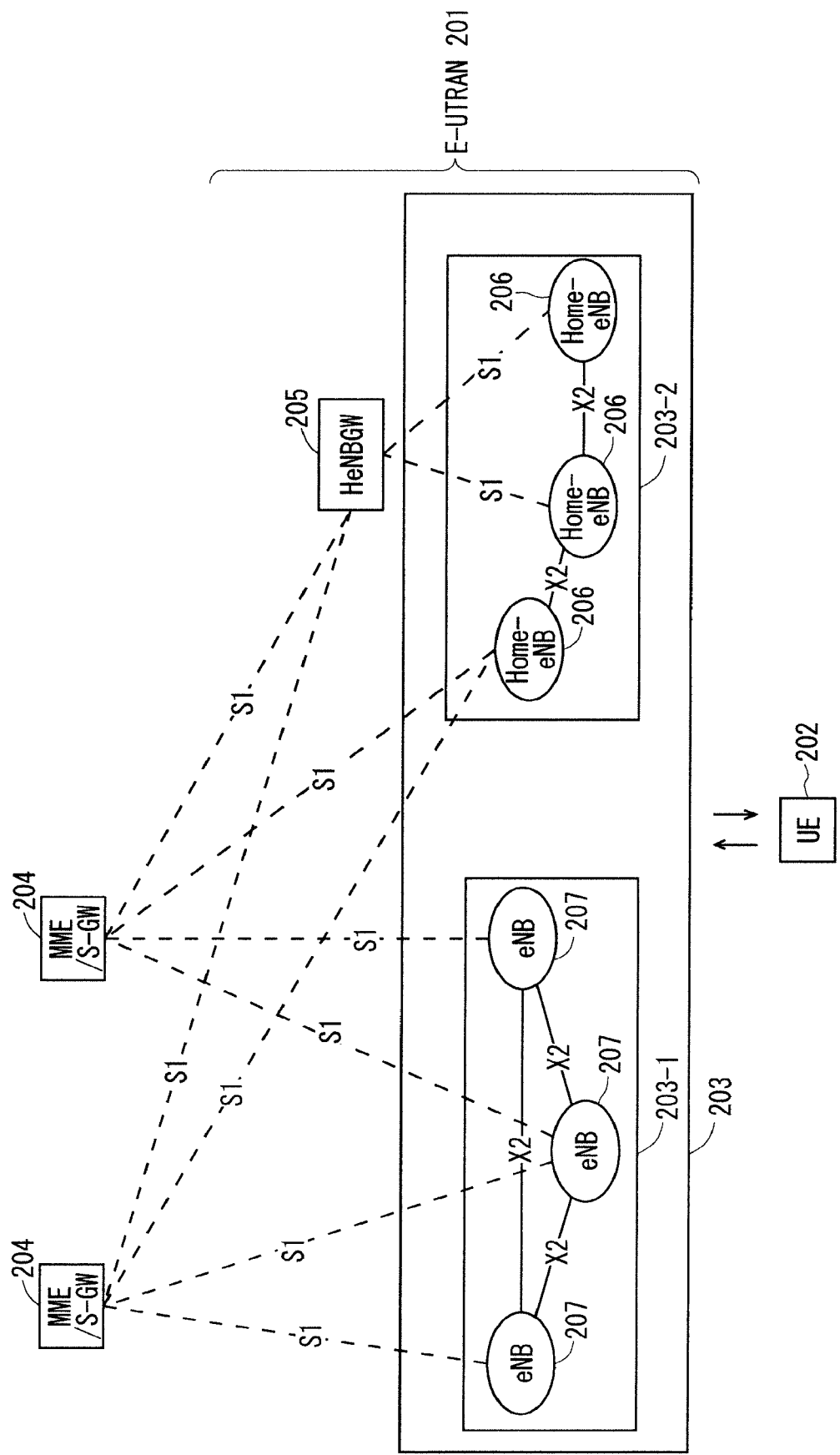
FIG. 2 is a block diagram showing the overall configuration of an LTE communication system 200 under discussion of 3GPP.

FIG. 2 is a block diagram showing an overall configuration of an LTE communication system 200, which is under discussion of 3GPP. FIG. 2 will be described. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a movable mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs broadcast, paging, RRC connection management, and the like. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 includes an eNB group 203-1 including a plurality of eNBs 207 and a Home-eNB group 203-2 including a plurality of Home-eNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW), or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Or, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Horne-eNB 206 being base stations. The MME units 204 configure an EPC being a core network. The base station 203 and the HeNBGW 205 configure the E-UTRAN 201.

Further, 3GPP is studying the configuration below. The X2 interface between the Home-eNBs 206 is supported. In other words, the Horne-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station device 203 may configure a single cell or a plurality of cells. Each cell has a range predetermined as a coverage in which the cell can communicate with the user equipment 202 and performs radio communication with the user equipment 202 within the coverage. In the case where one base station device 203 configures a plurality of cells, every cell is configured so as to communicate with the user equipment 202.

FIG. 3 is a block diagram showing the configuration of the user equipment 202 of FIG. 2 that is a communication terminal according to the present invention. The transmission process of the user equipment 202 shown in FIG. 3 will be described. First, a transmission data buffer unit 303 stores the control data from a protocol processing unit 301 and the user data from an application unit 302. The data stored in the transmission data buffer unit 303 is passed to an encoding unit 304 and is subjected to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309 and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

FIG. 4 is a block diagram showing the configuration of the base station 203 of FIG. 2 that is a base station according to the present invention. The transmission process of the base station 203 shown in FIG. 4 will be described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405 and is then subjected to an encoding process such as error correction. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and is then subjected to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

FIG. 5 is a block diagram showing the configuration of the MME according to the present invention. FIG. 5 shows the configuration of an MME 204a included in the MME unit 204 shown in FIG. 2 described above. A PDN GW communication unit 501 performs data transmission and reception between the MME 204a and the PDN GW. A base station communication unit 502 performs data transmission and reception between the MME 204a and the base station 203 by means of the S1 interface. In the case where the data received from the PDN GW is user data, the user data is passed from the PDN GW communication unit 501 to the base station communication unit 502 via a user plane communication unit 503 and is then transmitted to one or a plurality of base stations 203. In the case where the data received from the base station 203 is user data, the user data is passed from the base station communication unit 502 to the PDN GW communication unit 501 via the user plane communication unit 503 and is then transmitted to the PDN GW.

In the case where the data received from the PDN GW is control data, the control data is passed from the PDN GW communication unit 501 to a control plane control unit 505. In the case where the data received from the base station 203 is control data, the control data is passed from the base station communication unit 502 to the control plane control unit 505.

A HeNBGW communication unit 504 is provided in the case where the HeNBGW 205 is provided, which performs data transmission and reception between the MME 204a and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane. The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state, which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the Home-eNBs 206 to be connected to the MME 204a, CSG IDs, and a whitelist.

An example of a cell search method in a mobile communication system will be described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME and the like to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

Figure 7:
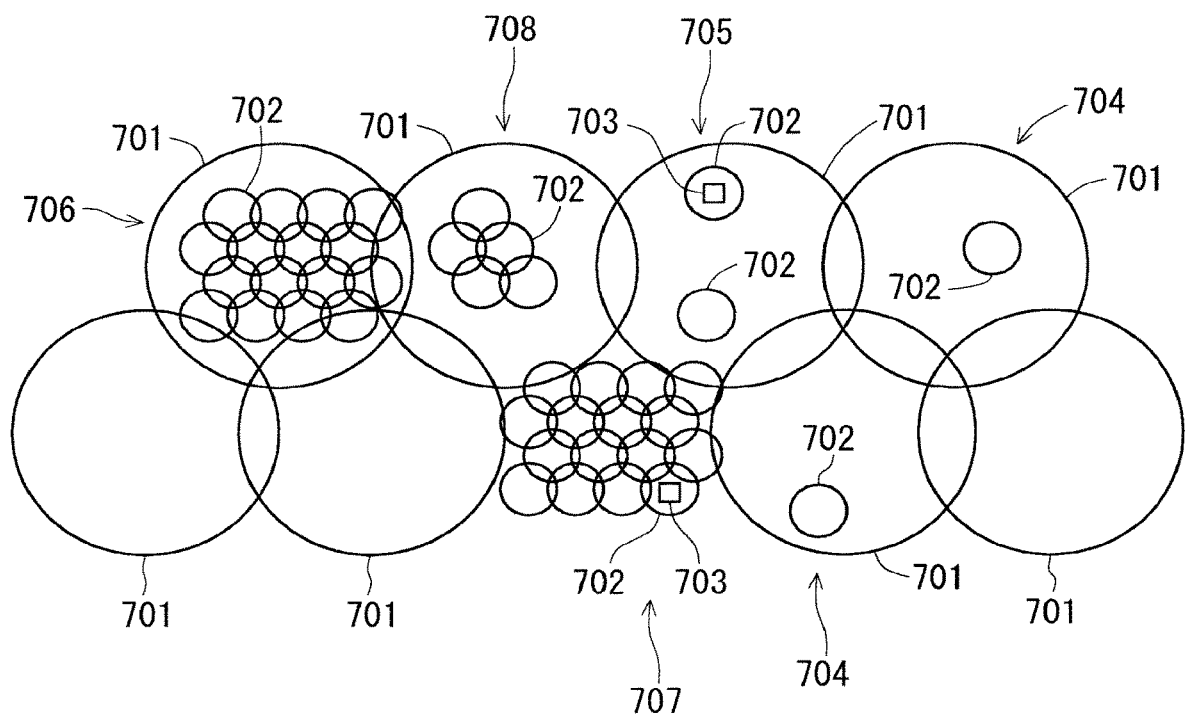
FIG. 7 shows the concept of a cell configuration when macro eNBs and small eNBs coexist.

FIG. 7 shows the concept of the cell configuration in which macro eNBs and small eNBs coexist. The macro cell configured by a macro eNB has a relatively-wide-range coverage 701. A small cell configured by a small eNB has a coverage 702 whose range is narrower than that of the coverage 701 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "704" or "705", the coverage 702 of the small cell configured by a small eNB may be included in the coverage 701 of the macro cell configured by a macro eNB.

As indicated by the reference "705", the coverages 702 of a plurality of, for example, two small cells may be included in the coverage 701 of one macro cell. A user equipment (UE) 703 is included in, for example, the coverage 702 of the small cell and performs communication via the small cell.

In the cell configuration shown in FIG. 7, as indicated by a reference "706", the coverage 701 of the macro cell configured by a macro eNB may overlap the coverages 702 of the small cells configured by small eNBs in a complicated manner.

As indicated by a reference "707", the coverage 701 of the macro cell configured by a macro eNB may not overlap the coverages 702 of the small cells configured by small eNBs.

Further, as indicated by a reference "708", the coverages 702 of a large number of small cells configured by a large number of small eNBs may be configured in the coverage 701 of one macro cell configured by one macro eNB.

In the DC, the split bearers are supported. The split bearers are bearers that are split into a direct path between the MeNB and the UE and a path between the MeNB and the UE through the SeNB.

In the split bearers, Semi-Persistent Scheduling (SPS) is supported not only for the MeNB but also for the SeNB (see Non-Patent Document 6). The SPS can be set to the MeNB and the SeNB simultaneously and independently.

The SPS is a scheduling method that enables the radio resources to be semi-statically allocated to the UE over a long duration of a plurality of subframes. Consequently, the eNB can eliminate the need for transmitting, to the UE in each subframe, DL allocation information on dedicated control channels such as a PDCCH and an EPDCCH, or UL grant information.

Non-Patent Document 9 describes the SPS under the 3GPP.

The UE is notified via the RRC-dedicated signaling of settings including the SPS interval, the Cell Radio Network Temporary Identifier (C-RNTI) for the SPS, and the number of empty transmissions before implicit release of the UL (may be referred to as "the number of before-release empty transmissions"). The notification enables the SPS to be executed. A parameter referred to as "implicitReleaseAfter" is used as the number of before-release empty transmissions. A reference "n" may denote the number of before-release empty transmissions in the following description.

The SPS is disabled via the RRC-dedicated signaling. Consequently, the corresponding DL allocation information or the corresponding UL grant information is discarded. The C-RNTI for the SPS may be referred to as a "SPS C-RNTI".

The PDCCH or the EPDCCH starts execution of (activates) or ends execution of (deactivates) the SPS. The CRC of this PDCCH or EPDCCH is masked with the SPS C-RNTI.

A method for ending execution of the SPS, which is referred to as implicit release, is determined particularly for the uplink SPS. In the absence of uplink transmission data, the UE transmits a MAC Protocol Data Unit (PDU) including at least one of a padding bit and a padding BSR. This transmission may be referred to as empty transmission or padding transmission. When such transmission is consecutively performed the number of times set as the number of empty transmissions before implicit release of the UL, the uplink grant information is immediately cleared.

Accordingly, the eNB disables settings of the uplink SPS when consecutively receiving the transmission from the UE the number of times set as the number of empty transmissions before implicit release of the UL. The eNB disables the SPS settings, so that the radio resources allocated by the SPS settings can be used for the other UEs.

Figure 8:
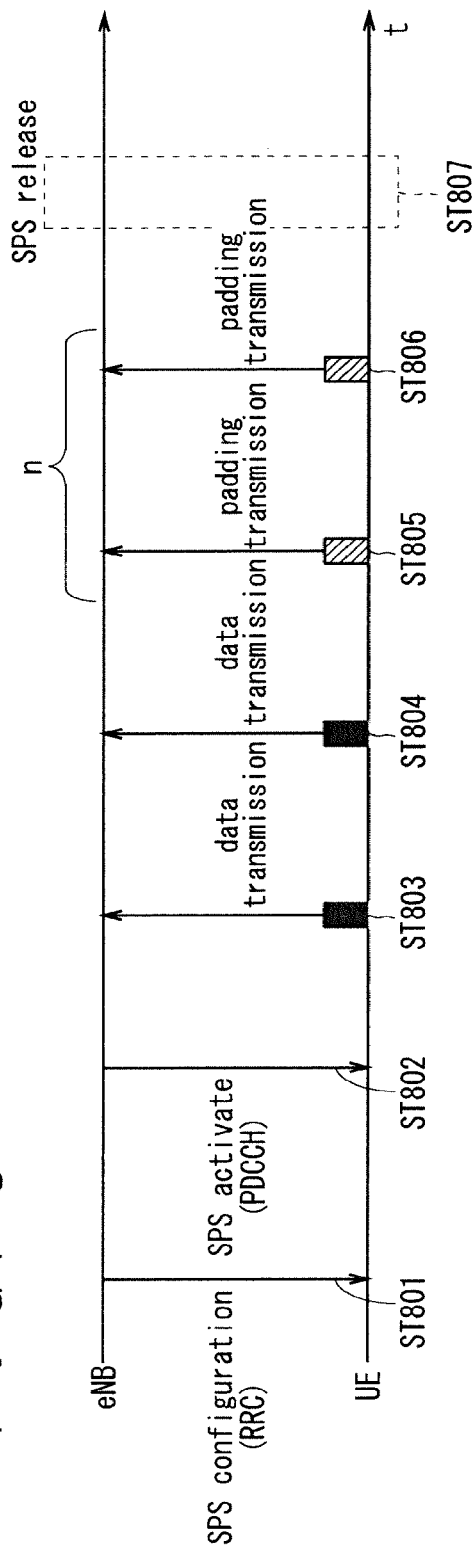
FIG. 8 illustrates example operations of uplink SPS.

FIG. 8 illustrates example operations of the uplink SPS.

In Step ST801, the eNB notifies, via the RRC-dedicated signaling, the UE of a configuration of SPS resources and the SPS C-RNTI to be used in receiving the PDCCH.

Upon receipt of the configuration of the SPS resources and the SPS C-RNTI in Step ST801, the UE detects the PDCCH by the SPS C-RNTI.

In Step ST802, the eNB notifies the UE of a start execution (activation) instruction of the SPS. Upon receipt of the start execution instruction of the SPS in Step ST802 and then detection of the first scheduling, the UE activates the SPS. In other words, the SPS starts to be executed. The scheduling is continued until the deactivation of the SPS, that is, until the execution of the SPS is ended.

In Steps ST803 and ST804, the eNB and UE execute the SPS with the scheduled SPS resources. In Steps ST803 and ST804, the UE transmits the uplink data to the eNB with the set SPS resources.

In Step ST805, the UE performs the padding transmission in the absence of transmission data with the set SPS resources.

When consecutively performing the padding transmission the number of times set as the number of before-release empty transmissions in Steps ST805 and ST806, the UE clears the SPS in Step ST807. The number of before-release empty transmissions is twice herein.

When consecutively receiving the padding transmission from the UE the number of times set as the number of before-release empty transmissions in Steps ST805 and ST806, the eNB releases the settings of the uplink SPS in Step ST807.

As previously described, the split bearers are supported in the DC. 3GPP proposes a method based on double reporting and threshold (abbreviated as DRAT) as a method for transmitting a Buffer Status Report (abbreviated as BSR) when an uplink split bearer is executed (see Non-Patent Document 7).

FIGS. 9 and 10 illustrate transmission methods based on the DRAT. FIG. 9 illustrates that the uplink PDCP data amount is smaller than or equal to a predetermined threshold (Th). FIG. 10 illustrates that the uplink PDCP data amount is larger than the predetermined threshold (Th).

In FIG. 9, a UE 905 includes Medium Access Control (MAC) 907, Radio Link Control (RLC) 908, MAC 909, RLC 910, and a Packet Data Convergence Protocol (PDCP) 911. The MAC 907 is used for an MeNB 901. The RLC 908 is used for the MeNB 901. The MAC 909 is used for an SeNB 902. The RLC 910 is used for the SeNB 902.

In FIG. 10, a UE 906 includes MAC 912, RLC 913, MAC 914, RLC 915, and a PDCP 916. The MAC 912 is used for an MeNB 903. The RLC 913 is used for the MeNB 903. The MAC 914 is used for an SeNB 904. The RLC 915 is used for the SeNB 904.

When the data amount of the PDCP 911 is smaller than or equal to the predetermined threshold, a Buffer Status (abbreviated as BS) is reported to one eNB, that is, the MeNB 901 or the SeNB 902 in the DRAT as illustrated in FIG. 9. To which one of the eNBs of the MeNB 901 or the SeNB 902 the BS is reported is set via the RRC signaling. The set one eNB to which the BS is reported will be referred to as the "1st eNB". FIG. 9 illustrates reporting the BS to the MeNB 901.

When the data amount of the PDCP 916 is larger than the predetermined threshold, a BS with the data amount of the PDCP 916 is reported to both of the eNBs, that is, the 1st eNB and the 2nd eNB as illustrated in FIG. 10. In FIG. 10, the 1st eNB is the MeNB 903, and the 2nd eNB is the SeNB 904. The predetermined threshold is set for each Radio Bearer (RB).

FIG. 9 may illustrate that the uplink PDCP data amount is smaller than the predetermined threshold (Th), and FIG. 10 may illustrate that the uplink PDCP data amount is larger than or equal to the predetermined threshold (Th).

The 3GPP further proposes matching an eNB to which a Buffer Status Report (BSR) is triggered with an eNB to which data is transmitted.

Under this proposal, when the amount of transmission data is smaller than or equal to a threshold, the data is transmitted to the set one eNB (the 1st eNB) in the DRAT. When the amount of the transmission data is larger than the threshold, the data is transmitted to both of the eNBs (the 1st eNB and the 2nd eNB).

Assume a case where the SPS is set to the 2nd eNB and starts to be executed (activated) with a UL split bearer set. When the amount of the uplink data is smaller than or equal to the threshold, the UE does not transmit the data to the 2nd eNB in the DRAT.

The operations when the amount of the uplink data is smaller than or equal to the threshold and the data is not transmitted to the 2nd eNB with the SPS resources set to the 2nd eNB are neither defined nor discussed.

Since the data is not transmitted to the 2nd eNB when the amount of the uplink data is smaller than or equal to the threshold, there is a possibility that nothing is transmitted with the set SPS resources or the padding transmission is not performed.

Without the padding transmission, the implicit release is not nominally performed. Thus, the UE cannot determine whether to clear the SPS resources. The eNB cannot determine whether to release the SPS resources. These cause an unstable operation between the eNB and the UE, which may lead to a malfunction.

Figure 11:
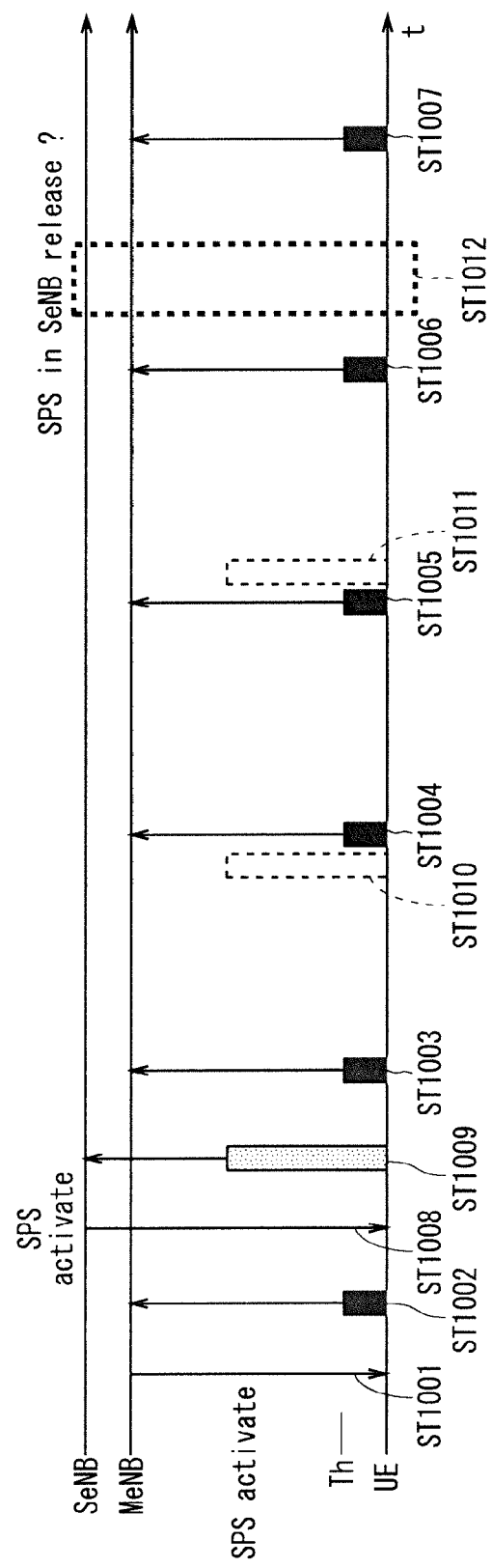
FIG. 11 illustrates a problem when a UL split bearer and SPS are set.

FIG. 11 illustrates a problem when the UL split bearer and the SPS are set. The 1st eNB is the MeNB, and the 2nd eNB is the SeNB. FIG. 11 illustrates setting the SPS to each of the MeNB and the SeNB.

In Step ST1001, the MeNB notifies the UE of activation using the PDCCH with the uplink grant of the uplink SPS. The UE receives the PDCCH and activates the uplink SPS. In other words, the uplink SPS starts to be executed.

In Steps ST1002 to ST1007, the UE transmits the uplink data to the MeNB with the uplink SPS resources set to the MeNB.

In Step ST1008, the SeNB notifies the UE of the activation using the PDCCH with the uplink grant of the uplink SPS. The UE receives the PDCCH and activates the uplink SPS.

In Step ST1009, the UE transmits the uplink data to the SeNB with the uplink SPS resources set to the SeNB. It is defined that the amount of transmission data generated in the UE is larger than or equal to a threshold in the DRAT. The UE transmits the data also to the MeNB, which is not illustrated.

Thus, part of the uplink data generated in the UE is transmitted to the MeNB, and the remaining uplink data is transmitted to the SeNB.

Assume a case where no uplink data is generated in the UE with the uplink SPS resources set to the SeNB in Step ST1010. Since the amount of the uplink data is smaller than or equal to the threshold in the DRAT, the UE determines not to transmit the uplink data to the SeNB, and does not perform the padding transmission.

When the uplink data is not consecutively generated in the UE with the uplink SPS resources set to the SeNB in Steps ST1010 and 1011, the amount of the uplink data is smaller than or equal to the threshold in the DRAT as well. Thus, the UE determines not to transmit the uplink data to the SeNB, and does not perform the padding transmission.

Even when the uplink transmission data is not generated consecutively for the number of before-release empty transmissions (twice in FIG. 11), the padding transmission is not performed. Thus, the UE cannot determine whether to clear the SPS resources in Step ST1012. Moreover, the eNB cannot determine whether to release the SPS resources.

These cause an unstable operation between the eNB and the UE, which may lead to a malfunction.

Thus, a high-speed and stable communication system which enables the SPS upon execution of the DRAT in the uplink split bearer needs to be provided.

The first embodiment will disclose a method for solving such problems.

When the SPS is set, the uplink data is transmitted to both the 1st eNB and the 2nd eNB.

Such methods include, for example, preventing provision of a DRAT threshold when the SPS is set. An alternative method is disabling the set DRAT threshold when the SPS is set. Consequently, the threshold is eliminated or disabled when the SPS is set, so that the uplink data is transmitted to both the 1st eNB and the 2nd eNB.

The DRAT threshold for the SPS may be provided. With such provision, the DRAT threshold for the SPS can be set to a different value from a DRAT threshold for non-SPS, and an DRAT operation for the SPS can be different from that for the non-SPS.

The alternative method for transmitting the uplink data to both of the eNBs is, for example, setting a negative value to the DRAT threshold for the SPS. This method may be applied when the amount of the uplink data is larger than the DRAT threshold and the uplink data is transmitted to both of the eNBs.

Alternatively, 0 is set to the DRAT threshold for the SPS. This method may be applied when the amount of the uplink data is larger than or equal to the DRAT threshold and the uplink data is transmitted to both of the eNBs.

Consequently, the uplink data is transmitted to both the 1st eNB and the 2nd eNB when the SPS is set.

Since the uplink data is transmitted to both the 1st eNB and the 2nd eNB using such a method when the SPS is set, the padding transmission is also possible. Thus, the implicit release is possible.

Transmission of the uplink data to both the 1st eNB and the 2nd eNB when the SPS is set may be statically determined in, for example, a standard or notified to the UE together with the SPS settings. Alternatively, it may be notified to the UE together with the SPS activation.

When the SPS is set, the following is statically determined in, for example, a standard: preventing provision of the DRAT threshold; disabling the set DRAT threshold; setting a negative value to the DRAT threshold; or setting 0 to the DRAT threshold. Consequently, the eNB and the UE can obtain the mutual recognition. Since there is no need to signal these pieces of information, the signaling load can be reduced.

As an alternative example, information for disabling the set DRAT threshold may be provided and notified to the UE together with the SPS settings. Alternatively, a negative value or 0 may be notified to the UE as the DRAT threshold, together with the SPS settings.

These may be notified to the UE separately from the SPS settings. Notifying the information for disabling the set DRAT threshold together with the SPS settings can reduce the signaling load. Since the timing can coincide with that of the SPS settings, the possibility of the unstable operation and the malfunction can be reduced. The UE-dedicated RRC signaling may be used for such notification.

As an alternative example, information for disabling the set DRAT threshold may be provided and notified to the UE together with the SPS activation. Alternatively, a negative value or 0 may be notified to the UE as the DRAT threshold, together with the SPS activation.

These may be notified to the UE separately from the SPS activation. Notifying the information for disabling the set DRAT threshold together with the SPS activation can reduce the signaling load. Since the timing can coincide with that of the SPS activation, the possibility of the unstable operation and the malfunction can be reduced. An L1/L2 control signal may be used for such notification.

A method for canceling a state of transmitting the uplink data to both the 1st eNB and the 2nd eNB as previously set will be disclosed.

When the SPS settings are canceled as described above, cancellation of the state is statically determined in, for example, a standard. The same advantages as previously described can be produced.

Alternatively, information for enabling the set DRAT threshold may be provided, and included in signaling for disabling the SPS settings to be notified to the UE. Alternatively, the DRAT threshold to be set again may be included in the signaling for disabling the SPS settings to be notified to the UE. Alternatively, the state may be canceled via the signaling for disabling the SPS settings. Consequently, the DRAT threshold can be restored to a conventional value, and the same advantages as previously described can be produced.

Alternatively, information for enabling the set DRAT threshold may be provided, and included in SPS deactivation to be notified to the UE. Alternatively, the DRAT threshold to be set again may be included in the SPS deactivation to be notified to the UE. Alternatively, the state may be canceled by the SPS deactivation. Consequently, the DRAT threshold can be restored to a conventional value, and the same advantages as previously described can be produced.

The padding transmission is possible because the uplink data is transmitted to both the 1st eNB and the 2nd eNB according to the method disclosed above when the SPS is set. Thus, the implicit release is possible.

Consequently, the possibility of the unstable operation between the eNB and the UE and the malfunction can be reduced.

Figure 12:
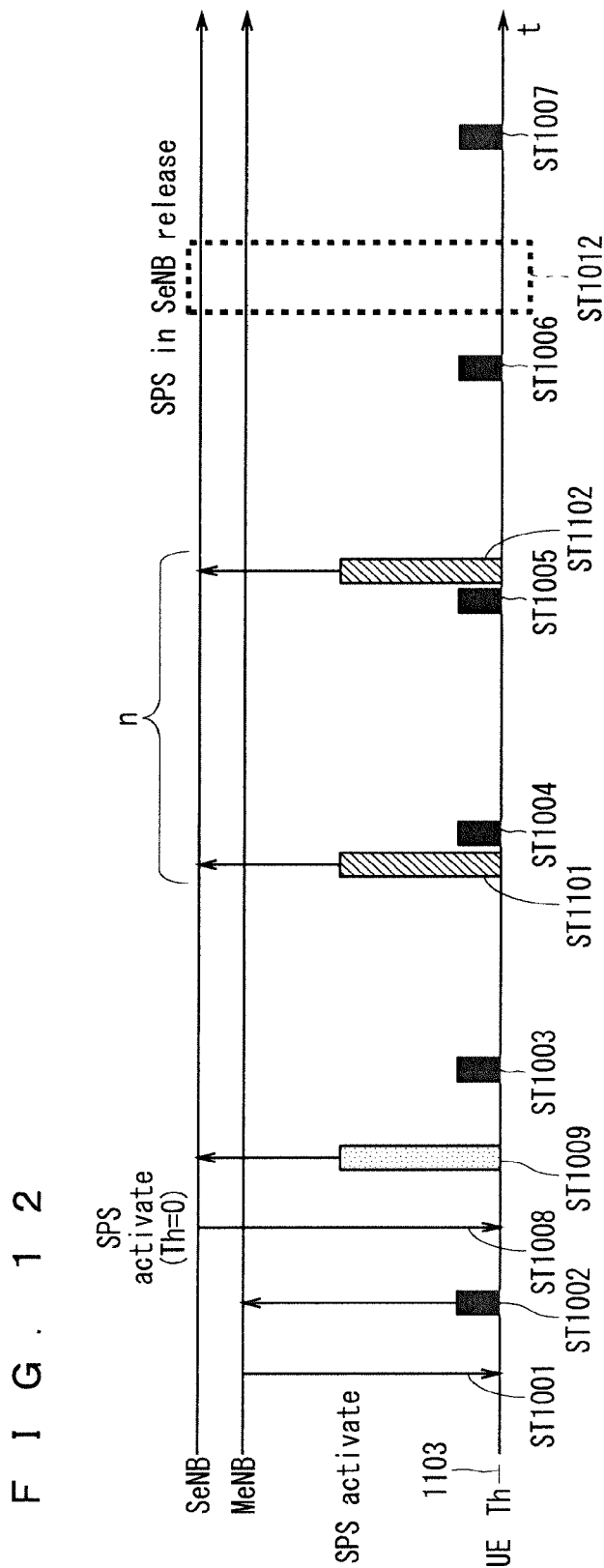
FIG. 12 illustrates setting 0 to a DRAT threshold when the SPS is set.

FIG. 12 illustrates setting 0 to the DRAT threshold when the SPS is set. FIG. 12 illustrates transmission of the uplink data only to the 1st eNB when the amount of the uplink data is smaller than the DRAT threshold and transmission of the uplink data to both the 1st eNB and the 2nd eNB when the amount of the uplink data is larger than or equal to the DRAT threshold. The 1st eNB is the MeNB, and the 2nd eNB is the SeNB. FIG. 12 illustrates setting the SPS to each of the MeNB and the SeNB.

Since FIG. 12 is similar to FIG. 11, the differences will be mainly described.

A DRAT threshold 1103 is set to 0.

In Step ST1008, the SeNB notifies the UE of activation using the PDCCH with the uplink grant of the uplink SPS. Information for setting 0 to the DRAT threshold is included in notification for the activation. The UE sets 0 to the DRAT threshold as well as receiving the PDCCH and activating the uplink SPS.

In Step ST1009, the UE transmits the uplink data to the SeNB with the uplink SPS resources set to the SeNB. Since the DRAT threshold is set to 0, the uplink transmission data generated in the UE can be transmitted to the SeNB. The UE can transmit the data also to the MeNB, which is not illustrated. Thus, part of the uplink data generated in the UE is transmitted to the MeNB, and the remaining uplink data is transmitted to the SeNB.

Assume a case where no uplink data is generated in the UE with the uplink SPS resources set to the SeNB in Step ST1101. The uplink data can be transmitted to the SeNB even when none of the uplink data is generated, because the DRAT threshold is 0. Thus, the UE determines that the padding transmission is possible, and thus performs the padding transmission to the SeNB. Consequently, the padding transmission is possible even without any uplink transmission data between the SeNB and the UE.

When the uplink data is not consecutively generated in the UE with the uplink SPS resources set to the SeNB in Steps ST1101 and ST1102, the amount of the uplink data is larger than or equal to the DRAT threshold as well. Thus, the UE can transmit the uplink data to the SeNB. Thus, the UE determines that the padding transmission is possible, and thus performs the padding transmission.

When the padding transmission is performed without any uplink transmission data generated consecutively the number of times set as the number of before-release empty transmissions, the UE clears the SPS resources and the eNBs release the SPS resources in Step ST1012.

Consequently, the eNBs and UE normally perform the implicit release.

With the method disclosed above, the uplink data can be transmitted to both of the eNBs not only from the timing with which the SPS resources are allocated but also from the timing with which the SPS is set or activated to release or deactivation of the SPS. Then, data will be generated.

Thus, even when the amount of the uplink transmission data generated in the UE is less from the timing with which the SPS is set or activated to release or deactivation of the SPS, the uplink data is always transmitted also to the 2nd eNB, which increases the power consumption of the UE.

A method for solving such a problem will be disclosed.

Only with the timing with which the SPS resources are allocated, the uplink data is transmitted to both the 1st eNB and the 2nd eNB. In synchronization with the timing with which the SPS resources are allocated, the uplink data is transmitted to both the 1st eNB and the 2nd eNB.

Consequently, a duration during which the uplink data is transmitted can be shortened for the 2nd eNB. Thus, increase in the power consumption of the UE can be suppressed.

According to the first embodiment, in the case where the SeNB is set to communicate with a communication terminal device with the radio resources set for the SPS, that is, the radio resources periodically allocated, when the amount of transmission data is smaller than or equal to the threshold Th, the threshold Th is changed so that the transmission data is transmitted to the MeNB and the SeNB. The threshold Th is set to, for example, zero (0) as according to the first embodiment.

Consequently, the SeNB can communicate through the SPS. Thus, a communication system capable of a stable communication operation between the UE and each of the MeNB and the SeNB can be provided. In other words, since the SPS is possible when the DRAT is executed in the uplink split bearer, a high-speed and stable communication system can be provided.

The threshold Th may be changed when the amount of transmission data is smaller than the threshold Th. Specifically, in the case where the SeNB is set to communicate with a communication terminal device with the radio resources set for the SPS, that is, the radio resources periodically allocated, when the amount of transmission data is smaller than the threshold Th, the threshold Th may be changed so that the transmission data is transmitted to the MeNB and the SeNB. Here, the threshold Th is set to, for example, zero (0) as according to the first embodiment.

The same advantages as those according to the first embodiment can be produced. Specifically, the SeNB can communicate through the SPS. Thus, a communication system capable of a stable communication operation between the UE and each of the MeNB and the SeNB can be provided. In other words, since the SPS is possible when the DRAT is executed in the uplink split bearer, a high-speed and stable communication system can be provided.

Second Embodiment

With the method disclosed in the first embodiment, the DRAT threshold cannot be substantially set. Thus, the power consumption of the UE will be increased.

The DRAT threshold is used when the uplink transmission data is distributed from the PDCP to the RLC/MAC in the UE. Thus, transmission of the uplink data to both of the eNBs in synchronization with the resource allocation timing of the set SPS requires detailed time management in synchronization with the timing of the SPS when the uplink transmission data is distributed.

This may cause a malfunction due to, for example, fluctuation in the timing with which the uplink transmission data is generated and fluctuation in the processing time of the PDCP.

The second embodiment will disclose a method different from that disclosed in the first embodiment to solve the problems disclosed in the first embodiment.

The implicit release is supported also for the 2nd eNB. When the SPS is set to the 2nd eNB, the UE can perform the padding transmission to the 2nd eNB. When the SPS is set to the 2nd eNB and even the amount of the uplink transmission data is smaller than the DRAT threshold with the set SPS resources, the UE also performs the padding transmission to the 2nd eNB. Accordingly, the implicit release becomes possible.

In the padding transmission, the MAC PDU including at least one of a padding bit and a padding BSR is transmitted as conventionally performed. Thus, control in the eNB and the UE can be simplified with the conventional padding transmission.

The UE clears the SPS settings when performing the padding transmission to the 2nd eNB consecutively the number of times set as the number of before-release empty transmissions. The 2nd eNB releases the SPS resources upon receipt of the padding transmission from the UE consecutively the number of times set as the number of before-release empty transmissions.

Figure 13:
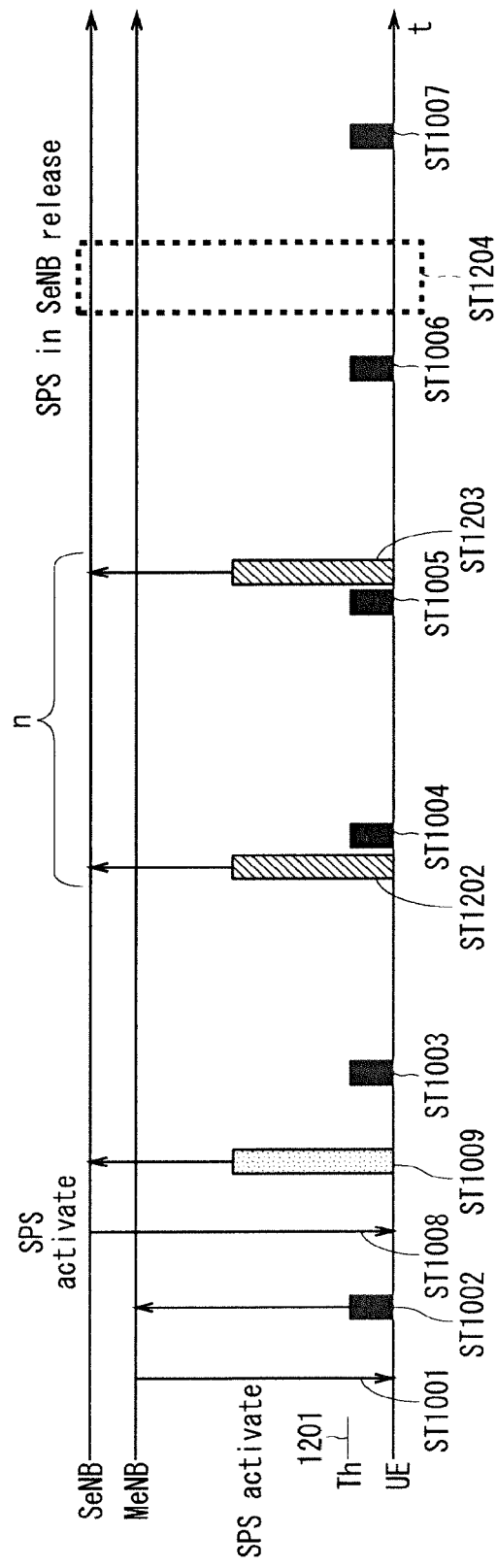
FIG. 13 illustrates a method for supporting implicit release when the SPS is set to the 2nd eNB.

FIG. 13 illustrates a method for supporting the implicit release when the SPS is set to the 2nd eNB. The 1st eNB is the MeNB, and the 2nd eNB is the SeNB. FIG. 13 illustrates setting the SPS to each of the MeNB and the SeNB. Since FIG. 13 is similar to FIGS. 11 and 12, the differences will be mainly described.

A DRAT threshold 1201 is set to an arbitrary value Th.

In Step ST1008, the SeNB notifies the UE of activation using the PDCCH with the uplink grant of the uplink SPS. The activation may be normal.

Assume a case where no uplink data is generated in the UE with the uplink SPS resources set to the SeNB in Step ST1202. When the amount of the uplink data is smaller than the DRAT threshold but the SPS is set to the SeNB, the padding transmission to the SeNB is possible. Thus, the UE performs the padding transmission to the SeNB.

Consequently, the padding transmission is possible even when there is no uplink transmission data between the SeNB and the UE.

When the uplink data is not consecutively generated in the UE with the uplink SPS resources set to the SeNB in Steps ST1202 and ST1203, the amount of the uplink data is larger than or equal to the DRAT threshold as well. Thus, the UE can transmit the uplink data to the SeNB. Thus, the UE determines that the padding transmission is possible, and thus performs the padding transmission.

When the padding transmission is performed without any uplink transmission data generated consecutively the number of times set as the number of before-release empty transmissions, the UE clears the SPS resources and the eNB releases the SPS resources in Step ST1204.

Consequently, the SeNB and UE normally perform the implicit release.

When the SPS is set to the 2nd eNB with the UL split bearer using the method disclosed in the second embodiment, the implicit release can be supported.

Since the eNB and the UE can determine whether to release the SPS resources with the implicit release, the unstable operation and the malfunction can be reduced.

Thus, the conventional SPS operations become possible when the SPS is set to the 2nd eNB with the UL split bearer.

Unlike the method according to the first embodiment, an arbitrary value can be set to the DRAT threshold for the 2nd eNB. Thus, even when a smaller amount of the uplink transmission data is generated since the setting of the SPS to its disablement, in the case where the amount of the uplink data is smaller than the DRAT threshold, there is no need to transmit the uplink data to the 2nd eNB. Thus, increase in the power consumption of the UE can be reduced.

The malfunction can be reduced because of no need for detailed dynamic control in setting the DRAT threshold.

According to the second embodiment, in the case where the SeNB is set to communicate with a communication terminal device with the radio resources set for the SPS, that is, the radio resources periodically allocated, when the amount of transmission data is smaller than or equal to the threshold Th, the communication terminal device is set to transmit the transmission data to the MeNB and to transmit an end signal representing an end of the communication with the radio resources periodically allocated to the SeNB, specifically, perform the padding transmission to the SeNB.

Consequently, the SeNB can end the communication through the SPS. Thus, the communication system capable of a stable communication operation between the UE and each of the MeNB and the SeNB can be provided. In other words, since the SPS is possible when the DRAT is executed in the uplink split bearer, a high-speed and stable communication system can be provided.

The settings for the padding transmission described above may be made when the amount of transmission data is smaller than the threshold Th. Specifically, in the case where the SeNB is set to communicate with a communication terminal device with the radio resources set for the SPS, that is, the radio resources periodically allocated, when the amount of transmission data is smaller than the threshold Th, the communication terminal device may be set to transmit the transmission data to the MeNB and to transmit an end signal representing an end of the communication with the radio resources periodically allocated to the SeNB, specifically, perform the padding transmission to the SeNB.

Thus, the same advantages as those according to the second embodiment can be produced. Specifically, the SeNB can end the communication through the SPS. Thus, a communication system capable of a stable communication operation between the UE and each of the MeNB and the SeNB can be provided. In other words, since the SPS is possible when the DRAT is executed in the uplink split bearer, a high-speed and stable communication system can be provided.

First Modification of Second Embodiment

The first modification will disclose another method for solving the problems described in the second embodiment. Information indicating no transmission data is provided, and transmitted from the UE to the eNB using an uplink L1/L2 control signal. The uplink L1/L2 control signal is, for example, a PUCCH. In the absence of the transmission data with the timing of the set SPS, the UE maps the information indicating no transmission data to the PUCCH, and transmits the PUCCH to the eNB. The eNB receives the PUCCH from the UE with the timing of the set SPS, and recognizes no uplink transmission data upon obtainment of the information indicating no transmission data.

When transmitting the information indicating no transmission data consecutively the number of times set as the number of before-release empty transmissions, the UE clears the SPS resources. Upon receipt of the information indicating no transmission data from the UE consecutively the number of times set as the number of before-release empty transmissions, the eNB releases the SPS resources.

Accordingly, the implicit release can be supported.

The configuration of the PUCCH to which the information indicating no transmission data is mapped is set by the eNB, and notified to the UE in advance. The configuration of the PUCCH includes, for example, resources in the frequency axis direction, resources in the time axis direction, and a sequence used as a reference signal (RS) for the PUCCH.

For example, a sub-carrier and a resource block, etc. may be set as the resources in the frequency axis direction. The minimum resources may be set as the resources. The minimum resources may be the smallest unit in transmission. The smallest unit may be, for example, one Physical Resource Block (abbreviated as PRB). The timing with which the PUCCH is to be transmitted may be set as the resources in the time axis direction. The timing with which the PUCCH is to be transmitted may be set to any, and may be the timing with which the SPS resources are set. Consequently, control over the timing in the UE and the eNB can be simplified.

The RS sequence used for the PUCCH may be set for each cell or for each beam. Even when a plurality of UEs transmit the respective PUCCHs with the same SPS resource timing, making the resources of the PUCCHs in the frequency axis direction different for each of the UEs enables the eNB to receive the PUCCHs. Alternatively, the RS sequence used for the PUCCH may be UE-dedicated. The PUCCHs with the same resources in the frequency axis direction and the time axis direction can be shared among the plurality of UEs. In the presence of PUCCHs of a plurality of UEs with the same resources, the eNB can receive the PUCCH of each of the UEs using the UE-dedicated RS.

The eNB may include the configuration of the PUCCH in the SPS settings, and notify the settings to the UE. Alternatively, the eNB may include the configuration of the PUCCH in the SPS activation, and notify the activation to the UE.

The conventional PUCCH configuration may be used as the configuration of the PUCCH to which the information indicating no transmission data is mapped. In the absence of the uplink transmission data with the set SPS resource timing, the UE maps the information indicating no transmission data to the PUCCH, using the conventional PUCCH configuration. The UE transmits the PUCCH with the set SPS resource timing. With the conventional PUCCH configuration, the eNB need not separately set the PUCCH to which the information indicating no transmission data is mapped.

As an alternative method, the information indicating no transmission data may be mapped to a PUSCH. In the absence of the transmission data with the timing of the set SPS, the UE maps the information indicating no transmission data to the PUSCH, and transmits the PUSCH to the eNB.

The eNB receives the PUSCH from the UE with the timing of the set SPS, and recognizes no uplink transmission data upon obtainment of the information indicating no transmission data.

The SPS resources have already been set with the timing of the SPS. Resources for transmitting the uplink data are set as the SPS resources. Since the PUSCH is used for transmitting the uplink data, resources for the PUSCH are set.

The UE has already obtained the uplink grant for the PUSCH resources for the SPS set by the eNB. Thus, the UE can use resources for transmitting the PUSCH for the set SPS.

There is no need to separately set the configuration of the PUCCH, using the PUSCH resources for the SPS that have already been set with the timing of the SPS. Consequently, the use efficiency of the resources can be increased, and the signaling load can be reduced.

The PUSCH resources for transmitting the information indicating no transmission data may be a part or the entirety of the PUSCH resources for the SPS set with the timing of the SPS.

The transmission method using the PUCCH may be applied to the RS sequence used for the PUSCH.

As an alternative method, a sounding reference signal (SRS) may indicate no transmission data. Particular SRS resources indicating no transmission data are set. The minimum resource on the time axis may be one symbol. The eNB notifies the UE of settings of the SRS resources. The UE transmits the SRS with the SRS resources in the absence of the transmission data with the timing of the set SPS. The eNB can recognize no transmission data upon receipt of the SRS from the UE with the SRS resources at the timing of the SPS.

The transmission method using the PUCCH may be applied to a RS sequence used for the SRS.

As an alternative method, a RS sequence indicating no transmission data may be provided, and used for the RS for the PUCCH, the PUSCH, or the SRS. Which one of the PUCCH, the PUSCH, and the SRS is used may be statically predetermined, or notified from the eNB to the UE. The resources for the channel or the signal may be set separately to each UE.

The UE transmits a predetermined channel or signal using the RS sequence in the absence of the transmission data with the timing of the set SPS. The eNB can recognize no transmission data upon receipt of the predetermined channel or signal with the timing of the SPS.

With the method disclosed in the first modification, the radio resources necessary for transmission can be restricted to the minimum. Thus, enabling the transmission with the minimum resources can further reduce increase in the power consumption of the UE.

The method disclosed in the first modification may be applied only in the absence of the transmission data with the timing of the SPS set to the 2nd eNB. The normal padding transmission may be used for the other set SPSs.

Third Embodiment

The uplink transmission data with the data amount smaller than the DRAT threshold may be generated in the UL split bearer, with the timing of the SPS set to the 2nd eNB.

Application of the method disclosed in the second embodiment or the first modification of the second embodiment will cause the following problems.

When the uplink transmission data with the data amount smaller than the DRAT threshold is generated in the UE with the timing of the SPS set to the 2nd eNB, the uplink transmission data is not generated for the 2nd eNB despite the presence of the uplink transmission data. Thus, the UE performs the padding transmission to the 2nd eNB. Upon occurrence of such padding transmission consecutively the number of times set as the number of before-release empty transmissions, the implicit release disables the SPS settings and causes the SPS resources to be released in the UE and the 2nd eNB. In other words, the implicit release causes the SPS resources to be released despite the presence of the uplink transmission data with the timing of the set SPS.

After the implicit release causes the SPS resources to be released, when the uplink transmission data larger than or equal to the DRAT threshold is generated in the UE with the timing of the SPS set to the 2nd eNB, the SPS set to the 2nd eNB is not applied.

The UE cannot transmit the uplink data with the SPS resources even when the uplink transmission data is generated with the timing of the set SPS.

Although the UE generates the uplink transmission data with the timing of the set SPS and transmits the uplink data, the SPS resources for the 2nd eNB are released. Thus, the uplink data cannot be transmitted to the 2nd eNB with the set SPS resources.

Figure 14:
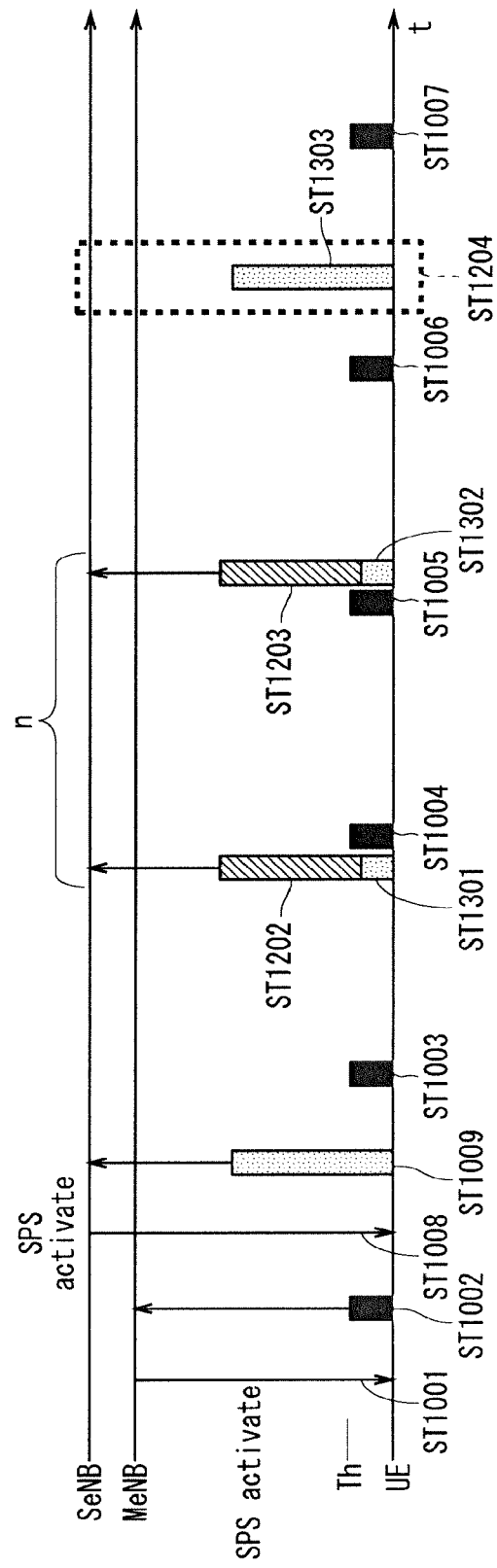
FIG. 14 illustrates generating uplink transmission data with a data amount smaller than the DRAT threshold.

FIG. 14 illustrates generating the uplink transmission data with the data amount smaller than the DRAT threshold. FIG. 14 illustrates execution of the method for supporting the implicit release when the SPS is set to the 2nd eNB as disclosed in the second embodiment.

The 1st eNB is the MeNB, and the 2nd eNB is the SeNB. FIG. 14 illustrates setting the SPS to each of the MeNB and the SeNB. Since FIG. 14 is similar to FIG. 13, the differences will be mainly described.

Assume a case where the uplink data with the data amount smaller than the DRAT threshold is generated in the UE with the uplink SPS resources set to the SeNB in Step ST1202.

In Step ST1301, the UE transmits the uplink data to the MeNB.

Since the uplink transmission data is not generated for the SeNB, the UE performs the padding transmission to the SeNB in Step ST1202.

When the uplink data with the data amount smaller than the DRAT threshold is consecutively generated in the UE with the uplink SPS resources set to the SeNB in Steps ST1202 and ST1203, the UE transmits the uplink data to the MeNB similarly in Steps ST1301 and ST1302. The UE performs the padding transmission to the SeNB.

When the padding transmission to the SeNB is performed without any uplink transmission data generated for the SeNB consecutively the number of times set as the number of before-release empty transmissions, the implicit release causes the UE to clear the SPS resources and also the eNBs to release the SPS resources in Step ST1204.

Then, assume a case where the uplink data with the data amount larger than or equal to the DRAT threshold is generated in the UE with the uplink SPS resources set to the SeNB in Step ST1303 after the implicit release.

Here, the UE transmits the uplink data to the MeNB, which is not illustrated.

Since the uplink transmission data is generated for the SeNB, the UE transmits the uplink data to the SeNB in Step ST1303. However, since the SPS resources have already been released, the SPS resources cannot be used for transmitting the uplink data.

Since the resources for the uplink transmission data are not allocated to the SeNB, the UE has to newly start transmitting a Scheduling Request (SR) signal. The UE has to transmit the SR signal to the SeNB, and receive the UL grant from the SeNB.

These will cause increase in the power consumption of the UE, reduction in the use efficiency of the resources due to increase in the PDCCH resources, and increase in the latency in transmitting data. The third embodiment will disclose a method for solving such problems.

When the uplink split bearer is set, the settings of the uplink SPS are not disabled. When the uplink split bearer is set, the uplink SPS resources may not be released. When the uplink split bearer is set, the implicit release may not be performed.

The UE does not clear the set SPS resources when: the uplink split bearer is set; the uplink SPS is set to the 2nd eNB; and even the padding transmission is performed consecutively the number of times set as the number of before-release empty transmissions. Even upon receipt of the padding transmission consecutively the number of times set as the number of before-release empty transmissions, the 2nd eNB does not release the set SPS resources.

The following (1) and (2) will be disclosed as specific examples of a method for preventing the settings of the uplink SPS from being disabled:

(1) statically determining the method in, for example, a standard; and (2) providing information indicating that the settings of the uplink SPS are not disabled, and notifying the information from the eNB to the UE.

When the uplink split bearer is set in the method (1), preventing the settings of the uplink SPS from being disabled is statically determined. Predetermining this in, for example, a standard enables the mutual recognition between the eNB and the UE. Thus, the consistent operations become possible, and the malfunction can be reduced.

The eNB notifies the UE of information indicating that the settings of the uplink SPS are not disabled in the method (2), which enables the dynamic settings for preventing the settings of the uplink SPS from being disabled when the uplink split bearer is set. Consequently, the flexible operation becomes possible according to a communication state and a load state.

The number of before-release empty transmissions of the UL may be used as the information indicating that the settings of the uplink SPS are not disabled in the method (2). A value indicating that the SPS settings are not disabled is provided as the number of before-release empty transmissions. Alternatively, a value indicating infinity is provided as the number of before-release empty transmissions. The value may be provided newly and separately from the existing values.

The eNB may notify the UE of the information indicating that the settings of the uplink SPS are not disabled in the method (2). The eNB that notifies the information may be the 1st eNB or the 2nd eNB. For example, when the 2nd eNB notifies the UE, the 2nd eNB may directly notify the UE, or the 2nd eNB may notify the UE through the 1st eNB. X2 signaling may be used to notify the information between the eNBs. Alternatively, S1 signaling may be used through the MME.

The following (1) to (3) will be disclosed as specific examples of the signaling method for notifying the information from the eNB to the UE.

(1) The RRC signaling: the information may be included in, for example, the signaling to set the SPS configuration to be notified.

(2) The MAC signaling: for example, a MAC Control Element (CE) including the information may be provided and notified via the MAC signaling.

(3) The L1/L2 signaling, for example, the PDCCH or the EPDCCH: for example, the information may be included in the SPS activation to be notified.

In such a method, the eNB notifies the UE of the information indicating that the settings of the uplink SPS are not disabled. Upon receipt of the information, the UE does not disable the settings of the uplink SPS. The implicit release is not performed and the settings of the uplink SPS are not disabled when: the uplink split bearer is set; the uplink SPS is set to the 2nd eNB; and even the padding transmission is performed consecutively the number of times set as the number of before-release empty transmissions.

Figure 15:
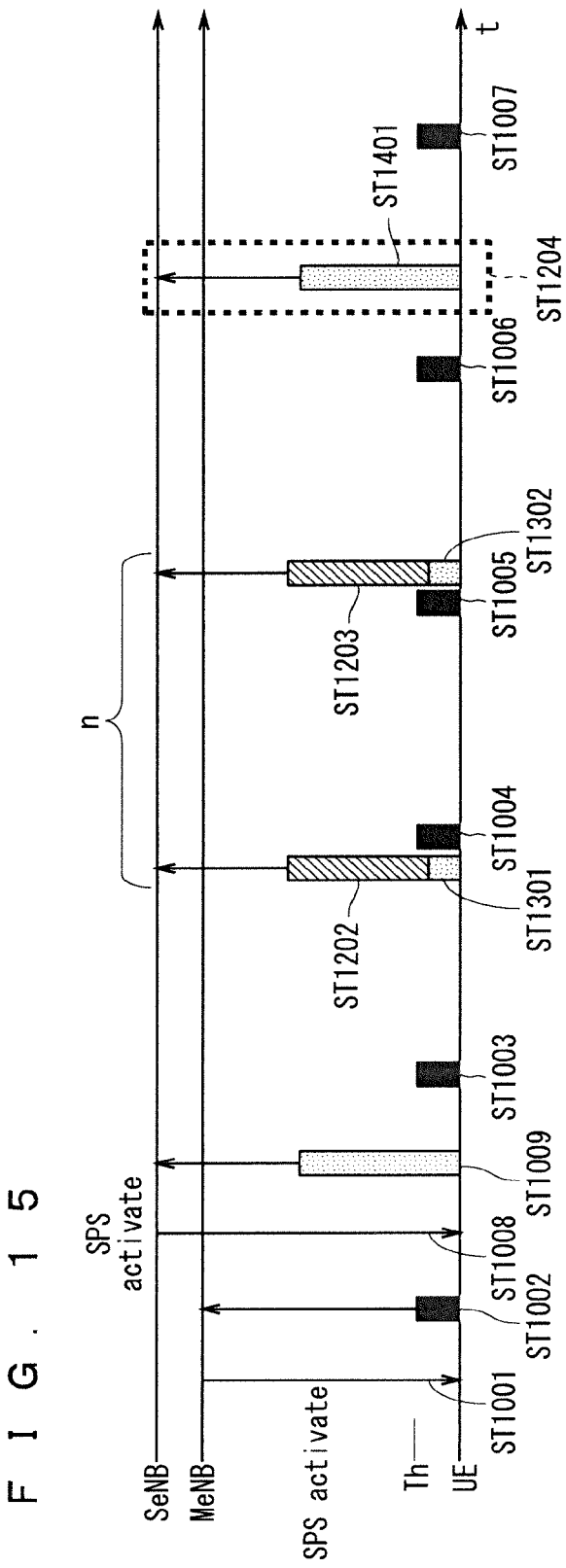
FIG. 15 illustrates a method for preventing settings of the uplink SPS from being disabled.

FIG. 15 illustrates a method for preventing the settings of the uplink SPS from being disabled. FIG. 15 illustrates the method for including the information indicating that the settings of the uplink SPS are not disabled in the SPS activation to be notified.

The 1st eNB is the MeNB, and the 2nd eNB is the SeNB. FIG. 15 illustrates setting the SPS to each of the MeNB and the SeNB. Since FIG. 15 is similar to FIG. 14, the differences will be mainly described.

In Step ST1008, the SeNB notifies the UE of activation using the PDCCH with the uplink grant of the uplink SPS. The information indicating that the settings of the uplink SPS are not disabled is included in the activation.

Upon receipt of the SPS activation from the SeNB, the UE executes the SPS with the set resources, and does not disable the settings of the uplink SPS. Even when the UE performs the padding transmission to the SeNB a predetermined number of times, the eNB and the UE are set not to perform the implicit release and prevent the settings of the uplink SPS from being disabled.

Assume a case where the uplink data with the data amount smaller than the DRAT threshold is generated in the UE with the timing of the SPS set to the SeNB in Step ST1202.

In Step ST1301, the UE transmits the uplink data to the MeNB.

Since the uplink transmission data is not generated for the SeNB, the UE performs the padding transmission to the SeNB in Step ST1202.

When the uplink data with the data amount smaller than the DRAT threshold is not consecutively generated in the UE with the timing of the SPS set to the SeNB in Steps ST1202 and ST1203, the UE transmits the uplink data to the MeNB as well in Steps ST1301 and ST1302. The UE performs the padding transmission to the SeNB.

Even when the padding transmission to the SeNB is performed without any uplink transmission data generated consecutively the number of times set as the number of before-release empty transmissions, the UE does not clear the SPS resources according to the settings for preventing the settings of the uplink SPS from being disabled in Step ST1204. The eNB does not release the SPS resources. In Step ST1204, the implicit release is not performed, and the SPS resources are not released.

Thus, when the uplink data with the data amount larger than or equal to the DRAT threshold is generated in the UE with the timing of the SPS set to the SeNB in Step ST1204 after performing the padding transmission to the SeNB consecutively the number of times set as the number of before-release empty transmissions, the UE can transmit the uplink data to the SeNB with the set SPS resources in Step ST1401.

The method disclosed in the third embodiment can prevent the SPS resources for the 2nd eNB from being released, despite the fact that the uplink transmission data is generated with the timing of the set SPS and the UE transmits the uplink data. Thus, the state where the uplink data generated with the set SPS resources cannot be transmitted to the 2nd eNB and the UE has to start from the transmission of a SR signal can be eliminated.

Consequently, it is possible to suppress increase in the power consumption of the UE, reduction in the use efficiency of the resources due to increase in the PDCCH resources, and increase in the latency in transmitting data.

According to the third embodiment, upon receipt of the information indicating that the settings of the uplink SPS are not disabled, the UE stops releasing the SPS resources that are radio resources allocated in the SPS. The information indicating that the settings of the uplink SPS are not disabled corresponds to release stop information indicating stopping release of the SPS resources. In other words, upon receipt of the release stop information, the UE stops releasing the SPS resources.

Consequently, it is possible to prevent the uplink data generated with the set SPS resources from not being transmitted to the SeNB and eliminate the state of forcibly starting to transmit a SR signal. Thus, it is possible to suppress increase in the power consumption of the UE, reduction in the use efficiency of the resources due to increase in the PDCCH resources, and increase in the latency in transmitting data.

Fourth Embodiment

According to the method disclosed in the third embodiment, the implicit release is not performed in the actual absence of the transmission data with the timing of the set SPS, and the SPS resources are not released.

Without the SPS resources being released, the 2nd eNB continues to allocate the SPS resources to the UE with the timing of the SPS.

Thus, continuing to allocate the PUSCH resources to the UE having no transmission data is useless, which reduces the use efficiency of the resources. The fourth embodiment will disclose a method for solving such problems.

A timer for a duration during which the SPS settings are not disabled is provided. The eNB sets the duration during which the SPS settings are not disabled, and notifies the UE of the duration.

For example, when preventing the settings of the uplink SPS from being disabled is set, the timer is used to start functions of the implicit release. The eNB notifies the UE of the duration during which the SPS settings are not disabled, together with information indicating the settings for the uplink SPS are not disabled. When preventing the settings of the uplink SPS from being disabled is set, the UE starts the timer. After a lapse of the duration during which the SPS settings are not disabled, the UE starts the implicit release, and stops the timer. Thus, when the padding transmission is performed consecutively the number of times set as the number of before-release empty transmissions, the implicit release is performed, and the uplink SPS resources are released.

The duration during which the SPS settings are not disabled may be expressed by the time, the number of radio frames, the number of subframes, the number of slots, or the number of symbols. The duration during which the SPS settings are not disabled may be a positive integer multiple of the timing interval of the set SPS. The duration during which the SPS settings are not disabled may be statically determined in, for example, a standard.

As an alternative method, the implicit release may be started when the number of padding transmissions reaches a predetermined number of times. The predetermined number of times the padding transmission is performed consecutively, which is disclosed in this fourth embodiment, may be different from the conventional number of before-release empty transmissions.

Specifically, implicitReleaseAfter_B>implicitReleaseAfter may hold, where "implicitReleaseAfter_B" denotes a parameter representing the predetermined number of times the padding transmission is performed consecutively, and "implicitReleaseAfter" denotes a parameter representing the conventional number of before-release empty transmissions.

Alternatively, implicitReleaseAfter_B=n×implicitReleaseAfter may hold, where n is a positive integer.

Thus, the implicit release can be started according to a duration with no uplink transmission data. The duration during which the settings of the uplink SPS are disabled can be set according to a state of generating the uplink transmission data.

The method disclosed in the fourth embodiment can eliminate a state where the implicit release is never performed while preventing the settings of the uplink SPS from being disabled is set.

Thus, the SPS resources need not be reserved for a long period of time, and waste of the PUSCH resources can be reduced. Accordingly, the use efficiency of the resources can be increased.

First Modification of Fourth Embodiment

The first modification will disclose another method for solving the problems described in the fourth embodiment.

Information indicating start of the implicit release is provided, and is notified from the eNB to the UE. For example, while preventing the settings of the uplink SPS from being disabled is set, the eNB notifies the UE of the information indicating start of the implicit release. Upon notification of the information, the eNB and the UE resume the implicit release. Thus, when the UE performs the padding transmission to the eNB consecutively the number of times set as the number of before-release empty transmissions, the implicit release is executed, and the settings of the uplink SPS are disabled.

The eNB notifies the UE of the information indicating start of the implicit release, which enables the implicit release to be started with an arbitrary timing. Consequently, the flexible operation becomes possible according to a communication state and a load state.

The number of before-release empty transmissions of the UL may be used as the information indicating start of the implicit release. The existing values may be set as the number of before-release empty transmissions. The implicit release is started when the number of before-release empty transmissions is set.

The eNB may notify the UE of the information indicating start of the implicit release. The eNB that notifies the information may be the 1st eNB or the 2nd eNB. For example, when the 2nd eNB notifies the UE, the 2nd eNB may directly notify the UE, or the 2nd eNB may notify the UE through the 1st eNB. The X2 signaling may be used to notify the information between the eNBs. Alternatively, the S1 signaling may be used through the MME.

The following (1) to (3) will be disclosed as specific examples of the signaling method for notifying the information indicating start of the implicit release from the eNB to the UE.

(1) The RRC signaling
(2) The MAC signaling: for example, a MAC CE including the information indicating start of the implicit release may be provided and notified via the MAC signaling.
(3) The L1/L2 signaling: the information may be notified, for example, using the PDCCH or the EPDCCH.

Thus, the method disclosed in the first modification can produce the same advantages as those according to the fourth embodiment.

The SPS resources can be flexibly set because the implicit release can be started with an arbitrary timing. Accordingly, the use efficiency of the PUSCH resources can be further increased.

As described above in the first modification, upon receipt of the information indicating start of the implicit release, the UE resumes releasing the SPS resource. The information indicating start of the implicit release corresponds to release resuming information indicating resuming release of the SPS. In other words, upon receipt of the release resuming information, the UE resumes releasing the SPS resources.

Thus, the same advantages as those according to the fourth embodiment can be produced. Specifically, the state where the implicit release is never performed while preventing the settings of the uplink SPS from being disabled is set can be eliminated. Thus, the SPS resources need not be reserved for a long period of time, and waste of the PUSCH resources can be reduced. Accordingly, the use efficiency of the resources can be increased.

Second Modification of Fourth Embodiment

The second modification will disclose another method for solving the problems described in the fourth embodiment. Information indicating disabling the settings of the uplink SPS is provided, and is notified from the eNB to the UE. For example, while preventing the settings of the uplink SPS from being disabled is set, the eNB notifies the UE of the information indicating disabling the settings of the uplink SPS. The eNB determines whether to disable the settings of the uplink SPS. When determining to disable the settings of the uplink SPS, the eNB notifies the UE of information indicating disabling the settings of the uplink SPS, and disables the settings of the uplink SPS. Upon receipt of the information indicating disabling the settings of the uplink SPS from the eNB, the UE disables the settings of the uplink SPS. Here, the UE disables the settings of the uplink SPS without performing the implicit release.

The eNB notifies the UE of the information indicating disabling the settings of the uplink SPS, which enables the settings of the uplink SPS to be disabled with an arbitrary timing. Consequently, the flexible operation becomes possible according to a communication state and a load state.

The number of before-release empty transmissions of the UL may be used as the information indicating disabling the settings of the uplink SPS. The existing values may be set as the number of before-release empty transmissions. When the number of before-release empty transmissions is set, disabling the settings of the uplink SPS may be indicated.

The eNB may notify the UE of the information indicating disabling the settings of the uplink SPS. The eNB that notifies the information may be the 1st eNB or the 2nd eNB. For example, when the 2nd eNB notifies the UE, the 2nd eNB may directly notify the UE, or the 2nd eNB may notify the UE through the 1st eNB. The X2 signaling may be used to notify the information between the eNBs. Alternatively, the S1 signaling may be used through the MME.

The following (1) to (3) will be disclosed as specific examples of the signaling method for notifying the information indicating disabling the settings of the uplink SPS from the eNB to the UE.

(1) The RRC signaling
(2) The MAC signaling: for example, a MAC CE including the information indicating disabling the settings of the uplink SPS may be provided and notified via the MAC signaling.
(3) The L1/L2 signaling: for example, the information may be notified using the PDCCH or the EPDCCH.

Figure 16:
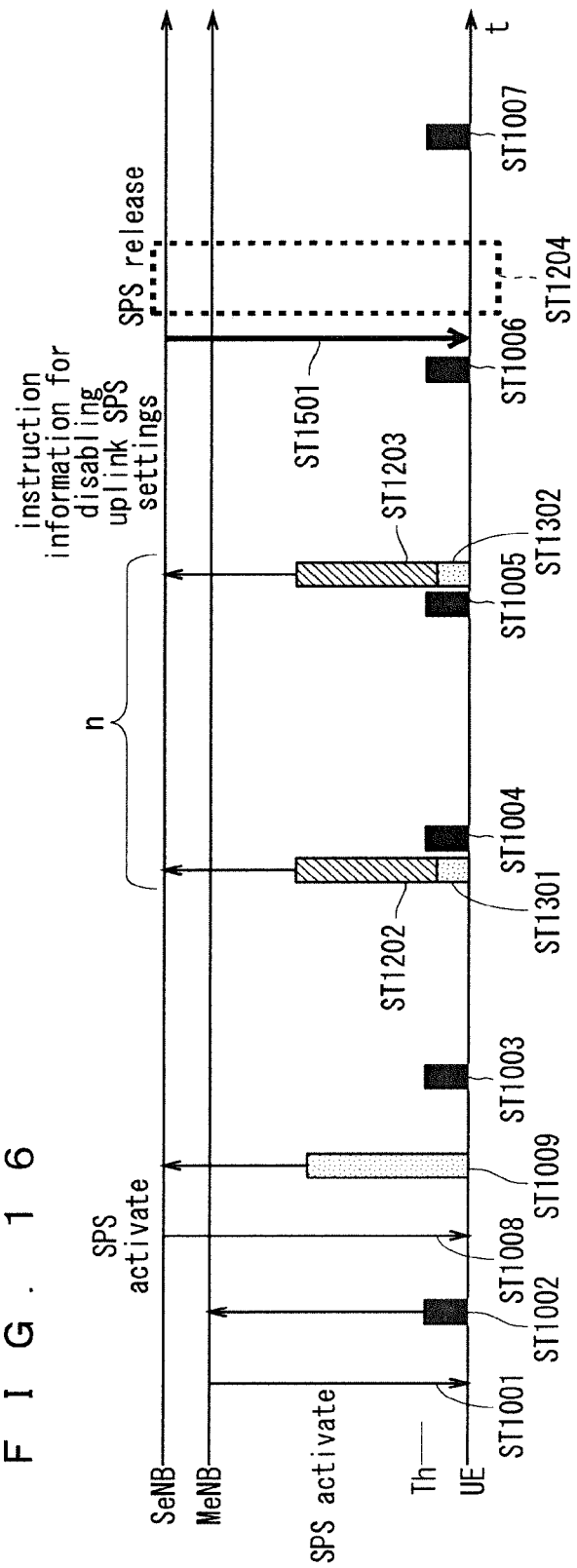
FIG. 16 illustrates a method for applying information indicating disabling the settings of the uplink SPS.

FIG. 16 illustrates a method for applying the information indicating disabling the settings of the uplink SP. The 1st eNB is the MeNB, and the 2nd eNB is the SeNB. FIG. 16 illustrates setting the SPS to each of the MeNB and the SeNB. Since FIG. 16 is similar to FIG. 15, the differences will be mainly described.

In Step ST1008, the SeNB notifies the UE of activation using the PDCCH with the uplink grant of the uplink SPS. The information indicating that the settings of the uplink SPS are not disabled is included in the activation.

Even when the padding transmission to the SeNB is performed without any uplink transmission data generated consecutively the number of times set as the number of before-release empty transmissions in Steps ST1202 and ST1203, the UE does not clear the SPS resources according to the settings for preventing the settings of the uplink SPS from being disabled. The eNB does not release the SPS resources. The implicit release is not performed, and the SPS resources are not released.

In Step ST1501, the SeNB sets the information indicating disabling the settings of the uplink SPS, and notifies the information to the UE. Upon notification of the information indicating disabling the settings of the uplink SPS, the eNB disables the settings of the uplink SPS. Upon receipt of the information indicating disabling the settings of the uplink SPS, the UE disables the settings of the uplink SPS.

With the settings of the uplink SPS being disabled, the set SPS resources are released in Step ST1204 that is the timing of the SPS from then on. Consequently, the eNB can allocate the SPS resources to the other UEs.

The following (1) to (6) will be disclosed as specific examples of a method in which the eNB determines whether to disable the settings of the uplink SPS:

(1) a duration since the SPS settings;

(2) a duration since preventing the SPS settings from being disabled is set;

(3) the number of consecutive receptions of the padding transmissions;

(4) the load amount in its own eNB;

(5) the communication quality with the UE; and (6) the state of generating the uplink transmission data for the 1st eNB.

In the method (1) above, after a lapse of a predetermined duration since the settings of the uplink SPS, the settings of the uplink SPS are determined to be disabled. The predetermined duration may be expressed by the time, the number of radio frames, the number of subframes, the number of slots, or the number of symbols. The predetermined duration may be a positive integer multiple of the timing interval of the set SPS.

In the method (2) above, after a lapse of a predetermined duration since preventing the settings of the uplink SPS from being disabled is set, the settings of the uplink SPS are determined to be disabled.

In the method (3) above, upon consecutive receipt of the padding transmission a predetermined number of times, the settings of the uplink SPS are determined to be disabled. The predetermined number of times the padding transmission is received may be the number of before-release empty transmissions. Alternatively, the predetermined number of times may be a value larger than the number of before-release empty transmissions.

In the method (4) above, the determination is made using the load amount in its own eNB. When the load is higher than or equal to a predetermined value, the SPS settings are determined to be disabled. When the load is lower than the predetermined value, the SPS settings are determined not to be disabled. When the load is higher than the predetermined value, a shortage of the resources caused by the higher load is reduced by releasing the resources allocated for the SPS to enable the allocation to the other UEs.

In the method (5) above, the determination is made using the communication quality with the UE. When the communication quality is smaller than a predetermined value, the SPS settings are determined to be disabled. When the communication quality is larger than or equal to the predetermined value, the SPS settings are determined not to be disabled. The lower communication quality may be caused by poor communication quality of the resources for the SPS that have already been set. In such a case, the communication quality will be increased by reallocating the resources for the SPS. Thus, disabling the SPS settings when the communication quality is lower may enable the SPS to be set again as necessary. Consequently, the communication quality can be increased. Furthermore, earlier release of the resources with poor communication quality can increase the use efficiency of the resources.

In the method (6) above, the 2nd eNB recognizes the state of generating the uplink transmission data for the 1st eNB, and determines whether to disable the settings of the uplink SPS.

The following (6-1) and (6-2) will be disclosed as specific examples of a method in which the 2nd eNB recognizes the state where the uplink transmission data is generated for the 1st eNB.

(6-1) The 2nd eNB obtains information on occurrence of the uplink transmission data from the 1st eNB.

The 1st eNB may notify the 2nd eNB of whether the uplink transmission data is generated for its own eNB (1st eNB), with the timing of the SPS set to the 2nd eNB.

The 2nd eNB may notify, in advance, the 1st eNB of the timing of the SPS set to its own eNB. Consequently, the 1st eNB can recognize whether to receive the uplink transmission data from the UE, with the timing of the SPS set to the 2nd eNB. Upon receipt of the uplink transmission data from the UE with the timing of the SPS set to the 2nd eNB, the 1st eNB determines the presence of the uplink transmission data. Without receiving the uplink transmission data from the UE, the 1st eNB determines the absence of the uplink transmission data.

The 1st eNB notifies the 2nd eNB of the presence or absence of the uplink transmission data for its own eNB. The 1st eNB may notify it only in the presence or absence of the uplink transmission data for its own eNB.

Upon receipt of information on the presence or absence of the uplink transmission data for its own eNB, the 2nd eNB can determine whether the uplink transmission data exists for the 1st eNB. The 2nd eNB determines whether to disable the settings of the uplink SPS, using the information on the presence or absence of the uplink transmission data for its own eNB.

For example, upon consecutive receipt of information on the absence of the uplink transmission data for the 1st eNB a predetermined number of times, the settings of the uplink SPS may be determined to be disabled.

The 2nd eNB may notify the 1st eNB of to which bearer the 2nd eNB sets the SPS.

The 1st eNB may determine whether the uplink transmission data is generated in the bearer.

This is effective at enabling a specific bearer to be identified when the SPS is set to the specific bearer.

The 1st eNB may notify the 2nd eNB of the number of consecutive times representing how many consecutive times the uplink transmission data is not generated.

Alternatively, the 2nd eNB may notify, in advance, the 1st eNB of the number of consecutive times. The 1st eNB counts the number of times the uplink transmission data cannot be received with the timing of the SPS set to the 2nd eNB, and notifies the 2nd eNB upon reaching the number of consecutive times.

A message requesting the SPS settings to be disabled may be newly provided between the eNBs. For example, the 1st eNB counts the number of times the uplink transmission data cannot be received with the timing of the SPS set to the 2nd eNB, and notifies the 2nd eNB of the message requesting the SPS settings to be disabled when reaching the number of consecutive times.

Upon receipt of the message requesting the SPS settings to be disabled, the 2nd eNB may determine to disable the settings of the uplink SPS.

The X2 signaling or the S1 signaling may be used to notify the information between the eNBs. The information may be notified via the X2 signaling, or via the S1 signaling through the MME.

(6-2) The 2nd eNB measures and detects the uplink power at the 1st eNB with the timing of the SPS.

The 1st eNB may notify, in advance, the 2nd eNB of the uplink carrier frequency and the bandwidth of the 1st eNB. When the SPS is set to the 1st eNB with the timing of the SPS set to the 2nd eNB, the SPS resources may be notified to the 2nd eNB.

The 2nd eNB measures the uplink power with the timing of the set SPS at the uplink carrier frequency and the bandwidth of the 1st eNB. When the SPS is set to the 1st eNB as described above, the uplink power with the SPS resources may be measured.

For example, the received signal strength indicator (abbreviated as RSSI) or interference over thermal noise (IoT) may be measured as the uplink power.

When the measured uplink power is higher than a predetermined threshold, it is determined that the 1st eNB has transmitted data. When the measured uplink power is lower than the predetermined threshold, it is determined that the 1st eNB has not transmitted the data.

When it is determined that the 1st eNB has not transmitted the data, the 2nd eNB may determine to disable the settings of the uplink SPS.

The method in which the eNB determines whether to disable the settings of the uplink SPS, which is disclosed in the second modification, is applicable to the method for determining whether to start the implicit release which is disclosed in the first modification of the fourth embodiment.

Thus, the method disclosed in the second modification can produce the same advantages as those according to the first modification of the fourth embodiment.

The SPS resources can be released by immediately disabling the SPS settings, without any need for performing the implicit release. Accordingly, the use efficiency of the PUSCH resources can be further increased.

Fifth Embodiment

The fifth embodiment will disclose another method for solving the problems described in the fourth embodiment. The padding transmission in the absence of the uplink transmission data with the timing of the set SPS is performed differently from the padding transmission in the presence of the uplink transmission data with the timing of the set SPS.

If there is no uplink transmission data, the UE performs the padding transmission in the absence of the uplink transmission data. If there is the uplink transmission data, the UE performs the padding transmission in the presence of the uplink transmission data. Upon receipt of the different padding transmission, the eNB determines the presence or absence of the uplink transmission data from the UE with the timing of the set SPS. Upon receipt of the padding transmission in the absence of the uplink transmission data, the eNB determines the absence of the uplink transmission data, and performs the implicit release. Upon receipt of the padding transmission in the presence of the uplink transmission data, the eNB determines the presence of the uplink transmission data, and does not count the padding transmission as the padding transmission in the absence of the uplink transmission data. Alternatively, the eNB may not perform uplink implicit release.

FIGS. 17 and 18 illustrate a method for performing the padding transmission in the absence of the uplink transmission data and performing the padding transmission in the presence of the uplink transmission data in a different manner. The 1st eNB is the MeNB, and the 2nd eNB is the SeNB. FIGS. 17 and 18 illustrate that the amount of the uplink transmission data is smaller than or equal to the DRAT threshold (Th). FIGS. 17 and 18 illustrate that the SPS is set to the SeNB.

FIG. 17 illustrates the absence of the uplink transmission data with the timing of the SPS set to the SeNB. FIG. 18 illustrates the presence of the uplink transmission data with the timing of the SPS set to the SeNB. The padding transmission in the absence of the uplink transmission data will be referred to as "padding (A) transmission". The padding transmission in the presence of the uplink transmission data will be referred to as "padding (B) transmission".

Since FIGS. 17 and 18 are similar to FIG. 9, the differences will be mainly described.

As illustrated in FIG. 17, the UE 905 performs the padding (A) transmission to the SeNB 902 in the absence of the uplink transmission data with the timing of the SPS set to the SeNB 902 as denoted by an arrow mark 1601. Without any uplink transmission data, the UE 905 does not transmit the uplink data to the MeNB 901.

As illustrated in FIG. 18, the UE 905 performs the padding (B) transmission to the SeNB 902 in the presence of the uplink transmission data with the timing of the SPS set to the SeNB 902 as denoted by an arrow mark 1602. With the uplink transmission data, the UE 905 transmits the uplink data to the MeNB 901 as denoted by an arrow mark 1603.

FIGS. 19 and 20 illustrate a method for performing the padding transmission in the absence of the uplink transmission data and performing the padding transmission in the presence of the uplink transmission data in a different manner. The padding transmission in the absence of the uplink transmission data will be referred to as the "padding (A) transmission". The padding transmission in the presence of the uplink transmission data will be referred to as the "padding (B) transmission".

The 1st eNB is the MeNB, and the 2nd eNB is the SeNB. FIGS. 19 and 20 illustrate that the SPS is set to each of the MeNB and the SeNB. Since FIG. 19 is similar to FIG. 13 and FIG. 20 is similar to FIG. 15, the differences will be mainly described.

FIG. 19 illustrates the padding (A) transmission in the absence of the uplink transmission data.

In Step ST1008, the SeNB notifies the UE of activation using the PDCCH with the uplink grant of the uplink SPS.

Upon receipt of the SPS activation from the SeNB, the UE executes the SPS with the set resources.

Assume a case where no uplink data is generated in the UE with the timing of the SPS set to the SeNB in Step ST1701.

In Step ST1701, the UE performs the padding (A) transmission to the SeNB in the absence of the uplink transmission data.

In Steps ST1701 and ST1702, the UE similarly performs the padding (A) transmission to the SeNB when no uplink data is consecutively generated in the UE with the timing of the SPS set to the SeNB.

The implicit release is performed when the padding (A) transmission to the SeNB is performed without any uplink transmission data generated consecutively the number of times set as the number of before-release empty transmissions.

Following the implicit release, the eNBs release the set SPS resources in Step ST1204. In Step ST1204, the UE clears the set SPS resources.

FIG. 20 illustrates the padding (B) transmission in the presence of the uplink transmission data.

In Step ST1008, the SeNB notifies the UE of activation using the PDCCH with the uplink grant of the uplink SPS.

Upon receipt of the SPS activation from the SeNB, the UE executes the SPS with the set resources.

Assume a case where the uplink data is generated in the UE with the timing of the SPS set to the SeNB in Step ST1801. Here, the uplink data to be generated is data with the data amount smaller than the DRAT threshold. Although the uplink data is transmitted to the McNB, the uplink data is not transmitted to the SeNB. The padding transmission to the SeNB is performed with application of the method disclosed in the third embodiment.

In Step ST1801, the UE performs the padding (B) transmission to the SeNB in the presence of the uplink transmission data, according to the method disclosed in the fifth embodiment.

In Steps ST1801 and ST1802, the uplink data is consecutively generated in the UE with the timing of the SPS set to the SeNB. When the uplink data is the data with the data amount smaller than the DRAT threshold and is not transmitted to the SeNB, the UE similarly performs the padding (B) transmission to the SeNB.

The implicit release is not performed even when the padding (B) transmission to the SeNB is performed consecutively the number of times set as the number of before-release empty transmissions.

Thus in Step ST1204, the eNB does not release the set SPS resources, and the UE does not clear the set SPS resources.

When the uplink data with the data amount larger than or equal to the DRAT threshold is generated in the UE with the timing of the SPS set to the SeNB in Step ST1204 after the padding (B) transmission to the SeNB consecutively the number of times set as the number of before-release empty transmissions, the UE can transmit the uplink data to the SeNB with the set SPS resources in Step ST1401.

Consequently, it is possible to prevent the implicit release from being performed irrespective of the presence of the uplink transmission data. The SPS resources set to the SeNB can be used for transmitting the uplink data when the uplink transmission data larger than or equal to the DRAT threshold is generated in the UE.

As described above, performing the padding transmission in the absence of the uplink transmission data and performing the padding transmission in the presence of the uplink transmission data in a different manner enables the eNB to determine the presence or absence of the uplink transmission data from the UE with the timing of the set SPS.

Upon receipt of the padding transmission in the absence of the uplink transmission data, the eNB can determine the absence of the uplink transmission data. Without the uplink transmission data from the UE, the eNB may count the padding transmission as the padding transmission for performing the implicit release.

Upon receipt of the padding transmission in the presence of the uplink transmission data, the eNB can determine the presence of the uplink transmission data. With the uplink transmission data from the UE, the eNB prevents the padding transmission from being counted as the padding transmission for performing the implicit release.

Counting only the padding transmission in the absence of the uplink transmission data from the UE enables the implicit release when the padding transmission in the actual absence of the uplink transmission data from the UE is performed consecutively the number of times set as the number of before-release empty transmissions.

The method for performing the padding transmission in the absence of the uplink transmission data and performing the padding transmission in the presence of the uplink transmission data in a different manner will be disclosed.

The padding transmission in the absence of the uplink transmission data may be the conventional padding transmission described in the first embodiment, that is, transmitting the MAC PDU including at least one of the padding bit and the padding BSR.

The padding transmission in the presence of the uplink transmission data is performed differently from the conventional padding transmission.

In the padding transmission in the presence of the uplink transmission data, processing on the MAC layer may be made different from the conventional one. The following (1) to (3) will be disclosed as specific examples of a method for configuring the MAC PDU differently from that for the conventional padding transmission:

(1) providing a new MAC Control Element (CE);
(2) setting a specific value to the padding bit; and
(3) setting a specific value to a header.

In the method (1), a MAC CE indicating the padding transmission in the presence of the uplink transmission data may be provided.

For example, a MAC CE indicating the presence or absence of transmission is provided. In addition to at least one of the conventional padding bit and the conventional padding BSR, the MAC CE indicating the presence or absence of transmission may be included. The MAC CE may indicate the presence of transmission.

Alternatively, a MAC CE indicating a type of padding transmission may be provided. The MAC CE may indicate either the padding transmission in the absence of the uplink transmission data or the padding transmission in the presence of the uplink transmission data.

Alternatively, a MAC CE indicating the presence or absence of the implicit release may be provided. The padding transmission including this MAC CE indicates whether to perform the implicit release.

Consequently, the padding transmission can be made different from the conventional padding transmission.

In the method (2), a specific value indicating the padding bit in the presence of the uplink transmission data may be set to the padding bit. Since the header is conventionally used to determine whether the bit is the padding bit, the padding bit may be any. Here, a specific value indicating the padding in the presence of the uplink transmission data is newly set. The eNB can recognize whether the padding transmission is the padding transmission in the presence of the uplink transmission data by demodulating the padding bit.

In the method (3), the header may have a value indicating the presence or absence of the uplink transmission data. For example, the value indicating the presence or absence of the uplink transmission data is added to a header of the padding bit as a specific value. Thus, when the header indicates the presence of the transmission data, it is possible to recognize the padding transmission in the presence of the uplink transmission data.

Alternatively, the specific value may be added to a header of the padding BSR. Consequently, the same advantages can be produced.

Alternatively, the specific value may be added to a header of the MAC CE indicating the padding transmission in the presence of the uplink transmission data. Consequently, both the MAC CE and the header can be used to determine the presence or absence of the uplink transmission data. Thus, the malfunction can be reduced.

As such, the padding transmission in the presence of the uplink transmission data can be made different from the conventional padding transmission by performing the processing on the MAC layer differently from the conventional one.

As an alternative method, processing on a PHY layer may be made different from the conventional one in the padding transmission in the presence of the uplink transmission data.

For example, a reference signal to be used for the PUSCH for the padding transmission in the presence of the uplink transmission data is made different from a conventional reference signal to be used for the PUSCH for the padding transmission in the absence of the uplink transmission data.

Alternatively, at least one of a resource on the frequency axis and a resource on the time axis to each of which a PUSCH for the padding transmission in the presence of the uplink transmission data is mapped may be made different from at least one of the conventional resource on the frequency axis and the conventional resource on the time axis to each of which a PUSCH for the padding transmission in the absence of the uplink transmission data is mapped.

At least one of the resource on the frequency axis and the resource on the time axis may be made different within at least one of the resource on the frequency axis and the resource on the time axis each of which is allocated as the SPS resource. In other words, the resources allocated as the SPS resources include both the resources to which the PUSCH for the padding transmission in the presence of the uplink transmission data is mapped and the resources to which the PUSCH for the padding transmission in the absence of the uplink transmission data is mapped. Since resources other than the set SPS resources need not be used, increase in the necessary resources can be suppressed.

The resources on the time axis may be made different as a method for making differences in the SPS resources. For example, the resources may be made different for each slot. The resources may be made different for each symbol. Alternatively, the resources may be made different for each resource on the frequency axis. For example, the resources may be made different for each sub-carrier. The resources may be made different for each resource block.

The radio resources (resources on the frequency axis—resources on the time axis) may be provided separately from the SPS resources. For example, the padding transmission is performed with the SPS resources in the absence of the transmission data. In the presence of the transmission data, the padding transmission is performed with the radio resources separately set. Since there is no need to change the mechanism on the conventional padding transmission, the control will be facilitated. A plurality of UEs may use the radio resources separately set. Specifically, the radio resources may be multiplexed. The multiplexing may be, for example, the time-multiplexing, the frequency-multiplexing, the code-multiplexing, etc. Alternatively, the radio resources may be collision-based common resources. The eNB may distribute, to each of the UEs, the radio resources using the RS for the PUSCH transmitted by the UE.

As an alternative method, transmission using the L1/L2 control signal or the padding transmission may be switched, depending on the presence or absence of the uplink transmission data. For example, the transmission using the L1/L2 control signal is performed, instead of the padding transmission, in the presence of the uplink transmission data, whereas the conventional padding transmission is performed in the absence of the uplink transmission data. The eNB can recognize the presence or absence of the uplink transmission data, depending on reception using the L1/L2 control signal or reception in the conventional padding transmission. The method disclosed in the first modification of the second embodiment may be applied to the L1/L2 control signal in the presence of the uplink transmission data.

Consequently, the 2nd eNB can recognize the presence or absence of the transmission data in the UE. The implicit release can be executed in the absence of the uplink transmission data with the timing of the SPS set to the 2nd eNB. The implicit release can be prevented in the presence of the uplink transmission data with the SPS resources in the 2nd eNB.

Thus, the SPS resources need not be reserved for a long period of time, because the SPS resources are reserved when the implicit release is prevented in consideration of the presence of the uplink transmission data with the timing of the SPS set to the 2nd eNB, as disclosed in the third embodiment. Accordingly, the use efficiency of the PUSCH resources can be increased.

The fifth embodiment discloses the method for performing the padding transmission differently, depending on the presence or absence of the uplink transmission data with the timing of the SPS set to the 2nd eNB when the DC is set. Without being limited to the case, the method disclosed in the fifth embodiment may be applied to performing different padding transmissions to one eNB.

For example, the UE measures the time variation in the generated amount of the uplink transmission data, and derives a probability of generating the uplink transmission data with the uplink transmission timing, using a result of the measurement. In other words, the UE estimates the probability of generating the uplink transmission data with the uplink transmission timing, using a result of the measurement on the time variation in the generated amount of the uplink transmission data. Statistical processing may be performed to derive the probability of generating the uplink transmission data with the uplink transmission timing.

The padding transmission may be performed differently according to the probability of generating the uplink transmission data with the uplink transmission timing. The time variation in the generated amount of the uplink transmission data may be measured for each bearer. Alternatively, the time variation may be measured for each content or for each application.

The UE determines whether the probability of generating the uplink transmission data with the uplink transmission timing is larger than or equal to a predetermined threshold. The threshold may be predetermined as a system, or set and notified by the eNB. The padding transmission is performed differently, depending on whether the probability of generating the uplink transmission data is larger than or equal to the predetermined threshold.

The UE performs the padding transmission when the uplink transmission data is not actually generated with the set uplink SPS timing. Here, the padding (B) transmission is performed when the probability of generating the uplink transmission data is larger than or equal to the threshold. The padding (A) transmission is performed when the probability of generating the uplink transmission data is not larger than or equal to the threshold, that is, smaller than the threshold.

Even upon receipt of the padding (B) from the UE consecutively the number of times set as the number of before-release empty transmissions, the eNB does not release the SPS resources. Even when performing the padding (B) transmission to the eNB consecutively the number of times set as the number of before-release empty transmissions, the UE does not clear the set SPS resources.

Consequently, the SPS resources can be prevented from being released when the probability of generating the uplink transmission data is higher.

For example, when the uplink transmission data, which is normally generated, is not generated with the uplink transmission timing coincidentally due to a certain latency, the SPS resources can be prevented from being released. Thus, when the uplink transmission data continues to be generated, the SPS resources can be prevented from being released. Then, the uplink data can be transmitted with the SPS resources with the next SPS timing.

Upon receipt of the padding (A) from the UE consecutively the number of times set as the number of before-release empty transmissions, the eNB releases the SPS resources. When performing the padding (A) transmission to the eNB consecutively the number of times set as the number of before-release empty transmissions, the UE clears the set SPS resources. Consequently, the SPS resources can be released when the probability of generating the uplink transmission data is lower.

Thus, the SPS resources need not be reserved for a long period of time. Accordingly, the use efficiency of the PUSCH resources can be increased.

Although the padding transmissions are of two types according to the disclosed methods, a plurality of different padding transmissions may be provided to be performed. The eNB can change operations, depending on the type of padding transmission.

For example, the UE performs the padding transmission differently according to the downlink reception quality. Setting two thresholds for the downlink reception quality and dividing the downlink reception quality into three reception quality states allow different padding transmissions according to the respective three reception quality states. Consequently, the eNB can recognize how much the UE has the downlink reception quality.

The eNB may schedule UL resources and notify the UE of the uplink grant to allow the UE to perform the padding transmission, even without any uplink scheduling request from the UE. The UE performs the padding transmission with the uplink resources allocated with the uplink grant, because of no uplink transmission data. This padding transmission may be different padding transmission according to the reception quality state. Consequently, the eNB can timely and dynamically recognize the downlink reception quality of the UE. Consequently, the eNB can flexibly control the UE in various ways.

Sixth Embodiment

When the UL split bearer is set to a predetermined bearer, the uplink SPS is set to the 2nd eNB according to a state of generating data for the bearer.

When the uplink transmission data is generated with the timing of the uplink SPS set to the 2nd eNB side, not only the uplink transmission to the 2nd eNB with the SPS resources is performed, but also the uplink transmission to the 1st eNB with the timing of the SPS is performed depending on a setting condition of the bearer.

When the SPS is not set to the 1st eNB with the timing of the SPS, it is necessary to start transmission of the SR signal to the 1st eNB.

Irrespective of availability of the 1st eNB in the uplink transmission, latency to the 1st eNB occurs. This increases the transmission latency. The sixth embodiment will disclose a method for solving such problems.

The same SPS settings as those for the 2nd eNB are set to the 1st eNB. When the UL split bearer is set, the SPS settings may be made to the 1st eNB.

A method for setting the SPS will be disclosed. The same SPS settings as those for the 2nd eNB are made as the SPS for the 1st eNB. A plurality of SPSs may be set to each eNB.

The whole parameters may not have the same settings. The parameters with the same settings include the SPS interval. Parameters with different settings include a C-RNTI for the SPS. The number of before-release empty transmissions of the UL may be the same or differently set.

When the SPS is set to the 2nd eNB after the SPS is set to the 1st eNB, the 1st eNB may have the same settings as those for the 2nd eNB in addition to the already set SPS settings. When the SPS settings set already to the 1st eNB are the same as those for the 2nd eNB, for example, even when the timing of the SPS is the same, the SPS settings may be set so as to overlap.

Alternatively, when the SPS settings set already to the 1st eNB are the same as those for the 2nd eNB, for example, when the timing of the SPS is the same, the SPS settings may be made by combining the SPS settings set already to the 1st eNB and the SPS settings for the 2nd eNB without any overlap.

Consequently, when the SPS has already been set to the 1st eNB, the same SPS settings as those for the 2nd eNB can be made to the 1st eNB without any interruption in the existing SPS settings.

A method for notifying the UE of the SPS settings and making the settings will be disclosed. The 2nd eNB notifies the UE of the SPS settings for the 2nd eNB. The 2nd eNB further notifies the 1st eNB of the SPS settings for the 2nd eNB. The X2 signaling may be used for this notification. Alternatively, the S1 signaling may be used through the MME. Consequently, the 1st eNB can recognize the SPS settings for the 2nd eNB. The 1st eNB applies a parameter with the same settings as those for the 2nd eNB to set the SPS of its own eNB. The parameters with the same settings include the SPS interval. The number of before-release empty transmissions of the UL may be the same or differently set. Its own eNB independently sets the C-RNTI for the SPS. The 1st eNB notifies the UE of these SPS settings.

Consequently, the 1st eNB can set, to the UE, the same SPS settings as those for the 2nd eNB.

Another method for setting the SPS will be disclosed. The same SPS settings as those for the 2nd eNB are made as the SPS for the 1st eNB. A plurality of SPSs may be set to each eNB.

The whole parameters have the same settings. The SPS interval, the C-RNTI for the SPS, and the number of before-release empty transmissions of the UL are the same in the settings.

A method for notifying the UE of the SPS settings and making the settings will be disclosed. The 2nd eNB notifies the UE of the SPS settings for the 2nd eNB. The 2nd eNB further notifies the 1st eNB of the SPS settings for the 2nd eNB. The X2 signaling may be used for this notification. Alternatively, the S1 signaling may be used through the MME. Consequently, the 1st eNB can recognize the SPS settings for the 2nd eNB. The UE applies the SPS settings for the 2nd eNB to the SPS settings for the 1st eNB.

Consequently, the 1st eNB can set, to the UE, the same SPS settings as those for the 2nd eNB.

This eliminates the need for notifying the SPS settings from the 1st eNB to the UE. Thus, the amount of signaling on air interface can be reduced.

A method for sharing the same SPS C-RNTI between the 2nd eNB and the 1st eNB will be disclosed. The 2nd eNB and the 1st eNB set the same value through advanced coordination. For example, when setting the SPS, the 2nd eNB notifies, in advance, the 1st eNB of the SPS C-RNTI to be used.

The 1st eNB notifies the 2nd eNB of Ack when the notified SPS C-RNTI is available. Consequently, the 1st eNB and the 2nd eNB can use the same SPS C-RNTI.

The 1st eNB notifies the 2nd eNB of Nack when the notified SPS C-RNTI is not available. Here, the 2nd eNB selects again another SPS C-RNTI value, and notifies it to the 1st eNB. This process is repeated until Ack is received from the 1st eNB. This method enables the 2nd eNB and the 1st eNB to use the same SPS C-RNTI.

The X2 signaling may be used to notify the information between the 2nd eNB and the 1st eNB. Alternatively, the S1 signaling may be used through the MME.

SPS activate timing determines the start timing of the SPS. Thus, both of the eNBs require a method for synchronizing with the SPS activate timing.

When determining to notify the UE of the SPS activation, the 2nd eNB notifies the 1st eNB of the timing to notify the UE of the SPS activation. Alternatively, the 2nd eNB notifies the 1st eNB of the timing with which the SPS activation has been notified to the UE.

The timing information may be at least one of the radio frame number and the subframe number.

The 1st eNB derives a timing with which the SPS settings of the 2nd eNB are activated for the UE, using the received timing information, and notifies the UE of the SPS activation to synchronize with the timing.

When being too late for the timing to notify the UE of the SPS activation, the 2nd eNB may notify the UE in synchronization with the timing after the subsequent SPS intervals. The notification may be made as early as possible.

Consequently, both of the eNBs can synchronize with the SPS activate timing, so that the timings of the SPS for the eNBs can coincide with each other.

The X2 signaling may be used to notify the information between the 2nd eNB and the 1st eNB. Alternatively, the S1 signaling may be used through the MME.

FIG. 21 illustrates a method for allowing the 1st eNB to have the same SPS settings as those of the 2nd eNB. The 1st eNB is the MeNB, and the 2nd eNB is the SeNB.

In FIG. 21, a reference 1901 denotes the DRAT threshold.

The SeNB determines the SPS settings. In Step ST1902, the SeNB notifies, via the RRC-dedicated signaling, the UE of the SPS interval, the number of before-release empty transmissions, and the SPS C-RNTI.

In Step ST1903, the SeNB also notifies the MeNB of the set SPS configuration. The set SPS configuration may be notified via the X2 signaling. The SPS configuration to be notified may be the SPS interval. The number of before-release empty transmissions may also be notified.

The MeNB sets the same value as the received SPS configuration to the SPS configuration for the MeNB The MeNB selects a SPS C-RNTI without using the same value as that of the SeNB.

In Step ST1904, the MeNB notifies, via the RRC-dedicated signaling, the UE of the SPS configuration and the SPS C-RNTI for the MeNB.

The UE detects the PDCCH using the SPS C-RNTIs notified from the SeNB and the MeNB.

In Step ST1905, the SeNB notifies the MeNB of the SPS activate timing. Upon receipt of the SPS activate timing, the MeNB can recognize the timing with which the SeNB activates the SPS.

In Step ST1906 and Step ST1907, the SeNB and the MeNB transmit the SPS activation to the UE with the activate timing determined by the SeNB, respectively. Consequently, both the SeNB and the MeNB can set the same SPS activate timing to the UE.

The notification of the SPS activate timing from the SeNB to the MeNB in Step ST1905 may be in reverse order to the notification of the SPS activate timing from the SeNB to the UE in Step ST1906.

The SeNB notifies the MeNB of the timing with which the SPS activation has been notified to the UE. This enables the timing with which the SeNB has actually activated the SPS to he notified to the MeNB. The notification of the actual SPS activate timing can reduce a malfunction which causes the SPS activate timing to differ between the SeNB and the MeNB.

Scheduling of the SPS resources from the MeNB may be different from scheduling of the SPS resources from the SeNB. Each of the MeNB and the SeNB may schedule the SPS resources separately.

The UE recognizes that the SPS has been activated for the SeNB and the MeNB by receiving the SPS activation.

In Steps ST1908 and ST1909, the UE transmits the uplink data to the SeNB and the MeNB with the timing of the set SPS.

In Step ST1910, the UE performs the padding transmission to the SeNB when the amount of the uplink transmission data of the UE is smaller than the DRAT threshold. The UE transmits the uplink data to the MeNB.

When the padding transmission to the SeNB is performed consecutively the number of times set as the number of before-release empty transmissions, the eNB releases the SPS resources set to the SeNB in Step ST1911. The UE clears the SPS resources set to the SeNB.

Since the uplink data is transmitted to the MeNB, the SPS resources set to the MeNB are not released in Step ST1911. In the presence of the uplink transmission data, the uplink data is transmitted.

Releasing of the SPS resources will be disclosed. The eNB where the implicit release has occurred may notify the occurrence to the other eNBs. For example, when the implicit release occurs in the 2nd eNB in response to the set SPS, the 2nd eNB notifies the occurrence of the implicit release to the 1st eNB. Alternatively, the 2nd eNB may notify that the implicit release has caused the SPS resources to be released or the SPS settings to be disabled.

Upon receipt of the SPS resources released in the 2nd eNB, the 1st eNB may disable the SPS settings that are identical to those of the 2nd eNB and set to the 1st eNB. The 1st eNB may notify the UE to disable the SPS settings that are identical to those of the 2nd eNB and set to the 1st eNB as necessary. Upon receipt of the notification, the UE can disable the SPS settings that are identical to those of the 2nd eNB and set to the 1st eNB.

Consequently, the 1st eNB can disable the SPS settings identical to those of the 2nd eNB.

Upon notification to the UE of information indicating disabling the settings of the uplink SPS which is disclosed in the second modification of the fourth embodiment, the eNB may notify the information to the other eNBs. Alternatively, the eNB that notifies the UE of the information indicating disabling the settings of the uplink SPS may notify the information to the other eNBs in advance.

For example, when the 2nd eNB has notified the UE of the information indicating disabling the settings of the uplink SPS, the 2nd eNB notifies the 1st eNB that the information has been notified to the UE.

Alternatively, when the 2nd eNB notifies the UE of the information indicating disabling the settings of the uplink SPS, the 2nd eNB notifies the 1st eNB that the information indicating disabling the settings of the uplink SPS is notified to the UE. Here, the 2nd eNB may notify the 1st eNB of the timing with which the settings of the uplink SPS are disabled or the timing with which the information indicating disabling the settings of the uplink SPS is notified to the UE.

Upon receipt of the information indicating disabling the settings of the uplink SPS, the 1st eNB may disable the SPS settings that are identical to those of the 2nd eNB and set to the 1st eNB, using the information indicating disabling the settings of the uplink SPS. Alternatively, the 1st eNB may determine not to disable the SPS settings that are identical to those of the 2nd eNB and set to the 1st eNB. Alternatively, the 1st eNB may correct the SPS settings that are identical to those of the 2nd eNB and set to the 1st eNB. For example, the 1st eNB may restore the SPS settings to the SPS settings that have been preset to the 1st eNB. The 1st eNB can flexibly change the SPS settings set to its own eNB, in consideration of, for example, a load state.

The 1st eNB may notify the UE to disable the SPS settings that are identical to those of the 2nd eNB and set to the 1st eNB as necessary. Upon receipt of the notification, the UE can disable the SPS settings that are identical to those of the 2nd eNB and set to the 1st eNB.

When being too late for the timing to notify the UE of the information indicating that the 2nd eNB disables the settings of the uplink SPS, the 1st eNB may notify the information to the UE with the next timing after the SPS interval. Alternatively, the 1st eNB may notify the information to the UE without waiting for the next timing after the SPS interval. Alternatively, the 1st eNB may immediately notify the information.

Consequently, the 1st eNB can disable the SPS settings identical to those of the 2nd eNB.

It has been described that the uplink data may be transmitted not only to the 2nd eNB but also to the 1st eNB with the timing of the SPS set to the 2nd eNB.

The SPS settings are set to the 1st eNB with the timing of the SPS set to the 2nd eNB according to the method disclosed in the sixth embodiment. Thus, the UE can transmit the uplink data not only to the 2nd eNB but also to the 1st eNB with the timing of the SPS without transmitting any uplink scheduling request. Consequently, the transmission latency for the 1st eNB can be reduced.

Seventh Embodiment

The UE does not transmit the uplink data to the 2nd eNB when the amount of the uplink transmission data is smaller than or equal to the DRAT threshold with the UL split bearer.

The padding transmission irrespective of no transmission of the uplink data to the 2nd eNB wastefully consumes the power of the UE.

Particularly, when the padding transmissions performed consecutively a predetermined number of times do not initiate the implicit release, the padding transmissions are wasteful because the number of padding transmissions does not determine execution of the implicit release.

A solution to such problems may be preventing the padding transmission when the implicit release is not performed.

The UE does not perform the padding transmission, when the uplink data is not transmitted to the 2nd eNB with the timing of the set SPS and the implicit release is not performed.

FIG. 22 illustrates a method for preventing the padding transmission when the implicit release is not performed. The 1st eNB is the MeNB, and the 2nd eNB is the SeNB. FIG. 22 illustrates setting the SPS to each of the MeNB and the SeNB. Since FIG. 22 is similar to FIG. 15, the differences will be mainly described.

In Step ST1008, the SeNB notifies the UE of activation using the PDCCH with the uplink grant of the uplink SPS. The information indicating that the settings of the uplink SPS are not disabled is included in the activation. Consequently, the UE can recognize that the implicit release is not performed and the settings of the uplink SPS are not disabled.

Upon receipt of the SPS activation from the SeNB, the UE executes the SPS with the set resources, and does not perform the implicit release or disable the settings of the uplink SPS. Even when the UE does not generate the uplink transmission data for the SeNB a predetermined number of times, the eNB and the UE are set not to perform the implicit release and prevent the settings of the uplink SPS from being disabled.

Assume a case where the uplink data with the data amount smaller than the DRAT threshold is generated in the UE with the timing of the SPS set to the SeNB in Step ST1301.

In Step ST1301, the UE transmits the uplink data to the MeNB. The uplink transmission data is not generated for the SeNB.

The padding transmission is not performed, when the implicit release is not performed and the uplink transmission data is not generated. Thus in Step ST2001, the UE does not perform the padding transmission to the SeNB.

When the uplink data with the data amount smaller than the DRAT threshold is generated in the UE with the timing of the SPS set to the SeNB in Steps ST2001 and ST2002, the UE transmits the uplink data to the MeNB, but does not perform the padding transmission to the SeNB, similarly in Steps ST1301 and ST1302.

The UE does not perform the padding transmission to the SeNB with the SPS resources when the uplink transmission data is not generated consecutively the number of times set as the number of before-release empty transmissions. In such a case, the UE does not perform the implicit release received in Step ST1008. In Step ST1204, the UE does not clear the SPS resources according to the settings to prevent the settings of the uplink SPS from being disabled. The eNB does not release the SPS resources. In Step ST1204, the implicit release is not performed, and the SPS resources are not released.

When the uplink data with the data amount larger than or equal to the DRAT threshold is generated in the UE with the timing of the SPS set to the SeNB in Step ST1204, the UE can transmit the uplink data to the SeNB with the set SPS resources in Step ST1401.

Accordingly, the padding transmission can be prevented, when the implicit release is not performed and the uplink transmission data is not generated for the SeNB. The UE can reduce the power consumption of the UE because of no padding transmission. Without the padding transmission when no uplink transmission data is generated for the SeNB, the interference in the uplink can be reduced.

The padding transmission may be performed when the implicit release is performed. The methods disclosed in the fourth embodiment, and the first and second modifications of the fourth embodiment may be applied to the method for the implicit release. The eNB may notify the UE of information indicating to start the padding transmission together with a notification to start the implicit release.

Accordingly, the padding transmission can be prevented, when the implicit release is not performed and the uplink transmission data is not generated for the 2nd eNB. The padding transmission is possible, when the implicit release is performed and the uplink transmission data is not generated for the 2nd eNB.

Consequently, the implicit release can be normally operated, and the power consumption of the UE can be reduced.

The following (1) and (2) will be disclosed as specific examples of a setting method for preventing the padding transmission when the implicit release is not performed and the uplink transmission data is not generated for the 2nd eNB:

(1) statically predetermining the method in, for example, a standard; and (2) providing information indicating no padding transmission, and notifying the information from the eNB to the UE.

In the method (1) above, preventing the padding transmission is statically determined when the implicit release is not performed and the uplink transmission data is not generated for the 2nd eNB. Predetermining this in, for example, a standard enables the mutual recognition between the eNB and the UE. Thus, the consistent operations become possible, and the malfunction can be reduced.

In the method (2) above, notifying the information indicating no padding transmission from the eNB to the UE enables dynamic settings for preventing the padding transmission when the uplink transmission data is not generated for the 2nd eNB. The eNB may notify the information to the UE when the implicit release is not performed in the 2nd eNB. Upon receipt of the information indicating no padding transmission, the UE does not perform the padding transmission when the uplink data is not generated for the 2nd eNB.

The eNB may notify the UE of the information indicating no padding transmission in the (2) above. The eNB may be the 1st eNB or the 2nd eNB. For example, when the 2nd eNB notifies the UE, the 2nd eNB may directly notify the UE, or the 2nd eNB may notify the UE through the 1st eNB. The X2 signaling may be used to notify the information between the eNBs. Alternatively, the S1 signaling may be used through the MME.

The following (1) to (3) will be disclosed as specific examples of the signaling method for notifying the information indicating no padding transmission from the eNB to the UE.

(1) The RRC signaling: the information may be included in, for example, the signaling for setting the SPS configuration to be notified.

(2) The MAC signaling: for example, a MAC CE including the information indicating no padding transmission may be provided and notified via the MAC signaling.

(3) The L1/L2 signaling, for example, the PDCCH or the EPDCCH: For example, the information may be included in the SPS activation to be notified.

Although disclosed is providing the information indicating no padding transmission and notifying the information from the eNB to the UE, information for performing the padding transmission may be provided. The eNB may notify the UE of the information for performing the padding transmission. Consequently, the presence or absence of the padding transmission can be dynamically set, and the flexible operation becomes possible according to a communication state and a load state of the 2nd eNB, when the implicit release is not performed and the uplink transmission data is not generated for the 2nd eNB.

Eighth Embodiment

The seventh embodiment discloses the method for preventing the padding transmission in the absence of the uplink transmission data with the timing of the set SPS.

When the padding transmission is not performed, the eNB cannot distinguish between a state where the uplink data cannot be received irrespective of actual transmission of the uplink data and a state where the uplink data cannot be received due to the absence of the padding transmission. The eighth embodiment will disclose a method for solving such a problem.

The HARQ is operated even when preventing the padding transmission is set. The eNB operates the HARQ when preventing the padding transmission is set. The UE performs the HARQ in the presence of the uplink transmission data. In the absence of the uplink transmission data, the UE neither performs the padding transmission nor performs the padding transmission again.

The conventional padding transmission in the absence of the uplink transmission data with the timing of the set SPS is subjected to the HARQ. The eNB can determine whether the uplink transmission data is transmitted, by receiving the padding transmission. Thus, the UE performs the padding transmission even in the absence of the uplink transmission data with the timing of the set SPS. Upon receipt of Nack that is an unsuccessful transmission/reception (unsuccessful reception) signal from the eNB, the UE performs the padding transmission again.

The method disclosed in the eighth embodiment differs from the conventional method in that the UE neither performs the padding transmission in the absence of the uplink transmission data with the timing of the set SPS nor performs the padding transmission again even when receiving Nack that is an unsuccessful reception signal from the eNB, though the eNB operates the HARQ.

The UE does not perform the padding transmission again when not performing the padding transmission and even receiving Nack from the eNB. Thus, since the reception is unsuccessful due to no retransmission from the UE, the eNB retransmits Nack. The UE receives Nack again from the eNB. The UE does not perform the padding transmission again in response to this Nack. Since the UE neither performs the padding transmission nor performs the padding transmission again, these operations will be repeated. Thus, the eNB continues to transmit Nack to the UE. A method for solving such a problem will be disclosed.

The eNB may set the maximum number of retransmissions. The maximum number of retransmissions may be set for the HARQ when initial transmission is performed with the uplink SPS resources.

The eNB stops the HARQ, when the reception continues to be unsuccessful and the reception is still unsuccessful even with transmission of Nack the maximum number of retransmission times.

The maximum number of retransmission times may be statically predetermined in, for example, a standard. Alternatively, the eNB may determine the maximum number of retransmission times. Consequently, the maximum number of retransmission times can be dynamically changed according to a communication state and a load state. Alternatively, operation administration and maintenance (OAM) may determine the maximum number of retransmission times.

Consequently, the maximum number of retransmission times can be determined in consideration of states of a plurality of eNBs. Alternatively, an operator may determine the maximum number of retransmission times. The maximum number of retransmission times may be determined as one of system design parameters.

The maximum number of retransmission times disclosed in the eighth embodiment may be set differently from the maximum number of retransmission times conventionally set to the HARQ. The maximum number of retransmission times disclosed in the eighth embodiment may be, for example, smaller than the maximum number of retransmission times conventionally set to the HARQ. Reducing the maximum number of retransmission times disclosed in the eighth embodiment can reduce the number of Nacks to be transmitted from the eNB to the UE in the absence of both the uplink transmission data and the padding transmission. This can reduce wasteful use of the radio resources for Nack.

Figure 23:
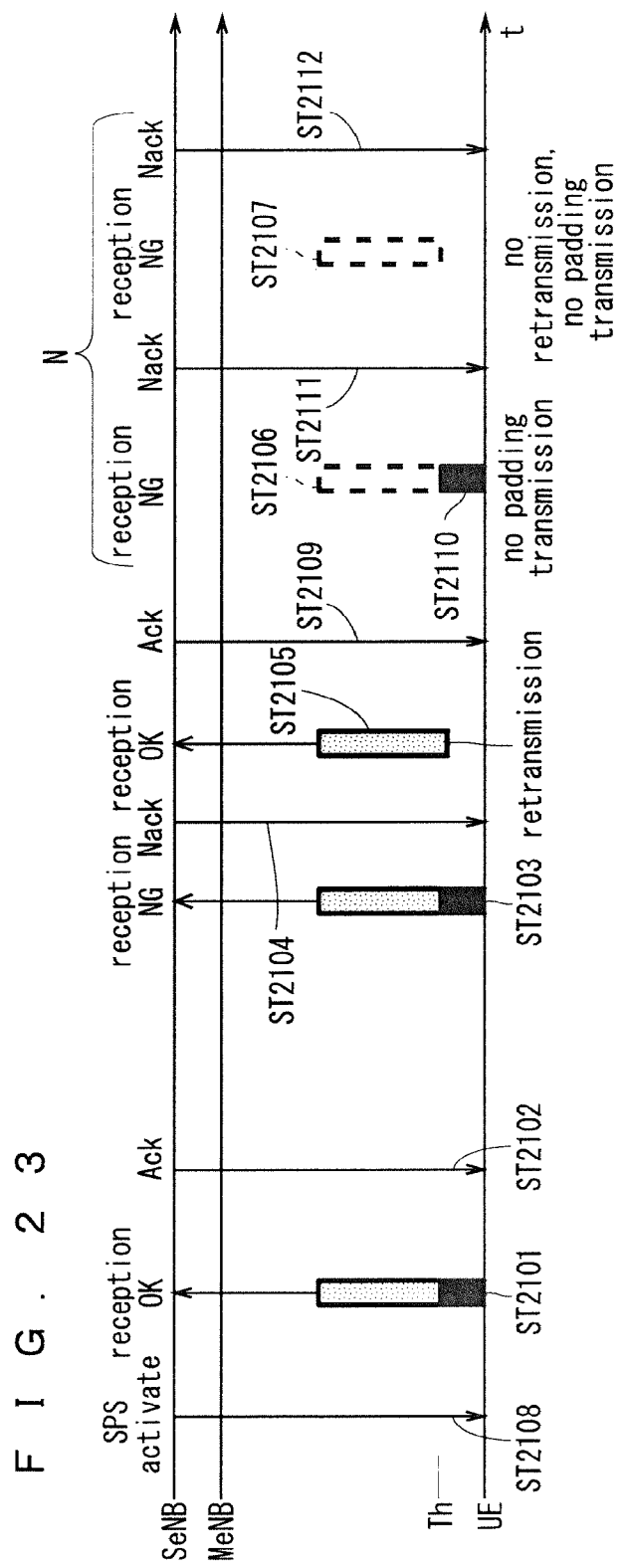
FIG. 23 illustrates a HARQ method when the padding transmission is not performed.

FIG. 23 illustrates a HARQ method when the padding transmission is not performed. The 1st eNB is the MeNB, and the 2nd eNB is the SeNB. FIG. 23 illustrates setting the SPS to the SeNB. FIG. 23 illustrates preventing the padding transmission, when the implicit release is not performed and the uplink transmission data is not generated. In Step ST2108, the SeNB notifies the UE of activation using the PDCCH with the uplink grant of the uplink SPS. The information indicating that the settings of the uplink SPS are not disabled is included in the activation. Consequently, the UE can recognize no padding transmission, when the implicit release is not performed and the uplink transmission data is not generated.

Assume a case where the uplink data with the data amount larger than or equal to the DRAT threshold is generated in the UE with the timing of the SPS set to the SeNB in Step ST2101. In Step ST2101, the UE transmits the uplink data to the SeNB with the SPS resources set to the SeNB. The eNB receives the uplink data from the UE, and acknowledges its successful receipt. Thus in Step ST2102, the SeNB transmits Ack that is a successful reception signal to the UE. Upon receipt of Ack, the UE determines that the SeNB has received the uplink data, and does not retransmit the uplink data.

Next in Step ST2103, the UE transmits the uplink data to the SeNB with the timing of the set SPS. The SeNB receives the uplink data from the UE, and acknowledges its unsuccessful receipt. Thus in Step ST2104, the SeNB transmits Nack to the UE.

Upon receipt of Nack, the UE determines that the SeNB has not received the uplink data, and retransmits the uplink data to the SeNB in Step ST2105. Thus, the UE transmits the uplink data to the SeNB, and retransmits the uplink data upon receipt of Nack from the SeNB.

In Step ST2105, the SeNB receives the uplink data retransmitted from the UE, and acknowledges its successful receipt. Thus in Step ST2109, the SeNB transmits Ack to the UE.

Upon receipt of Ack, the UE determines that the SeNB has received the uplink retransmission data, and does not retransmit the data.

Assume a case where the uplink data with the data amount smaller than the DRAT threshold is generated in the UE with the timing of the SPS set to the SeNB in Step ST2106. In Step ST2110, the UE transmits the uplink data not to the SeNB with the set SPS resources but to the MeNB. Since preventing the padding transmission is set when the uplink transmission data is not generated in Step ST2108, the UE does not perform the padding transmission.

In Step ST2106, reception is unsuccessful in the SeNB due to no padding transmission from the UE. Thus in Step ST2111, the SeNB transmits Nack to the UE.

The UE may or may not receive Nack. The UE does not retransmit the uplink data even upon receipt of Nack. The UE does not perform the padding transmission.

In Step ST2107, reception is unsuccessful in the SeNB due to no transmission from the UE. Thus in Step ST2112, the SeNB retransmits Nack to the UE.

Similarly, the UE may or may not receive Nack. The UE does not retransmit the uplink data even upon receipt of Nack. The UE does not perform the padding transmission.

The eNB stops the HARQ when the number of transmissions of Nack reaches its maximum number of transmissions. If the maximum number of retransmissions is not set, Nack is repeatedly transmitted. Since the maximum number of retransmissions is set in the eighth embodiment, the HARQ can be stopped.

According to the method disclosed in the eighth embodiment, the HARQ will be operated when the uplink data is transmitted from the UE, and the reception performance of the uplink data will be increased.

The UE having no uplink transmission data neither retransmits the uplink transmission data nor performs the padding transmission, even when the eNB transmits Nack. Only when transmitting the uplink data, the UE may retransmit the uplink data according to Nack from the eNB. Thus, increase in the power consumption can be reduced because transmission of the UE is limited to transmission of the uplink data.

First Modification of Eighth Embodiment

The first modification will disclose another method for solving the problems described in the eighth embodiment. The 2nd eNB determines whether data is generated for the 2nd eNB. The 2nd eNB determines whether the HARQ is operated using the result.

A method for determining whether data is generated for the 2nd eNB will be disclosed. The 2nd eNB notifies, in advance, the 1st eNB of the SPS settings of its own eNB. The SPS settings may be the timing of the SPS. Alternatively, the SPS settings may be the timing with which the SPS interval and the SPS activation have been notified to the UE.

Consequently, the 1st eNB can recognize the SPS settings set by the 2nd eNB.

The 1st eNB determines whether the amount of the uplink transmission data generated from the UE is smaller than the DRAT threshold, with the timing of the SPS of the 2nd eNB. The 1st eNB notifies the 2nd eNB of a result of the determination. The 2nd eNB determines whether data is generated for the 2nd eNB itself, based on the result of the determination received from the 1st eNB.

The 2nd eNB determines that data is not generated for the 2nd eNB itself when the result of the determination notified from the 1st eNB is smaller than the DRAT threshold.

The 2nd eNB determines that data is generated for the 2nd eNB itself when the result of the determination notified from the 1st eNB is larger than or equal to the DRAT threshold.

A method for determining whether the 2nd eNB operates the HARQ will be disclosed. The 2nd eNB operates the HARQ when determining that data has been generated for the 2nd eNB itself.

The 2nd eNB stops the HARQ when determining that data is not generated for the 2nd eNB itself.

In such a method, the 1st eNB needs to notify information to the 2nd eNB. Here, since communication is performed via a backhaul such as an X2 interface or an S1 interface, the HARQ performed by the 2nd eNB sometimes cannot be temporally immediately supported.

Although the HARQ cannot be immediately supported, the HARQ can be supported after latency caused by, for example, backhaul communication. Thus, the continuous HARQ can be prevented. This can increase the use efficiency of the resources of the 2nd eNB.

Data may be transmitted to the 2nd eNB, although the data transmitted to the 1st eNB is smaller than the DRAT threshold. The data is transmitted, for example, when the data exceeds the DRAT threshold and a scheduling ratio between the 1st eNB and the 2nd eNB is set to one to two (1:2), etc. The amount of the transmission data to the 1st eNB is ⅓. Here, the data may be smaller than the DRAT threshold.

In such a case, the HARQ is not performed on the 2nd eNB side. This poses a problem because the HARQ is not performed despite transmission of the data to the 2nd eNB. A method for solving such a problem will be disclosed.

The 1st eNB obtains the scheduling ratio between the 1st eNB and the 2nd eNB. For example, when the 2nd eNB determines the scheduling ratio, the 2nd eNB may notify the 1st eNB of the scheduling ratio in advance. When the 1st eNB determines the scheduling ratio, the 1st eNB need not notify the scheduling ratio.

The 1st eNB determines whether the data is smaller than the DRAT threshold in consideration of the scheduling ratio.

This prevents the HARQ from malfunctioning when data is transmitted to the 2nd eNB although the data transmitted to the 1st eNB is smaller than the DRAT threshold, according to the scheduling ratio between the 1st eNB and the 2nd eNB determined when the data exceeds the DRAT threshold.

Thus, when the 2nd eNB has the uplink transmission data from the UE, the reception performance of the uplink transmission data can be increased.

Since the HARQ can be stopped, the use efficiency of the resources of the 2nd eNB can be increased.

Second Modification of Eighth Embodiment

The second modification will disclose another method for solving the problems described in the eighth embodiment. The 2nd eNB measures the uplink power of the SPS resources set for the 2nd eNB. The 2nd eNB may measure the uplink communication quality.

The 2nd eNB may measure, as the uplink power for example, the received signal strength indicator (RSSI), the interference over thermal noise (IoT), the RSRP, or the signal-to-interference-plus-noise ratio (abbreviated as SINR). Alternatively, the 2nd eNB may measure a received power of a reference signal of the PUSCH to be used for the set SPS resources.

The 2nd eNB may measure the RSRQ as the uplink communication quality. Alternatively, the 2nd eNB may measure the reception quality of the reference signal of the PUSCH.

The 2nd eNB determines that the uplink data has been transmitted to the 2nd eNB when the uplink power or the uplink communication quality of the SPS resources set to itself is higher than a predetermined threshold.

The 2nd eNB determines that the uplink data is not transmitted to the 2nd eNB when the uplink power or the uplink communication quality of the SPS resources set to itself is lower than the predetermined threshold.

A method for determining whether the 2nd eNB operates the HARQ will be disclosed. The 2nd eNB operates the HARQ when determining that data has been transmitted to the 2nd eNB itself. The 2nd eNB stops the HARQ when determining that data is not transmitted to the 2nd eNB itself.

The HARQ performed by the 2nd eNB sometimes cannot be temporally immediately supported because the measurement is required. Although the HARQ cannot be immediately supported, the HARQ can be supported after latency caused by, for example, the measurement. Thus, the continuous HARQ can be prevented. This can increase the use efficiency of the resources of the 2nd eNB.

The need for signaling between the eNBs is eliminated, and increase in the amount of signaling can be suppressed.

Ninth Embodiment

The UE does not transmit the uplink data to the 2nd eNB when the amount of the uplink transmission data is smaller than or equal to the DRAT threshold. The padding transmission irrespective of no transmission of the uplink data to the 2nd eNB wastefully consumes the power of the UE.

However, when the padding transmission is not performed while the implicit release is operated, the implicit release is not performed, and the set SPS resources are not released. Unless the SPS resources are released, the resources are not available for the other UEs, and the use efficiency of the PUSCH resources will be decreased. The ninth embodiment will disclose a method for solving such problems.

The frequency of performing the padding transmission in the absence of the uplink transmission data is changed. Specifically, the padding transmission is skipped.

According to the padding transmission method disclosed above, the padding transmission to the 2nd eNB is always performed when the amount of the uplink transmission data is smaller than or equal to the DRAT threshold. In contrast, according to the method disclosed in the ninth embodiment, the padding transmission to the 2nd eNB is skipped when the amount of the uplink transmission data is smaller than or equal to the DRAT threshold.

An example case where the padding transmission is skipped once out of twice will be described. The UE does not perform the padding transmission with the first padding transmission timing. The UE performs the padding transmission with the second padding transmission timing.

Once out of how many times the padding transmission is performed, that is, the frequency of performing the padding transmission may be referred to as a "padding transmission frequency". The padding transmission frequency is 2 in the former example.

The padding transmission frequency may be statically predetermined in, for example, a standard or changed semi-statically or dynamically. The padding transmission frequency may be set by the eNB, and notified from the eNB to the UE. When the padding transmission frequency is notified from the eNB to the UE, it may be included in a message in the SPS settings or included in the SPS activation.

Figure 24:
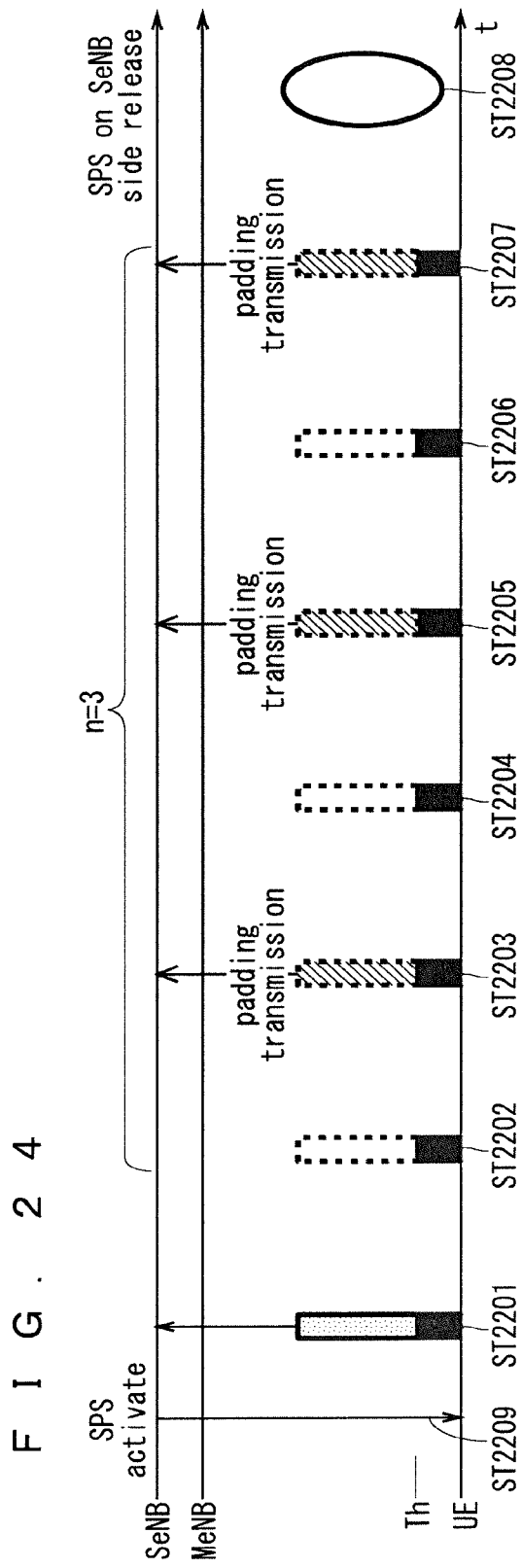
FIG. 24 illustrates an implicit release method when the padding transmission is skipped.

FIG. 24 illustrates an implicit release method when the padding transmission is skipped. The 1st eNB is the MeNB, and the 2nd eNB is the SeNB. FIG. 24 illustrates setting the SPS to the SeNB. FIG. 24 illustrates that the padding transmission frequency is 2. The number of before-release empty transmissions for the implicit release is 3. The SPS settings for the SeNB have already been made.

In Step ST2209, the SeNB notifies the UE of activation using the PDCCH with the uplink grant of the uplink SPS. Information on the padding transmission frequency is included in the activation. Consequently, the UE can recognize the number of times the padding transmission is skipped.

Assume a case where the uplink data with the data amount larger than or equal to the DRAT threshold is generated in the UE with the timing of the SPS set to the SeNB in Step ST2201. In Step ST2201, the UE transmits the uplink data to the SeNB with the SPS resources set to the SeNB.

When the uplink data with the data amount smaller than the DRAT threshold is generated with the timing of the SPS set to the SeNB in Step ST2202, the UE determines the padding transmission timing for the SeNB to be the first time, and thus does not perform the padding transmission.

When the uplink data with the data amount smaller than the DRAT threshold is generated with the timing of the SPS set to the SeNB in Step ST2203, the UE determines the padding transmission timing for the SeNB to be the second time. Since the padding transmission frequency is 2, the UE performs the padding transmission.

When performing the padding transmission to the SeNB, the UE resets the count of the padding transmission timings.

When the uplink data with the data amount smaller than the DRAT threshold is generated with the timing of the SPS set to the SeNB in Step ST2204 after resetting the count of the padding transmission timings, the UE determines the padding transmission timing for the SeNB to be the first time, and thus does not perform the padding transmission.

When the uplink data with the data amount smaller than the DRAT threshold is generated with the timing of the SPS set to the SeNB in Step ST2205, the UE determines the padding transmission timing for the SeNB to be the second time. Since the padding transmission frequency is 2, the UE performs the padding transmission.

When performing the padding transmission to the SeNB, the UE resets the count of the padding transmission timings.

Similarly, the UE does not perform the padding transmission to the SeNB in Step ST2206. In Step ST2207, the UE performs the padding transmission to the SeNB. Then, the UE resets the count of the padding transmission timings.

In Step ST2203, the SeNB receives the first padding transmission from the UE. The SeNB also receives the second padding transmission from the UE in Step ST2205, and the third padding transmission from the UE in Step ST2207.

Since from Steps ST2203 to ST2207, the SeNB does not receive the uplink data while receiving the padding transmissions from the UE and receives the padding transmissions for the number of before-release empty transmissions, that is, consecutively three times, the SeNB performs the implicit release. Then in Step ST2208, the SeNB releases the set SPS resources. When performing the padding transmissions to the SeNB for the number of before-release empty transmissions, that is, consecutively three times, the UE clears the SPS settings in Step ST2208.

Consequently, the padding transmissions can be reduced in the absence of the uplink transmission data with the timing of the SPS set to the SeNB. Reducing the padding transmissions enables the power consumption of the UE to be reduced.

Since the padding transmission is performed, the implicit release can be operated. Accordingly, reduction in the use efficiency of the PUSCH resources can be suppressed.

In the example illustrated in FIG. 24, the UE resets the count of the padding transmission timings when performing the padding transmission. As an alternative method, the UE may reset the count of the padding transmission timings when performing the padding transmission and transmitting the uplink data. Since the count of the padding transmission timings is reset when the uplink data is transmitted, the number of padding transmissions can be reduced.

A method for resetting the count of the padding transmission timings may be statically predetermined in, for example, a standard or notified from the eNB to the UE. The notification may be included in a message in the SPS settings or included in the SPS activation. The method may be notified together with the padding transmission frequency.

Figure 25:
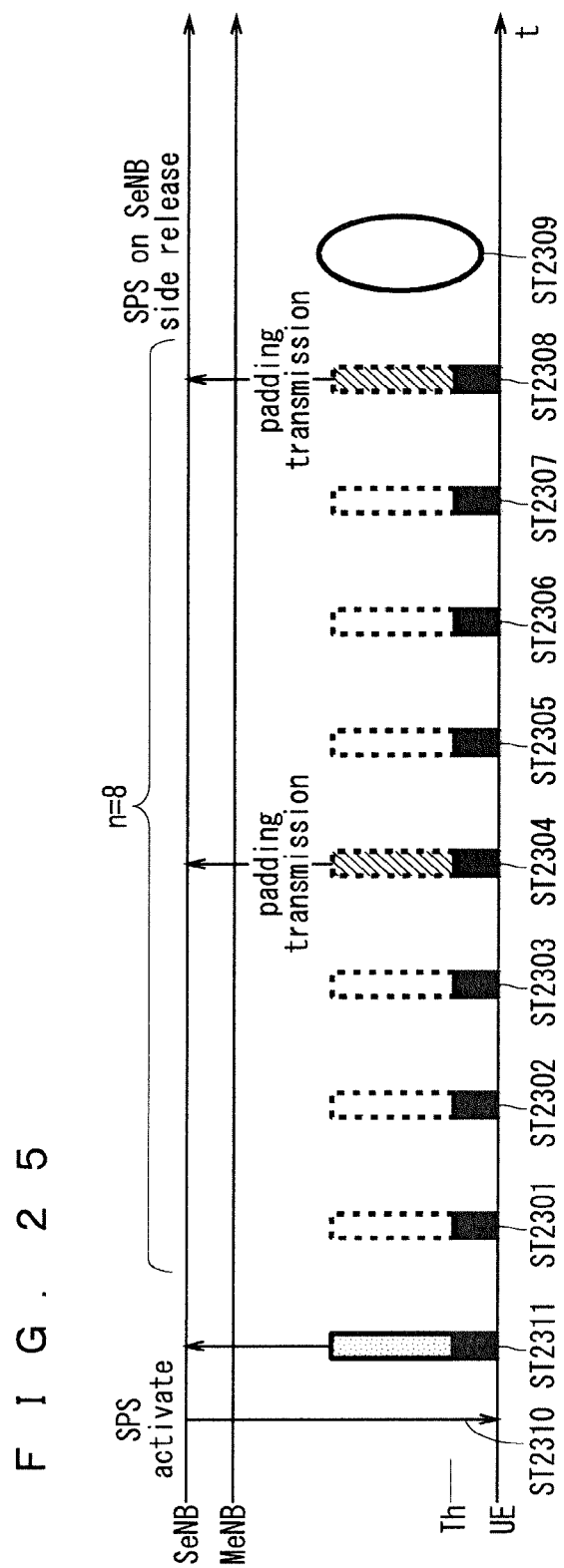
FIG. 25 illustrates another implicit release method when the padding transmission is skipped.

FIG. 25 illustrates another implicit release method when the padding transmission is skipped. The 1st eNB is the MeNB, and the 2nd eNB is the SeNB. FIG. 25 illustrates setting the SPS to the SeNB.

Since FIG. 25 is similar to FIG. 24, the differences will be mainly described.

FIG. 25 illustrates that the padding transmission frequency is 4.

Not the number of before-release empty transmissions for the implicit release but a predetermined number of padding transmission timings for the implicit release is provided. A parameter referred to as "implicitReleaseAfter_T" is used as the predetermined number of padding transmission timings for the implicit release. The predetermined number of padding transmission timings for the implicit release may be referred to as "the number of before-release empty transmission timings" in the following description. The number of before-release empty transmission timings is 8 in FIG. 25. The UE may reset the count of the padding transmission timings when performing the padding transmission and transmitting the uplink data.

The number of before-release empty transmission timings may be statically predetermined in, for example, a standard or notified from the eNB to the UE. When the number of before-release empty transmission timings is notified from the eNB to the UE, it may be included in a message in the SPS settings or included in the SPS activation.

The SPS settings for the SeNB have already been made. In Step ST2310, the SeNB notifies the UE of activation using the PDCCH with the uplink grant of the uplink SPS. Information on the padding transmission frequency is included in the activation. Further, information on the number of before-release empty transmission timings is included. Consequently, the UE can recognize the number of times the padding transmission is skipped and the predetermined number of padding transmission timings for the implicit release.

Assume a case where the uplink data with the data amount larger than or equal to the DRAT threshold is generated in the UE with the timing of the SPS set to the SeNB in Step ST2311. In Step ST2311, the UE transmits the uplink data to the SeNB with the SPS resources set to the SeNB.

When transmitting the uplink data, the UE resets the count of the padding transmission timings.

When the uplink data with the data amount smaller than the DRAT threshold is generated with the timing of the SPS set to the SeNB in Step ST2301, the UE determines the padding transmission timing to be the first time, and thus does not perform the padding transmission.

When the uplink data with the data amount smaller than the DRAT threshold is generated with the timing of the SPS set to the SeNB in Step ST2302, the UE determines the padding transmission timing to be the second time, and thus does not perform the padding transmission.

When the uplink data with the data amount smaller than the DRAT threshold is generated with the timing of the SPS set to the SeNB in Step ST2303, the UE determines the padding transmission timing to be the third time, and thus does not perform the padding transmission.

When the uplink data with the data amount smaller than the DRAT threshold is generated with the timing of the SPS set to the SeNB in Step ST2304, the UE determines the padding transmission timing to be the fourth time. Since the padding transmission frequency is 4, the UE performs the padding transmission.

When performing the padding transmission, the UE resets the count of the padding transmission timings.

When the uplink data with the data amount smaller than the DRAT threshold is generated with the timing of the SPS set to the SeNB in Step ST2305 after resetting the count of the padding transmission timings, the UE determines the padding transmission timing to be the first time, and thus does not perform the padding transmission.

Similarly, the UE does not perform the padding transmission in Steps ST2306 and ST2307. In Step ST2308, the UE performs the padding transmission. Then, the UE resets the count of the padding transmission timings.

In Step ST2304, the SeNB receives the first padding transmission from the UE. Since the SeNB has received the padding transmission from the UE once, the SeNB determines the padding transmission timings to be more than or equal to the fourth time, considering that the padding transmission frequency is 4. The SeNB maintains the SPS resources and performs reception from the UE with the SPS resources, because the number of before-release empty transmission timings has not reached more than or equal to 8.

In Step ST2308, the SeNB receives the second padding transmission from the UE. The SeNB determines that the number of before-release empty transmission timings has reached more than or equal to 8, upon receipt of the padding transmission from the UE consecutively twice.

The SeNB that determines that the number of before-release empty transmission timings has reached more than or equal to 8 performs the implicit release, and releases the set SPS resources in Step ST2309.

The UE clears the SPS settings for the SeNB when the padding transmission timings are continuous for the number of before-release empty transmission timings. Alternatively, the UE may perform the implicit release and clear the SPS settings when the padding transmission is performed consecutively twice and the padding transmission timing is determined to be continuous for more than the number of before-release empty transmission timings, considering that the padding transmission frequency is 4.

The methods disclosed in the eighth embodiment to the second modification of the eighth embodiment may be applied to the HARQ when the padding transmission is not performed.

According to the method disclosed in the ninth embodiment, the padding transmissions can be reduced in the absence of the uplink data with the timing of the SPS set to the SeNB. Reducing the padding transmissions enables the power consumption of the UE to be reduced.

Since the padding transmission is performed, the implicit release can be operated. Accordingly, reduction in the use efficiency of the PUSCH resources can be suppressed.

Enabling the padding transmission frequency to be set can flexibly meet requirements such as a desired communication quality of the communication, an allowable amount of latency, or a desired continuous operation time of the UE for each UE or for each bearer which sets the SPS to the 2nd eNB.

Tenth Embodiment

The first to ninth embodiments describe the problems occurring in setting the SPS to the 2nd eNB when the UL split bearer is set, and disclose the solutions. In the first place, reducing the frequency of occurrence of such problems is required. The tenth embodiment will disclose a method for reducing the frequency of occurrence of such problems.

When a data generation period differs among a plurality of communications or bearers, the SPS corresponding to the communication or bearer with data generated for a short period is set to the 1st eNB.

The SPS period of the 1st eNB may be set shorter than or equal to the SPS period of the 2nd eNB (the SPS period of the 1st eNB≤the SPS period of the 2nd eNB).

The DRAT threshold may be the maximum value of the data amount generated for a short period or more. Alternatively, the DRAT threshold may be the minimum value of the data amount generated for a long period or less.

Consequently, the number of SPS timings generated in the 2nd eNB can be reduced when the SPS is set to the 2nd eNB in setting the UL split bearer. Since the 1st eNB can always transmit the uplink data, it can perform the normal SPS processing. Thus, the frequency of occurrence of the problems described in the first to ninth embodiments can be reduced.

The unstable operation and the malfunction in the eNB and the UE can be reduced, the use efficiency of the radio resources can be increased, and the power consumption of the UE can be reduced.

When data or bearers with a plurality of different communication capacities exist and data or a bearer with a larger capacity is generated for a short period, the eNB suitable for the large capacity communication may be the 1st eNB. Since the 1st eNB can always transmit the uplink data, the SPS processing suitable for the large capacity communication is possible by setting the eNB suitable for the large capacity communication to the 1st eNB.

First Modification of Tenth Embodiment

The first modification will disclose another method for solving the problems described in the tenth embodiment. One eNB may set a plurality of SPSs to one UE. For example, one eNB sets the SPS to one UE for each of bearers. The bearers include bearers that can understand the data generation period and the data amount for each of the bearers to some extent. Setting the SPS for each bearer enables the SPS suitable for the data generation period and the data amount for the bearer to be set.

The DRAT threshold is set to each bearer. Thus, setting the SPS for each bearer enables the SPS and the DRAT threshold suitable for the data generation period and the data amount for the bearer to be set. Thus, the frequency of occurrence of the problems described in the first to ninth embodiments can be reduced. Further, the requirements such as a desired communication quality and an allowable amount of latency for each bearer can be flexibly met.

The SPS may be set not for each bearer but for each bearer group including one or more bearers. For example, grouping bearers with the equivalent data generation period and the equivalent data amount into the same group can reduce the SPS that the eNB sets to one UE, and simplify the control.

Second Modification of Tenth Embodiment

The second modification will disclose another method for solving the problems described in the tenth embodiment. The eNB measures the time variation in the amount of the uplink transmission data from the UE, and derives the time variation in a probability of generating the uplink transmission data, using a result of the measurement. In other words, the eNB estimates the time variation in the probability of generating the uplink transmission data, using the result of the measurement on the time variation in the amount of the uplink transmission data.

Statistical processing may be performed to derive the probability of generating the uplink transmission data. The eNB derives with which uplink transmission timing the probability of generating the uplink transmission data is higher, from the derived time variation in the probability of generating the uplink transmission data.

The eNB sets the SPS, schedules the SPS resources, and activates and deactivates the SPS, according to the derived time variation in the probability of generating the uplink transmission data. Consequently, the eNB can set the SPS suitable for the time variation in the amount of the uplink transmission data from the UE.

Although deriving the time variation in the probability of generating the uplink transmission data is disclosed, the time variation in the generated amount of data may be derived. Consequently, it is possible to derive to which degree the radio resources should be allocated as the SPS resources. Thus, the SPS resources can be scheduled with higher precision.

Although a method in which the eNB measures the time variation in the amount of the uplink transmission data from the UE and derives the time variation in the probability of generating the uplink transmission data using a result of the measurement is disclosed, the UE may measure the time variation in the generated amount of the uplink transmission data and derive the time variation in the probability of generating the uplink transmission data using the result of the measurement. Statistical processing may be performed to derive the probability of generating the uplink transmission data. The UE derives with which uplink transmission timing the probability of generating the uplink transmission data is higher, from the derived time variation in the probability of generating the uplink transmission data.

The UE notifies the eNB of information on the derived time variation in the probability of generating the uplink transmission data or information indicating with which uplink transmission timing the probability of generating the uplink transmission data is higher. The RRC signaling may be used for this notification. The RRC signaling enables a notification of a larger amount of information.

The notification may be made via the MAC signaling or using the L1/L2 control signal. Although the amount of information that can be notified becomes less if the MAC signaling or the L1/L2 control signal is used, the time required for the notification can be shortened. Thus, the derived value can be reflected with low latency.

The eNB sets the SPS, schedules the SPS resources, and activates and deactivates the SPS, using the information notified from the UE on the derived time variation in the probability of generating the uplink transmission data or information indicating with which uplink transmission timing the probability of generating the uplink transmission data is higher.

Since the UE can directly measure the time variation in the uplink transmission data to be generated in the UE, the UE can derive the time variation in the probability of generating the uplink transmission data, irrespective of the radio propagation environment.

The UE may derive the SPS settings, the scheduling of the SPS resources, and the timing of the SPS according to the derived time variation in the probability of generating the uplink transmission data. The UE notifies the eNB of information on the derived SPS settings, the scheduling of the SPS resources, and the timing of the SPS. Consequently, the amount of information to be notified from the UE to the eNB can be reduced.

The time variation in the amount of the uplink transmission data or in the generated amount of the uplink transmission data may be measured for each UE or for each bearer, and the time variation in the probability of generating the uplink transmission data may be derived for each UE or for each bearer. Alternatively, the operations may be performed for each content or for each application. Thus, the SPS settings suitable for each UE, each bearer, each content, or each application are possible.

Although deriving the time variation in the probability of generating the uplink transmission data is disclosed, the time variation in the generated amount of uplink transmission data may be derived. Alternatively, time variation in the uplink throughput may be derived. It is possible to derive to which degree the radio resources should be allocated as the SPS resources, using these values. Thus, the SPS resources can be scheduled with higher precision.

Application of the former method to the SPS settings in the 2nd eNB can reduce a state where no uplink transmission data is generated in the UE irrespective of allocation of the SPS resources to the 2nd eNB. The method may also be applied to the SPS settings in the 1st eNB. This enables the appropriate SPS settings in the 1st eNB.

Setting the SPS, scheduling the SPS resources, and deriving the timing of the SPS according to the time variation in the probability of generating the uplink transmission data are disclosed as the former method. As an alternative method, the method may be applied to set the DRAT threshold. The DRAT threshold is set according to the time variation in the probability of generating the uplink transmission data.

For example, the eNB may notify the other eNBs under the DC of the result of deriving the time variation in the probability of generating the uplink transmission data. The other eNBs may derive the time variation in the probability of generating the uplink transmission data for the other eNBs. The other eNBs may set the DRAT threshold using these pieces of information. The other eNBs can flexibly determine how to set the DRAT threshold as they understand the time variation in the probability of generating the uplink transmission data for each of the eNBs.

The methods disclosed in the first and second modifications of the tenth embodiment may be applied to the 1st eNB. The methods may be applied as necessary without being limited to cases where the DC is set. Thus, the same advantages as those according to the first and second modifications of the tenth embodiment can be produced.

Eleventh Embodiment

3GPP is studying the pre-scheduling as a method for reducing latency when the UE in a connected state with one cell starts uplink transmission. The pre-scheduling methods include methods using the SPS and dynamic scheduling (see Non-Patent Document 10). However, these methods are methods when the UE is connected to one cell. None of the pre-scheduling methods when the dual connectivity (DC) is set is discussed.

As previously described, 3GPP introduces the DC which allows a UE to communicate with two eNBs through connection thereto. The DC is an important technique to increase the communication capacity. The eleventh embodiment will disclose a method for setting the pre-scheduling when the DC is set to the UE.

The eNB that supports the pre-scheduling is limited to the MeNB. The eNB that supports the pre-scheduling may be statically predetermined in, for example, a standard.

Although, for example, the SeNB sets the pre-scheduling to the UE independently if the eNB that supports the pre-scheduling is not predetermined, the UE may not support the pre-scheduling for the SeNB. In such a case, the malfunction may occur and the DC may not be executed. Thus, statically predetermining the eNB that supports the pre-scheduling can clarify the method for setting the pre-scheduling in the DC between the UE and the eNB and reduce the malfunction.

Data can be transmitted from both of the eNBs in the DC. Thus, when only the MeNB supports the pre-scheduling, the reduction amount of latency in uplink transmission is less as a bearer.

Thus, the SeNB may support the pre-scheduling in the DC. Thus, the eNBs that support the pre-scheduling may be the MeNB and the SeNB in the DC. The pre-scheduling may be supported simultaneously for the MeNB and the SeNB. The pre-scheduling settings for the MeNB and the SeNB may be identical.

The methods disclosed in the previous embodiments may be applied to the SPS settings of the 2nd eNB in the split bearer.

Consequently, the pre-scheduling can be set to the SeNB. Thus, since the time to start transmission of the uplink data to the SeNB can be shortened, the reduction amount of latency in uplink transmission can be increased as a bearer.

The settings of the pre-scheduling in the MeNB may be different from those in the SeNB. The pre-scheduling may be set separately for each of the MeNB and the SeNB, that is, independently.

Since the DC enables the setting of the split configuration for each bearer, data to be transmitted to each eNB differs. For example, a bearer #1 enables the setting of a split bearer using the MeNB and the SeNB, and a bearer #2 enables the setting of a non-split bearer that is not the split bearer, using the MeNB. Since the data to be transmitted to each eNB to which the DC is set differs, the amount of latency required for each eNB to which the DC is set also differs.

As described above, enabling the independent pre-scheduling settings for each eNB allows for the pre-scheduling settings in consideration of settings of the bearer. Consequently, the amount of latency required for each eNB to which the DC is set can be satisfied.

The pre-scheduling settings of the respective eNBs may be set independently for each bearer. In the previous example, the pre-scheduling settings of the MeNB and the SeNB in the bearer #1 may be set independently from those for the MeNB in the bearer #2. Thus, enabling the independent pre-scheduling settings of the respective eNBs for each bearer can satisfy the required amounts of latency which differ for the bearers.

The entity that sets the pre-scheduling and a method for notifying the UE of the pre-scheduling settings will be disclosed.

The MeNB makes the pre-scheduling settings. The MeNB makes the pre-scheduling settings of the MeNB and the SeNB. The MeNB notifies the SeNB of the pre-scheduling settings of the SeNB. The settings may include cancellation of the settings. The SeNB may allow or disallow the pre-scheduling settings notified from the MeNB. The SeNB may notify the MeNB of information indicating the allowance when allowing the pre-scheduling settings notified from the MeNB. The SeNB may notify the MeNB of information indicating the disallowance when disallowing the pre-scheduling settings notified from the MeNB.

Upon receipt of the notification of the disallowance from the SeNB, the MeNB may change the pre-scheduling settings and notify the SeNB of the settings again. The reconfiguration may be repeated until the notification of the allowance is received from the SeNB.

The X2 interface may be used to notify the pre-scheduling settings to be made between the MeNB and the SeNB. The pre-scheduling settings may be included in a message for adding, canceling, or correcting the SeNB to be notified. The X2 interface may be used to notify, between the SeNB and the MeNB, the information indicating allowance or disallowance.

The MeNB notifies the UE of the pre-scheduling settings for at least one of the MeNB and the SeNB. A Uu interface may be used to notify the pre-scheduling settings. The pre-scheduling settings may be included in a message for setting the DC to be notified.

As an alternative method, the SeNB may make the pre-scheduling settings of the SeNB. The SeNB notifies the UE of the pre-scheduling settings.

Alternatively, the SeNB may notify the MeNB of the pre-scheduling settings of the SeNB. The X2 interface may be used to notify the pre-scheduling settings. Upon receipt of the pre-scheduling settings of the SeNB from the SeNB, the MeNB may notify the UE of the settings.

The pre-scheduling settings largely depend on the settings of the bearer. Thus, the MeNB that sets the DC using information set to the bearer more preferably makes the pre-scheduling settings.

According to the method disclosed in the eleventh embodiment, the pre-scheduling can be performed even when the DC, which allows the UE to communicate with two eNBs through connection thereto, is set to the UE.

This enables increase in the communication capacity, reduction in the latency in the uplink transmission, and large capacity communication for a shorter period of time.

The eleventh embodiment discloses the method for setting the prescheduling when the DC is set to the UE. The prescheduling may be set to the SeNB not when the DC has been set to the UE but when the DC is set to the UE. The eNB may set the pre-scheduling to the SeNB when the SeNB is added. The method disclosed in the eleventh embodiment may be applied to set this pre-scheduling as necessary.

Consequently, the scheduling requesting process conventionally performed by the UE on the SeNB can be omitted in the process of adding the SeNB. Since the time required for the scheduling request can be reduced accordingly, the time to set the DC can be shortened. The latency in the communication can be reduced, and the large capacity communication can be performed for a shorter period of time.

The method disclosed in the eleventh embodiment is applicable when the SeNB is corrected, not limited to when the SeNB is added. The pre-scheduling method disclosed in the eleventh embodiment may be applied to the corrected SeNB as necessary. Thus, the same advantages as those according to the eleventh embodiment can be produced.

The previous embodiments and the modifications thereof disclose that the split bearer is supported in the dual connectivity (DC). Not limited to the DC, the embodiments and the modifications may be applied also to the multi-connectivity that allows communication using a plurality of eNBs. The embodiments and the modifications may be applied, when the split bearer is performed in the multi-connectivity and the uplink data is not transmitted, according to a predetermined rule, to one or more eNBs configuring the multi-connectivity. Thus, the same advantages as those according to the previous embodiments and the modifications thereof can be produced.

Although the previous embodiments and the modifications thereof disclose that the SPS is set when the UL split bearer is set and the DRAT is used, they may be applied not when the SPS is set but when the dynamic scheduling is performed. A method for setting the DRAT threshold when the SPS is set using the DRAT and a method for performing the padding transmission may be applied when the dynamic scheduling is performed using the DRAT.

The same problems as those in setting the SPS occur, for example, when: the DRAT threshold is set; the 2nd eNB notifies the UE of the uplink grant in the dynamic scheduling; and the uplink transmission data is not generated in the UE with the resources of the uplink grant. The same problems also occur when: the DRAT threshold is set; the 2nd eNB performs the dynamic scheduling in the pre-scheduling; and the uplink transmission data is not generated in the UE with the pre-scheduled resources.

The methods disclosed in the first and second embodiments, the first modification of the second embodiment, the fifth, seventh, and eighth embodiments, and the first and second modifications of the eighth embodiment may be applied as necessary to solve such problems. The same advantages can be produced, even when the DRAT is used and the dynamic scheduling is performed.

Twelfth Embodiment

There is a technique with which the eNB transmits a signal using the beamforming for forming beams only in a direction of the UE by a plurality of antennas during communication between the eNB and the UE. The UE is a target communication terminal. Methods for covering a service area of the eNB via the beamforming include a method for arranging a plurality of beams whose directions are fixed. Here, the eNB switches the fixed beam along with the movement of the UE to use appropriate beams.

Figure 26:
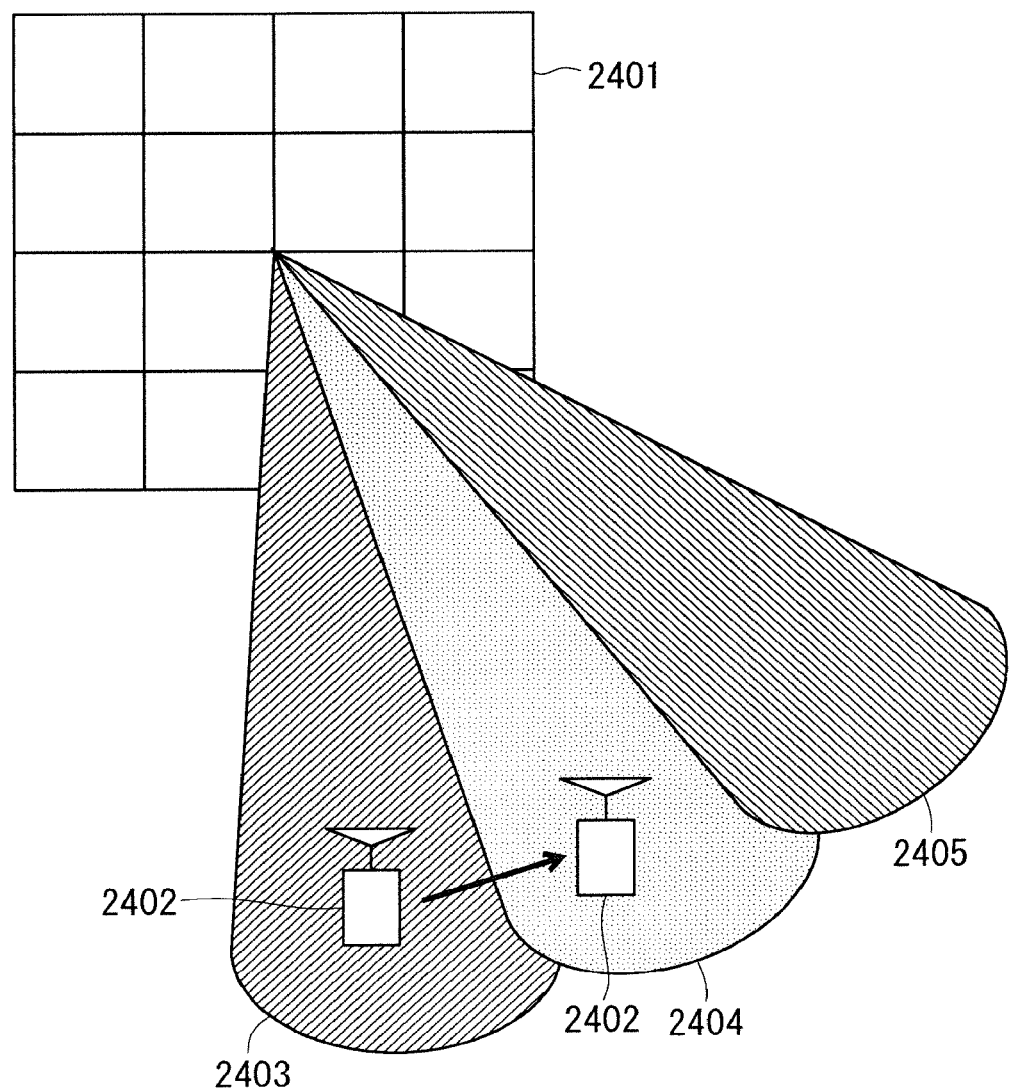
FIG. 26 illustrates beamforming using a multi-element antenna.

FIG. 26 illustrates the beamforming using a multi-element antenna. The eNB configures the antenna 408 illustrated in FIG. 4 by a multi-element antenna 2401.

The eNB forms beams only in a predetermined direction using part or whole of the multi-element antenna 2401, and communicates with a UE 2402 to be a communication target. As illustrated in FIG. 26, coverages 2403, 2404, and 2405 of the respective beams formed by the beamforming are narrow coverages. The eNB forms a plurality of beams with the narrow coverages fixed in different directions to cover the service area.

When the UE 2402 exists in the coverage 2403 of the first beam, the eNB communicates with the UE 2402 via the first beam. When the UE 2402 moves to the coverage 2404 of the second beam, the eNB switches from the first beam to the second beam to communicate with the UE 2402. In the following description, a beam to be switched may be referred to as a "source beam", and a switched beam may be referred to as a "target beam".

With the beamforming, the service area configured by the eNB is divided into the narrow coverages configured by the plurality of beams. Thus, a high-speed switching process is required when the UE moves between the beams.

The eNB may form a plurality of beams via the beamforming for each cell. In such a case, a beam switching process occurs when the UE moves between the beams within one cell.

In the beam switching process, the UE needs to synchronize with the target beam, and the eNB needs to schedule the radio resources of the target beam for the UE. Thus, it is requested to provide a high-speed and stable communication system that can accelerate the beam switching process when the UE moves between the beams.

Shortening the time required for such a synchronizing process and the process for scheduling the radio resources will be effective to accelerate the beam switching process.

The twelfth embodiment will disclose a method for shortening the time required for the process of synchronizing with the target beam and the process for scheduling the radio resources via the target beam.

The conventional method for synchronizing with a cell may be applied to the process of synchronizing with the target beam. The UE receives at least one of a synchronization signal, a reference signal, and a discovery signal each of which is to be transmitted in the target beam, to synchronize with the target beam. When the synchronization signal is, for example, the P-SS and the S-SS used in the conventional cell, the synchronization may be performed using the synchronization signal. Here, at least six subframe durations are required to perform the synchronization.

A synchronization code which corresponds one-to-one with the PCI for each cell is allocated to the synchronization signal used in the conventional cell. However, the PCI for each cell does not enable the UE to recognize with which beam the synchronization has been performed. A solution to such problems may be providing an identifier for each beam and allocating a code which corresponds one-to-one with the identifier for each beam to a synchronization signal of the beam.

Consequently, the UE can recognize with which beam the synchronization has been performed. The identifier for each beam may be piggybacked on the identifier for each cell to be allocated. The UE can recognize which cell and further which beam.

The code which corresponds one-to-one with the identifier for each beam may be also allocated to the reference signal and the discovery signal. Upon receipt of the reference signal or the discovery signal and obtainment of the identifier for each beam, the UE can recognize which beam the received beam is.

However, application of the conventional process of synchronizing with the cell, for example, application of a synchronization signal as previously described requires at least six subframe durations until the UE receives the synchronization signal. The time required for the conventional process of synchronizing with the cell will be further increased in consideration of the time required for the synchronizing process in the UE. The method for shortening the time required for these synchronizing processes will be disclosed.

The eNB provides synchronization between the beams in the same cell. The eNB may provide synchronization between the beams in the eNB. Specifically, the eNB provides synchronization of the subframe timing and the slot timing between the beams. The eNB may provide synchronization of a system frame number (SFN), the radio frame number, and the slot number.

Consequently, even when the beam switching process is performed for the UE, the need for the synchronization with the target beam is eliminated. Thus, the time required for the synchronization process can be reduced.

A method for shortening the processing time of scheduling the radio resources with the target beam will be disclosed. The scheduling information on the radio resources in the downlink is included in downlink control information (DCI). The downlink control information is notified to the UE using the L1/L2 control signal. Under the LTE, the downlink control information is mapped to the PDCCH or the EPDCCH. An identifier (C-RNTI) dedicated to the UE for each cell masks the CRC of the L1/L2 control signal. Through detection of its own C-RNTI, the UE can receive the L1/L2 control signal addressed to itself to obtain the downlink control information, and also obtain the scheduling information of the radio resources in the downlink.

The UE-dedicated identifier that masks the CRC of the L1/L2 control signal may be the same identifier for the beams in the cell. The identifier may be the identifier dedicated to the UE for each cell. Consequently, the UE may apply the C-RNTI used for the source beam to the target beam even when the beam switching process is performed in the cell.

Thus, the scheduling information can be received upon immediate receipt of the L1/L2 control signal after the synchronization with the target beam.

The eNB may notify the UE of the C-RNTI in advance in the beam switching process across the cells. The eNB may notify the UE of the C-RNTI via the source beam. Thus, in the beam switching process between the cells, the scheduling information can be received upon immediate receipt of the L1/L2 control signal after the synchronization with the target beam.

As an alternative method, an identifier dedicated to the UE for each beam (will be referred to as a "B-RNTI") may be provided. The identifier dedicated to the UE for each beam may mask the CRC of the L1/L2 control signal. The eNB may notify the UE of the B-RNTI in advance in the beam switching process. The eNB may notify the UE of the B-RNTI via the source beam. Thus, upon immediate receipt of the L1/L2 control signal after the synchronization with the target beam, the scheduling information can be received in the beam switching process.

The B-RNTI dedicated to the UE for each beam eliminates the need for performing different controls in switching the beam in the cell and in switching the beam between the cells. Thus, control in the UE and the eNB can be facilitated. Since there is no need to determine which control should be performed, the time required for the determination can be reduced.

The scheduling information on the radio resources in the uplink is similarly included in the downlink control information (DCI). Thus, the methods disclosed above are applicable.

In the uplink, the UE needs to request the radio resources from the eNB. In the conventional cells, a Scheduling Request (SR) or the PRACH requests the radio resources. The UE requests the radio resources from the target beam in the beam switching process.

However, the SR and the PRACH should be executed not with an arbitrary timing but with a predetermined timing set by the eNB. Thus, the UE has to wait for the predetermined timing set by the eNB, which causes latency. It is highly probable that this latency causes a failure in communication in the beam switching process with the narrow coverage.

A method for solving such a problem will be disclosed. The eNB schedules the radio resources in the uplink with the target beam in advance for the UE. The eNB may schedule the radio resources in the uplink with the target beam via the source beam in advance for the UE.

For example, the SPS may be used as the method for scheduling the radio resources in the uplink with the target beam. The eNB may notify, via the source beam, the UE of the settings of the uplink SPS with the target beam. The UE may notify the settings of the uplink SPS before synchronizing with the target beam. Upon receipt of the settings of the uplink SPS with the target beam, the UE performs the uplink transmission using the notified settings of the uplink SPS with the target beam after synchronizing with the target beam.

The SPS settings may include not only the time interval but also an offset and scheduling information of the SPS resources. A radio frame number and a subframe number may be specified as the offset.

Methods for setting and activating the SPS with the target beam will be disclosed. The time interval of the SPS resources may be set by the source beam. Setting the time interval of the SPS resources by the source beam eliminates the need for the settings from the target beam in switching the beam, and can shorten the time for the switching process.

The scheduling information of the SPS resources may be set by the source beam. Setting the scheduling information of the SPS resources by the source beam eliminates the need for the settings from the target beam in switching the beam, and can shorten the time for the switching process.

Alternatively, the scheduling information of the SPS resources may be set by the target beam. Consequently, the scheduling information including allocation of the resources according to a load state with the target beam can be set.

The SPS may be activated and deactivated by the source beam. Activating and deactivating the SPS by the source beam eliminates the need for the settings from the target beam in switching the beam, and can shorten the time for the switching process.

Alternatively, the SPS resources may be activated and deactivated by the target beam. This enables the activation and the deactivation according to a load state with the target beam. The use efficiency of the resources can be increased more than that via the source beam in advance. This is because when the SPS resources are activated and deactivated by the source beam in advance, the SPS resources need to be continuously allocated to the UE for a duration from the activation and the deactivation in advance by the source beam for the target UE until the actual SPS after switching to the target beam, and thus the radio resources are wasted.

The methods for setting the SPS and activating and deactivating the SPS via the source beam or the target beam may be appropriately combined for use. Thus, the settings according to, for example, a load state and the allowable amount of latency with the target beam are possible.

Consequently, the UE can reduce the latency because the UE need not request, from the eNB, the radio resources in the uplink with the target beam after switching the beam. Thus, the time for the beam switching process can be shortened.

Although application of the uplink SPS is disclosed as the method for scheduling the radio resources in the uplink with the target beam, the downlink SPS may be applied as the method for scheduling the radio resources in the downlink with the target beam. The eNB may notify the UE of the settings of the downlink SPS with the target beam, via the source beam. Consequently, the UE can receive the set SPS resources according to the settings of the downlink SPS after switching to the target beam.

For example, the dynamic scheduling may be used as an alternative method for scheduling the radio resources in the uplink with the target beam. Without receiving the scheduling request from the UE, the eNB transmits the scheduling information of the radio resources to the UE in an arbitrary subframe via the target beam. The UE receives the L1/L2 control signal for each subframe after synchronizing with the target beam to enable reception of the scheduling information of the radio resources that the eNB has transmitted in the arbitrary subframe. Thus, the UE can perform the uplink transmission using the received scheduling information of the uplink radio resources.

Consequently, the UE can reduce the latency because the UE need not request, from the eNB, the radio resources in the uplink. Thus, the time for the beam switching process can be shortened.

Figure 27:
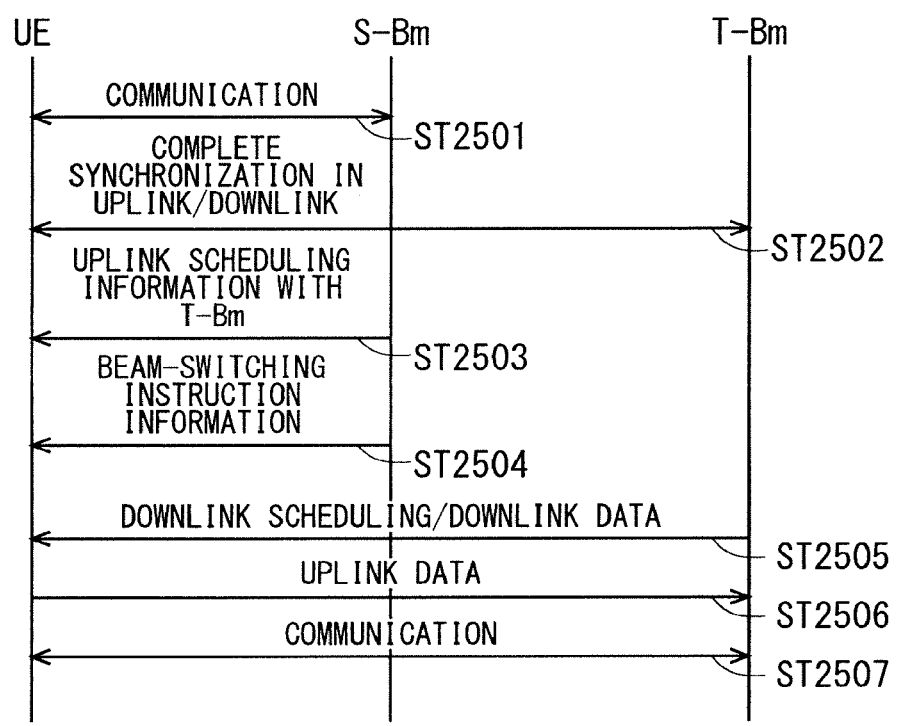
FIG. 27 illustrates an example sequence on a method for shortening the time for a beam switching process according to the twelfth embodiment.

FIG. 27 illustrates an example sequence on the method for shortening the beam switching process according to the twelfth embodiment. FIG. 27 illustrates switching from the source beam (S-Bm) to the target beam (T-Bm).

In Step ST2501, the eNB communicates with the UE via the source beam. The eNB provides synchronization between the source beam and the target beam in advance. The eNB provides synchronization of the subframe timing and the slot timing between the source beam and the target beam. The eNB also provides synchronization of the system frame number (SFN), the radio frame number, and the slot number. Consequently, the UE synchronizes with the target beam when synchronizing with the source beam in Step ST2502. Step ST2502 indicates that the UE has also synchronized with the target beam.

In Step ST2503, the eNB notifies, via the source beam, the UE of the uplink scheduling information with the target beam. Here, the uplink scheduling information with the target beam is setting information of the uplink SPS with the target beam. The SPS setting information includes not only the time interval but also the offset and the scheduling information of the SPS resources.

Information on the target beam may be notified together with the uplink scheduling information with the target beam. Examples of the information on the target beam include an identifier of the target beam, etc. When the identifier dedicated to the UE for each beam is used, the identifier may be notified. The RRC signaling may be used to notify the uplink scheduling information with the target beam and the information on the target beam.

In Step ST2504, the eNB notifies the UE of a beam-switching instruction via the source beam. Beam-switching instruction information may be provided and notified. The beam-switching instruction information is information that triggers the switching of the beam. In other words, the information triggers the UE to receive the L1/L2 control signal of the target beam. The RRC signaling may be used to notify the beam-switching instruction information.

Upon receipt of the beam-switching instruction information, the UE receives the downlink control information of the target beam in Step ST2505 since the UE has already synchronized with the target beam in Step ST2502. The UE receives the PDCCH or the EPDCCH for each subframe. Upon receipt of the downlink control information of the target beam, the UE can obtain the downlink scheduling information and also receive the downlink data according to the scheduling information.

In the presence of the uplink transmission data, the UE transmits the uplink data to the eNB with the SPS resources set for the target beam in Step ST2506.

Consequently, the UE and the eNB can communicate via the target beam in Step ST2507.

The method disclosed in the twelfth embodiment can reduce degradation in the communication quality and a communications blackout that are caused by requiring time for the synchronization process and the process of scheduling the radio resources when the beam is switched according to the movement of the UE between the beams with the narrow coverages through the beamforming.

When the position of an antenna including a plurality of antenna elements for forming beams is the same for each of the beams, distances of paths from the antennas to the UE are almost the same. Thus, there is no need to change the uplink transmission timing between the source beam and the target beam. However, when the position of the antenna is different for each beam, the UE may need to perform synchronization in the uplink with the target beam.

A method for performing synchronization in the uplink will be disclosed. The eNB instructs the UE to execute a Random Access (RA) process with the target beam. The L1/L2 control signal with the target beam may be used to instruct execution of the RA process with the target beam. Alternatively, the PDCCH or the EPDCCH with the target beam may be used.

The UE may perform the RA process with the target beam upon receipt of the instruction to execute the RA process with the target beam. The eNB can adjust the uplink transmission timing of the UE through the RA process with the target beam. Specifically, the uplink transmission timing is notified to the UE in the RA process. This may be referred to as "Timing Advanced".

Consequently, the UE can perform synchronization in the uplink with the target beam.

A method for determining whether the eNB performs synchronization in the uplink will be disclosed. The eNB obtains information on the position of an antenna. For example, each antenna obtains information on the position of its own antenna using, for example, the Global Positioning System (abbreviated as GPS), and notifies the eNB of the information on the position of its own antenna. Alternatively, an operator sets information on the position of the antenna to the eNB. Alternatively, the operator may set the information on the position of the antenna to the OAM, and the OAM may notify the information to the eNB.

The eNB determines whether synchronization in the uplink is necessary for the UE to be a communication target with the target beam, using the obtained information on the position of the antenna.

When determining that the synchronization in the uplink is necessary, the eNB may instruct the UE to execute the RA process with the target beam.

Consequently, the eNB can determine whether to perform synchronization in the uplink as necessary. When the synchronization in the uplink is unnecessary, the RA process can be eliminated. Even when the synchronization in the uplink is necessary, the RA process instructed from the eNB will have no collision, and the control can be simplified.

In the example illustrated in FIG. 27, the uplink scheduling information with the target beam and the instruction for switching to the target beam are notified via different signalings. As an alternative example, the uplink scheduling information with the target beam and the instruction for switching to the target beam may be notified via the same signaling. This can produce the same advantages.

Thirteenth Embodiment

The twelfth embodiment discloses that the eNB notifies the UE of the beam switching instruction for instructing the UE to switch the beam. For example, the process in Step ST2504 of FIG. 27 is described.

The twelfth embodiment discloses that the RRC signaling is used to notify the beam-switching instruction information. However, when the RRC signaling is used, the information is divided into a plurality of transport blocks. Thus, the information is transmitted in a plurality of Transmission Time Intervals (TTIs). The retransmission is applied for each transport block. Thus, the time for transmitting and receiving the RRC signaling becomes longer. The thirteenth embodiment will disclose a method for shortening the time to notify the beam switching instruction in the beam switching process.

The beam switching instruction is issued via the MAC signaling or the L1/L2 signaling. Dedicated-control channels are used as the L1/L2 signaling. Examples of the dedicated-control channels include the PDCCH and the EPDCCH. Since the MAC signaling and the L1/L2 signaling are performed in 1 TTI, the time for the beam switching instruction can be shortened more than by the RRC signaling.

The HARQ is applied in the MAC signaling. Thus, an advantage of reducing the reception error rate can be produced more than by the L1/L2 signaling.

The HARQ is not applied in the L1/L2 signaling. Thus, the beam switching instruction can be notified with lower latency than by the MAC signaling.

Which one of the MAC signaling and the L1/L2 signaling is used may be statically determined in, for example, a standard. Alternatively, both of the methods may be supported, and used in different manners semi-statically or dynamically. The methods of the MAC signaling and the L1/L2 signaling may be used in different manners, for example, depending on the radio propagation environment. The L1/L2 signaling may be used when the radio propagation environment is superior, whereas the MAC signaling may be used when the radio propagation environment is not superior.

The entity that determines whether to switch the beam will be disclosed. The MAC protocol in the eNB may determine whether to switch the beam. Not the RRC but the MAC makes the determination, so that determination on which beam should be used can be included together with the scheduling or included in the scheduling. Each of the beams may be treated as a radio resource configured on the same time-frequency axes. A plurality of beams may be treated as a plurality of radio resources, and the scheduling may be performed using the plurality of radio resources.

Setting, to the MAC, the entity that determines whether to switch the beam is suitable for notifying the beam switching instruction using a signaling lower than or equal to the MAC signaling. Setting, to the MAC, the entity that determines whether to switch the beam can shorten the processing time from determining to switch the beam to transmitting the beam switching instruction.

The following (1) to (3) will be disclosed as specific examples of information for making the UE switch the beam besides the beam switching instruction. The information for making the UE switch the beam may be referred to as "beam-switching relevant information" in the following description.

(1) Information on to which beam a beam is switched: for example, an identifier of the target beam (2) Information for resetting each protocol of the source beam and setting each protocol of the target beam (3) Information for enabling communication with the target beam The specific example (1) will be specifically described. The information may be allocated for each predetermined network range. The information may be allocated, for example, for each MME. Alternatively, the information may be allocated for each eNB. Alternatively, the identifier of the beam may be allocated for each cell. Alternatively, a predetermined number of identifiers of beams may be prepared in advance, and the identifier of the beam may be allocated from among the identifiers.

The allocation of the identifier of the beam in a narrow network range can further reduce the amount of information necessary for the identifier of the beam, such as the number of bits. For example, allocating the identifier of the beam for each cell can reduce the amount of the beam-switching relevant information, such as the number of bits.

The specific example (2) will be specifically described. The same PDCP is used between beams in the same cell. Thus, information on whether to at least reset or reconfigure the PDCP in switching the beam is unnecessary. Preventing both the resetting and the reconfiguring may be statically predetermined in, for example, a standard. The UE may hold the settings of the PDCP of the source beam in the beam switching process in the same cell.

The same RLC is used between the beams in the same cell. Thus, information on whether to at least reset or reconfigure the RLC in switching the beam is unnecessary. Preventing both the resetting and the reconfiguring may be statically predetermined in, for example, a standard. The UE may hold the settings of the RLC of the source beam in the beam switching process in the same cell.

Only part of the settings of the MAC differs between the beams in the same cell. Thus, information on whether to at least reset or reconfigure the MAC in switching the beam is unnecessary. In other words, the resetting is unnecessary, and only the different settings may be reconfigured. Reconfiguring only the different settings may be statically predetermined in, for example, a standard. The UE may hold only the settings of the MAC identical to those of the source beam in the beam switching process in the same cell.

Part or the whole of the settings of the PHY differs between the beams in the same cell. Information on whether to at least reset or reconfigure the PHY is necessary.

The following (3-1) to (3-3) will be disclosed as specific examples of the information that enables communication with the target beam in the specific example (3).

(3-1) The UE identifier with the target beam: for example, the C-RNTI or the B-RNTI (3-2) Information on the MAC and the PHY with the target beam: Examples of the information include common settings of radio resources, the main settings of the MAC, dedicated settings of the PHY, etc. The parameter representing the common settings of radio resources is "radioResourceConfigCommon". The parameter representing the main settings of the MAC is "mac-MainConfig". The parameter representing the dedicated settings of the PHY is "physicalConfigDedicated".

(3-3) Information on the SCell with the target beam

Without any change from the settings of the source beam, the information in the (3-1) to (3-3) may be omitted. Only the information changed from the settings of the source beam may be notified. Consequently, the amount of information can be reduced.

The eNB notifies the UE of information for making the UE switch the beam besides the beam switching instruction, so that the UE can communicate via the target beam upon receipt of the beam-switching instruction information.

The eNB notifies the UE of the beam-switching relevant information to make the UE switch the beam. A method for notifying the beam-switching relevant information will be disclosed.

The eNB notifies the UE of the beam-switching relevant information via the source beam. The eNB notifies the beam-switching relevant information before notifying the beam switching instruction. The beam-switching relevant information may be notified via the RRC signaling. A new message may be newly provided for notifying the beam-switching relevant information.

A new message for notifying configuration information for measuring beams (may be referred to as "beam-measuring configuration information") may be provided. The beam-measuring configuration information may be configuration information for measuring the CSI.

The UE measures beams using the beam-measuring configuration information notified from the eNB. The UE measures beams included in the beam-measuring configuration info nation. The UE reports a result of the measured beams to the eNB. The eNB may notify the UE of the settings for reporting. The settings for reporting may be notified together with the beam-measuring configuration information or included in the beam-measuring configuration information to be notified. The eNB receives the report on the result of the measured beams from the UE, and determines the beams to be used for the UE.

A method in which the UE reports the result of the measured beams to the eNB will be disclosed. The received power of the reference signal or the discovery signal to be transmitted for each beam is measured for measuring the beams. Alternatively, the reception quality may be measured. Alternatively, an amount including interference power and noise power may be measured. Examples of the amount include a signal-to-noise ratio (abbreviated as SNR), a signal-to-interference-plus-noise ratio (abbreviated as SINR), etc.

The measurement result of the cell is conventionally reported via the RRC signaling. Although the result may be reported via the RRC signaling, the time for transmitting and receiving the RRC signaling becomes longer as described above.

As an alternative method, the result may be notified via the MAC signaling or the L1/L2 signaling. The result may be notified using the MAC CE. Alternatively, the result may be mapped to a PUCCH to be notified. Alternatively, the result may be mapped to a PUSCH to be notified. Alternatively, the CQI report or the CSI report may be used.

Consequently, the UE can report the result of the measured beams to the eNB earlier. Since the time from measuring the beams to the beam switching process can be shortened, the eNB can select a more appropriate target beam.

Figure 28:
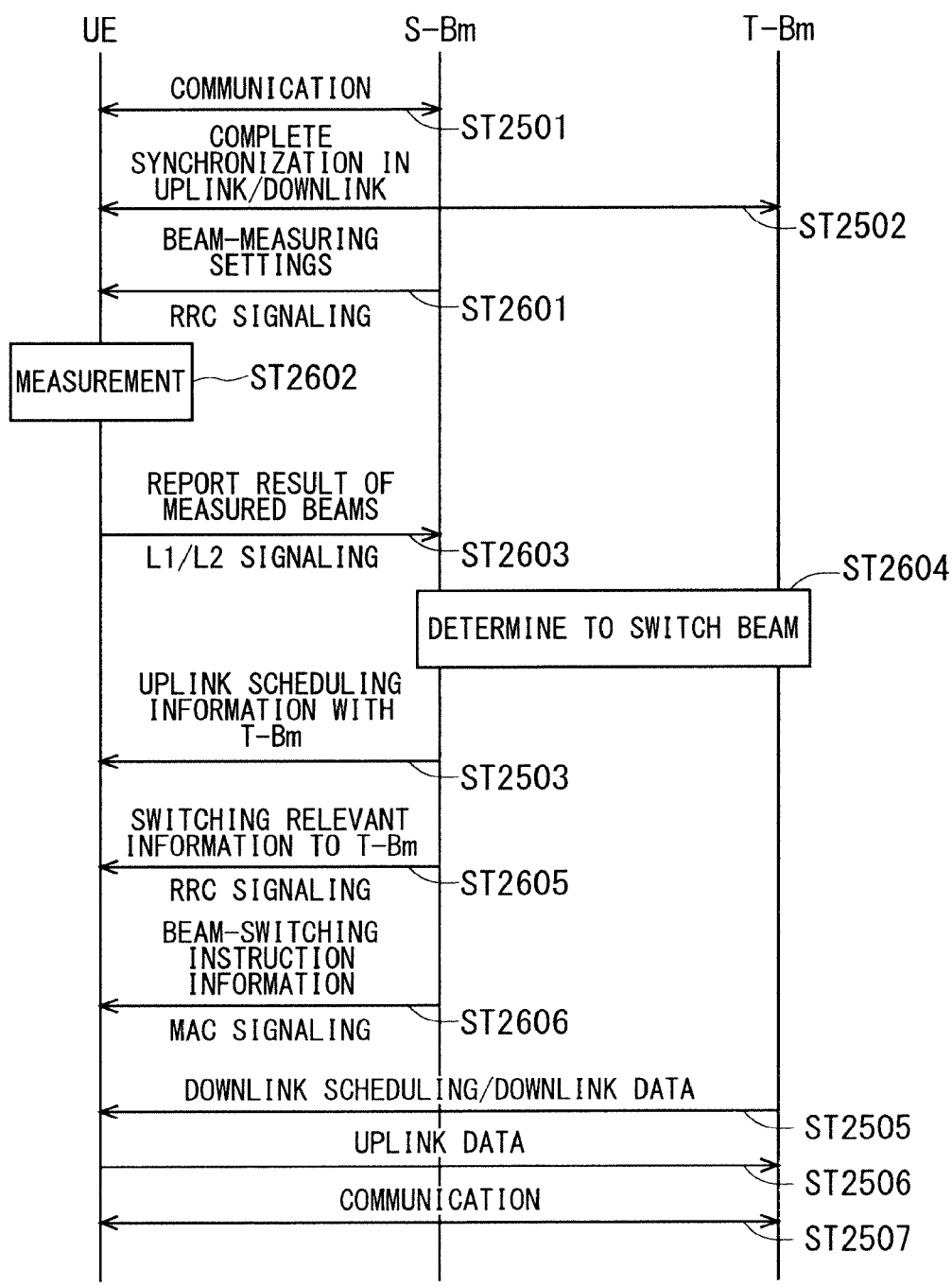
FIG. 28 illustrates an example sequence on the method for shortening the time for the beam switching process according to the thirteenth embodiment.

FIG. 28 illustrates an example sequence on the method for shortening the time for the beam switching process according to the thirteenth embodiment. FIG. 28 illustrates switching from the source beam (S-Bm) to the target beam (T-Bm).

FIG. 28 illustrates providing synchronization between the source beam and the target beam. FIG. 28 illustrates that the scheduling information of the radio resources with the target beam is notified in advance via the source beam. Since the sequence illustrated in FIG. 28 is similar to the sequence illustrated in FIG. 27, the same step numbers will be assigned to the same Steps and the common description thereof will be omitted. Here, the differences will be mainly described.

In Step ST2601, the eNB notifies the UE of the beam-measuring configuration information via the source beam. The RRC signaling is used to notify the beam-measuring configuration information.

Upon obtainment of the beam-measuring configuration information from the eNB, the UE measures, in Step ST2602, a reference signal transmitted for each beam for measurement that is included in the beam-measuring configuration information.

In Step ST2603, the UE notifies the eNB of a result of the measurement obtained in Step ST2602 via the source beam. The L1/L2 signaling may be used to notify the result of the measurement. The result is reported, for example, using the PUCCH that is an uplink control channel. This can accelerate the signaling.

In Step ST2603, the UE may not report the entirety of the result of the measurement obtained in Step ST2602. The UE may report only the result of the measured beams whose report has been triggered, according to a predetermined criterion. In Step ST2601, the eNB notifies the UE of these settings together with the beam-measuring configuration information.

Upon receipt of the result of the measured beams in Step ST2603, the eNB determines whether to switch the beam for the UE in Step ST2604. For example, when the reception quality of the source beam is degraded lower than or equal to a predetermined threshold and a beam with the reception quality superior to that of the source beam exists, the eNB determines to switch to the beam with the superior reception quality.

The eNB that has determined to switch the beam for the UE in Step ST2604 notifies the UE of the beam-switching relevant information of the target beam via the source beam in Step ST2605. The RRC signaling may be used to notify the beam-switching relevant information.

When the eNB notifies the UE of the scheduling information of the uplink radio resources with the target beam, via the source beam in Step ST2503, the beam-switching relevant information may be notified via the same signaling as that for this notification.

In Step ST2606, the eNB notifies the UE of the beam-switching instruction information for switching to the target beam, via the source beam. The MAC signaling is used to notify the beam-switching instruction information. This can accelerate the signaling.

Upon receipt of the beam-switching relevant information of the target beam in Step ST2605 and the beam-switching instruction information in Step ST2606, the UE receives the L1/L2 control signal of the target beam.

The eNB that has transmitted, to the UE, the beam-switching instruction information for switching to the target beam in Step ST2606 performs scheduling for the UE with the target beam.

In the sequence illustrated in FIG. 28, messages for notifying the beam-switching relevant information and the beam-measuring configuration information are separately notified. As an alternative method, the beam-switching relevant information may be included in the message for notifying the beam-measuring configuration information to be notified. The beam-switching relevant information on beams that are included in the beam-measuring configuration information may be included. Here, the eNB notifies the UE of the beam-switching relevant information before determining the target beam. Thus, the target beam included in the beam-switching relevant information has not been determined yet. Thus, information not on the target beam but on the beams for measurement may be included. There may be one or more beams for measurement. The beams may include the source beam.

For example, when the target beam is not determined by the first beam-measuring configuration information, the eNB may notify the UE again of the other beam-measuring configuration information. The beam-switching relevant information may be included in the message for notifying the beam-measuring configuration information to be notified.

Although application of the RRC signaling for notifying the beam-switching relevant information from the eNB to the UE is disclosed, the MAC signaling may be used as an alternative method. The information may be notified using the MAC CE. A new MAC CE may be provided, and information necessary for switching the beam may be included in the MAC CE. The information may be notified together with the beam-switching instruction information.

The information to be notified via the RRC signaling may be separated from the information to be notified via the MAC signaling. For example, a larger amount of information is notified via the RRC signaling, and a smaller amount of information is notified via the MAC signaling. The setting information that enables communication with the target beam in the specific example (3) may be notified via the RRC signaling, and the identifier of the target beam in the specific example (1) may be notified via the MAC signaling. Notifying the smaller amount of information via the MAC signaling enables transmission of the information with the beam-switching instruction information in 1 transport block.

When the beam-switching instruction information is notified via the MAC signaling, the MAC signaling is performed in 1 TTI. Since the RRC signaling is divided into a plurality of transport blocks to be transmitted, the RRC signaling is performed over a plurality of TTIs. The time to notify the beam-switching instruction information can be shortened via the MAC signaling more than via the RRC signaling even in consideration of the retransmission.

The method disclosed in the thirteenth embodiment can reduce degradation in the communication quality and the communications blackout that are caused by requiring time for signaling when the beam is switched according to the movement of the UE between the beams with the narrow coverages through the beamforming.

The time from measuring the beams to switching the beam can be shortened when the result of the measured beams is reported via the L1/L2 signaling. Consequently, the beam can be switched to a more appropriate beam, and degradation in the communication quality, and the communication latency and the communications blackout that are caused by failure in the switching can be reduced.

First Modification of Thirteenth Embodiment

The thirteenth embodiment discloses the method for shortening the time to notify the beam-switching instruction information. The first modification will disclose another method.

The eNB determines one or more beams to be candidates for the target beam for the UE to be a communication target. The candidates for the target beam may include the source beam. The beams to be the candidates for the target beam may be referred to as "target candidate beams".

The eNB determines to activate or deactivate a part or the entirety of the target candidate beams.

The eNB notifies the UE of an instruction to activate or deactivate the part or the entirety of the target candidate beams. The notification is made via the source beam. The MAC signaling or the L1/L2 signaling may be used for the notification.

The UE synchronizes with the beam instructed for activation, and receives the downlink control information (DCI). The UE may receive the L1/L2 control signal. The UE receives, for example, the PDCCH or the EPDCCH. The UE receives the PDCCH or the EPDCCH, and detects the DCI addressed to its own UE using the C-RNTI or the B-RNTI.

In the presence of a plurality of beams instructed for activation, the UE receives the downlink control information of the plurality of beams.

The eNB determines a beam to be used for the UE from among the activated beams, and switches from the source beam to the determined beam. The eNB communicates with the UE via the switched beam. Here, the eNB need not notify the UE of the beam-switching instruction information. This is because the UE receives the downlink control information of the beam instructed for activation, and thus can obtain the scheduling information for communication even upon start of the communication via any beam.

Thus, the need for notifying the beam-switching instruction information can be eliminated. The eNB can communicate with the UE via the switched beam immediately after determining to switch the beam for the UE. Thus, the time for the beam switching process can be shortened.

After determining the target candidate beams, the eNB may notify the UE of the beam-switching relevant information of the target candidate beams. The method disclosed in the twelfth embodiment is applicable to the notification of the beam-switching relevant information.

The target candidate beams are determined as necessary. The target candidate beams may be determined periodically or according to the UE's report on the result of the measured beams. When the target candidate beams are changed, the beam-switching relevant information of the target candidate beams may be notified to the UE again. The notification may be limited to the beam-switching relevant information on a beam to be changed, deleted, or added. The notification on the beam to be deleted may be limited to the beam identifier.

The beam to be activated or deactivated is determined as necessary. The beam to be activated or deactivated may be determined periodically or according to the UE's report on the result of the measured beams. When the beam to be activated or deactivated is changed, the instruction to activate or deactivate the beam may be notified to the UE again. The notification may be limited to the beam to be changed.

The beam available for the UE is determined as necessary. The beam available for the UE may be determined periodically or according to the UE's report on the result of the measured beams. Thus, even when the beam available for the UE is changed, the beam-switching instruction information need not be notified.

Figure 29:
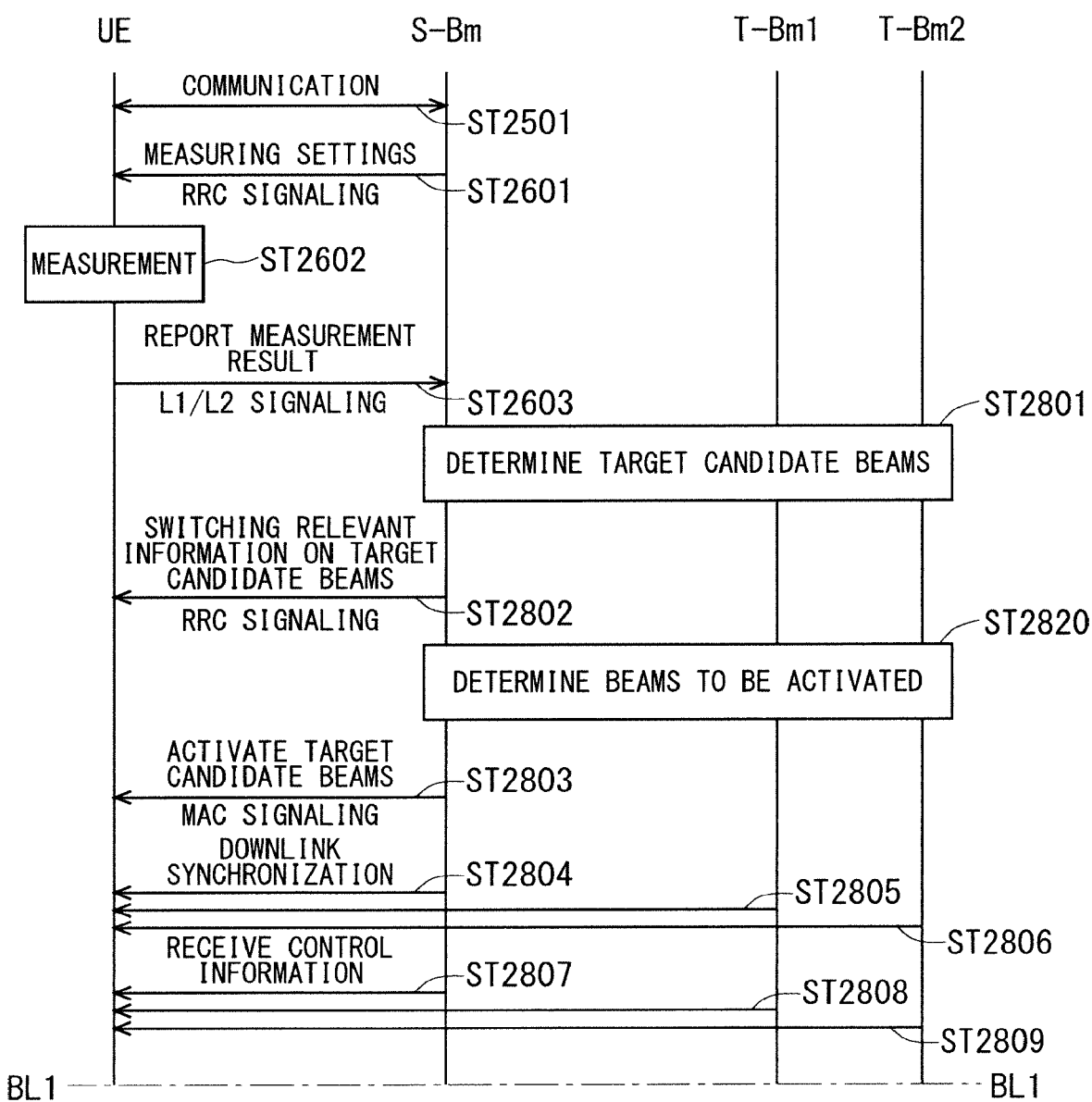
FIG. 29 illustrates an example sequence on the method for shortening the time for the beam switching process according to the first modification of the thirteenth embodiment.
Figure 30:
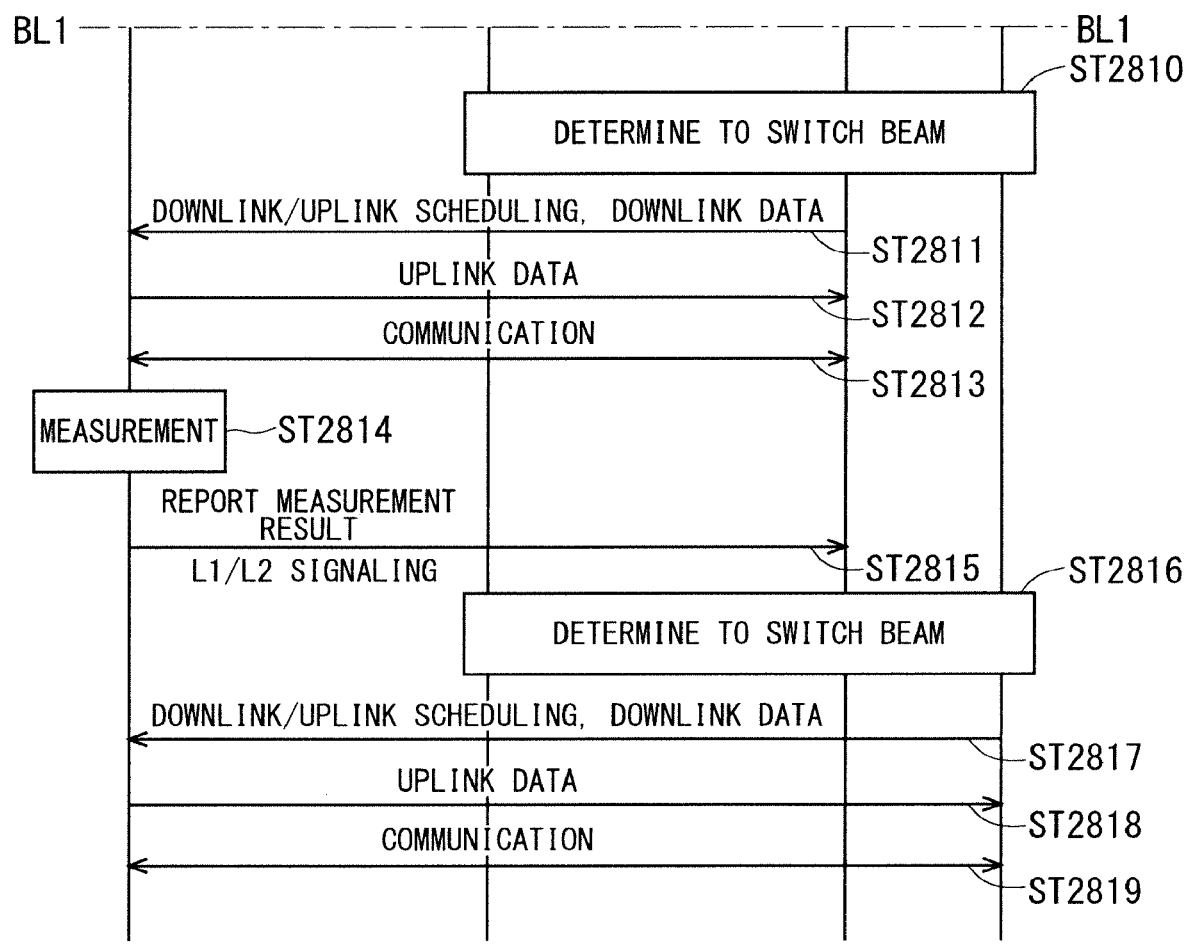
FIG. 30 illustrates the example sequence on the method for shortening the time for the beam switching process according to the first modification of the thirteenth embodiment.

FIGS. 29 and 30 illustrate an example sequence on the method for shortening the time for the beam switching process according to the first modification of the thirteenth embodiment. FIGS. 29 and 30 are connected across a location of a border BL1. FIGS. 29 and 30 illustrate switching from the source beam (S-Bm) to the first target beam (T-Bm1). FIGS. 29 and 30 also illustrate switching from the first target beam (T-Bm1) to the second target beam (T-Bm2). FIGS. 29 and 30 also illustrate no synchronization between the source beam and the target beam. FIGS. 29 and 30 also illustrate no application of the source beam for notifying, in advance, the scheduling information of the radio resources with the target beam. Since the sequence illustrated in FIGS. 29 and 30 is similar to the sequence illustrated in FIG. 28, the same step numbers will be assigned to the same Steps and the common description thereof will be omitted. Here, the differences will be mainly described.

Upon receipt of the report on the result of the measured beams in Step ST2603, the eNB determines, in Step ST2801, the beams to be the candidates for the target beam for the UE using the report on the result of the measured beams from the UE. For example, the eNB selects the top two beams whose measurement result on the reception quality from the UE is higher than or equal to a predetermined threshold, and determines three beams of the selected beams and the source beam as the target candidate beams. The eNB may consider not only the report on the result of the measured beams but also other information in determining the target candidate beams.

Upon determination of the target candidate beams for the UE in Step ST2801, the eNB notifies the UE of the beam-switching relevant information on the target candidate beams via the source beam in Step ST2802. For example, the RRC signaling is used to notify the beam-switching relevant information on the target candidate beams.

In Step ST2820, the eNB determines, from among the target candidate beams, beams to be at least activated or deactivated for the UE. The latest report on the result of the measured beams that has been received from the UE may be used for this determination.

In Step ST2803, the eNB notifies the UE of the beams to be at least activated or deactivated. The beams to be at least activated or deactivated are notified via, for example, the MAC signaling. The beams to be activated are the source beam (S-Bm), the first target beam (T-Bm1), and the second target beam (T-Bm2) herein.

Upon receipt of the beams to be at least activated or deactivated in Step ST2803, the UE synchronizes with the beams to be activated in Steps ST2804, ST2805, and ST2806.

The UE further receives the downlink control information of the beams to be activated in Steps ST2807, ST2808, and ST2809. The UE receives, for example, EPDCCHs of the source beam, the first target beam, and the second target beam. The beam-switching relevant information on the target candidate beams obtained in Step ST2802 may be used to receive these.

In Step ST2810, the eNB determines to switch the beam. Specifically, the eNB determines to switch from the source beam to the first target beam. The latest report on the result of the measured beams that has been received from the UE may be used for this determination.

Upon determination to switch to the first target beam in Step ST2810, the eNB transmits the scheduling information for the UE to the UE via the first target beam in Step ST2811. Examples of the scheduling information include the DCI. The DCI includes at least one of the downlink scheduling information and the uplink scheduling information. The downlink data may be transmitted in the same subframe as that of the downlink scheduling information.

Upon receipt of the downlink control information of the first target beam in Step ST2808, the UE obtains the scheduling information to be transmitted via the first target beam in Step ST2811.

Upon obtainment of the scheduling information of the first target beam in Step ST2811, if the scheduling information includes the downlink scheduling information, the UE receives the downlink data according to the downlink scheduling information.

Upon obtainment of the scheduling information of the first target beam in Step ST2811, if the scheduling information includes the uplink scheduling information, the UE transmits the uplink data to the eNB according to the uplink scheduling information in Step ST2812. Alternatively, the UE may transmit a scheduling request. Alternatively, the UE may transmit a Buffer Status Report (BSR).

Consequently, the UE and the eNB can communicate via the first target beam in Step ST2813.

FIGS. 29 and 30 will disclose a method for further switching the target beam. In Step ST2813, communication with the UE is performed via the first target beam. Although the first target beam is the source beam for the UE, the first target beam continues to be referred to as the first target beam herein.

In Step ST2814, the UE measures the beams. Beam measurement settings included in the beam-measuring configuration information notified in Step ST2601 are used for measuring the beams. Beam measurement settings newly notified via the first target beam may be used for the measurement, which is not illustrated.

Upon measurement of the beams in Step ST2814, the UE reports a result of the measured beams to the eNB in Step ST2815. The first target beam is used for the reporting. The L1/L2 signaling may be used for the reporting. This can accelerate the signaling.

Upon receipt of the report on the result of the measured beams in Step ST2815, the eNB determines to switch the beam in Step ST2816. The beam is switched to one of the beams to be activated that have been notified to the UE in Step ST2803.

Upon determination to switch the beam to the second target beam in Step ST2816, the eNB transmits the scheduling information for the UE to the UE via the second target beam in Step ST2817. Examples of the scheduling information include the DCI. The DCI includes at least one of the downlink scheduling information and the uplink scheduling information. The downlink data may be transmitted in the same subframe as that of the downlink scheduling information.

The UE that has received the downlink control information of the second target beam in Step ST2809 obtains the scheduling information transmitted via the second target beam in Step ST2817.

Upon obtainment of the scheduling information of the second target beam in Step ST2817, if the scheduling information includes the downlink scheduling information, the UE receives the downlink data according to the downlink scheduling information.

Upon obtainment of the scheduling information of the second target beam in Step ST2817, if the scheduling information includes the uplink scheduling information, the UE transmits the uplink data to the eNB according to the uplink scheduling information in Step ST2818. Alternatively, the UE may transmit a scheduling request. Alternatively, the UE may transmit a Buffer Status Report (BSR).

Consequently, the UE and the eNB can communicate via the second target beam in Step ST2819.

Consequently, the beam can be switched without any notification of the beam-switching instruction information to the UE.

Thus, the time from determination to switch the beam in the eNB to enabling communication via the switched beam determined by the UE can be shortened.

Consequently, the beam can be switched to a more appropriate beam in a shorter period of time even in a circumstance where the beam is frequently switched, and degradation in the communication quality, and the communication latency and the communications blackout that are caused by failure in the switching can be reduced.

Notifying the UE of the beams to be candidates for the target beam enables the UE to limit the number of beams with which the UE synchronizes and from which the UE receives the control information. Thus, the methods disclosed above can reduce the processing load of the UE and the power consumption, achieve miniaturization, and cut cost.

The beams to be activated or deactivated are a part or the entirety of the target candidate beams in the examples disclosed above.

As an alternative method, the beams to be activated may be identical to the target candidate beams. In such a case, the eNB need not perform the process of determining the beams to be activated.

The notification of the switching relevant information on the target candidate beams may be regarded as a notification to activate the target candidate beams.

The UE synchronizes with the beams notified by the switching relevant information on the target candidate beams as the activated beams to receive the downlink control information.

For example, the processes in Steps ST2820 and ST2803 in FIGS. 29 and 30 are omitted.

Consequently, the amount of signaling from the eNB to the UE can be reduced. The control in the eNB and the UE can be simplified.

The maximum number of beams that can be received by the UE may be set. The maximum number of beams that can be received may be determined according to the UE capability. Alternatively, the maximum number of beams that can be received may be provided as a parameter of the UE capability.

The UE may notify the eNB of the maximum number of beams that can be received by the UE in advance. The notification of the UE capability may be used.

Consequently, the eNB can set the target candidate beams or the number of beams to be activated smaller than or equal to the maximum number of beams that can be received by the UE.

The downlink control information of a beam may include the scheduling information of the other beams. For example, the downlink control information of the source beam may include the scheduling information of the target beam.

In FIGS. 29 and 30, for example, the eNB notifies the downlink scheduling information or the uplink scheduling information of the first target beam via the source beam in Step ST2811. The UE receives the downlink scheduling information or the uplink scheduling information of the first target beam via the source beam in Step ST2811. Upon recognizing the scheduling information of the first target beam, the UE receives radio resources of the first target beam according to the downlink scheduling information when the scheduling information is the downlink scheduling information. Alternatively, upon recognizing the scheduling information of the first target beam, the UE performs transmission via the radio resources of the first target beam according to the uplink scheduling information when the scheduling information is the uplink scheduling information.

Consequently, when a plurality of beams are available for the UE, the UE can flexibly use the plurality of beams.

For example, the beam via which the control information is transmitted can be made different from the beam for data communication. This allows for transmission of the control information via one of the plurality of beams and the data communication via the other one of the beams. The eNB can use each of the beams in consideration of, for example, a coverage, a load, and a radio propagation situation of the beam. For example, the control information may be transmitted via a beam with a broader coverage, and the data communication may be transmitted via a beam with a narrower coverage. Consequently, the beams can be operated according to the characteristics of the respective beams.

Second Modification of Thirteenth Embodiment

How to handle unsuccessfully transmitted data becomes a problem, if communication via the source beam is not yet successful and the beam switching process is generated during the movement of the UE between the beams.

The second modification will disclose a method for handling the unsuccessfully transmitted data in the beam switching process. The unsuccessfully transmitted data via the source beam is transmitted via the target beam. This process may be performed in both the uplink and the downlink.

The details will be further disclosed. The unsuccessfully transmitted data via the source beam under the PDCP is discarded, and the transmission is performed again via the target beam. Consequently, the data loss in switching the beam can be reduced.

When the UE moves between the beams with the narrow coverages formed by the beamforming techniques, the beam may be frequently switched. With the method disclosed above, retransmission of the PDCP data will be repeated dozens of times. The retransmission of the same PDCP data may be repeated dozens of times. Thus, problems occur, e.g., latency in the data communication does not allow the required QoS to be fulfilled. A method for solving such problems will be disclosed.

In switching the beam, the retransmission via the target beam is performed from data under the HARQ process with the source beam. Upon receipt of an instruction to move the beam, the UE performs the retransmission via the target beam from the data under the HARQ process with the source beam. When transmitting the instruction to move the beam to the UE, the eNB performs the retransmission via the target beam from the data under the HARQ process with the source beam.

The following (1) and (2) will be disclosed as specific examples of a method for performing the retransmission via the target beam from the data under the HARQ process with the source beam:

(1) applying the target beam from the initial transmission of the data under the HARQ process; and (2) performing the HARQ with the source beam and the target beam.

A specific example of a method for applying the target beam from the initial transmission of the data under the HARQ process in the specific example (1) will be disclosed. FIG. 31 illustrates an example sequence on the method for applying the target beam from the initial transmission of the data under the HARQ process according to the second modification of the thirteenth embodiment. A method in which the UE issues, first, a scheduling request (SR) when the uplink data is transmitted via the target beam will be described.

In Step ST2901, the UE receives the downlink data from the eNB via the source beam.

In Step ST2902, the UE transmits the uplink data to the eNB via the source beam.

In Step ST2903, the eNB determines to switch the beam for the UE.

In Step ST2904, the eNB gives undelivered downlink data information to the target beam. The undelivered downlink data information is information on the downlink data under the HARQ process with the source beam. The process is performed within the same eNB when the source beam and the target beam are from the same eNB. Here, the information on the downlink data under the HARQ process may be applied from the source beam to the target beam.

The information on the downlink data under the HARQ process with the source beam may be any information with which data to be transmitted via the target beam can be identified.

In Step ST2905, the eNB notifies the UE of the beam-switching instruction information via the source beam.

Upon receipt of the beam-switching instruction information, the UE synchronizes with the target beam in Step ST2906.

In Step ST2907, the eNB performs the downlink scheduling to transmit the downlink data under the HARQ process with the source beam to the UE via the target beam from the initial transmission. Here, the eNB may use information on the downlink data under the HARQ process with the source beam. The information has been received in Step ST2904. The information may be notified via the target beam.

The eNB that has notified the UE of the scheduling information with the target beam for initial transmission of data in Step ST2907 transmits the downlink data under the HARQ process with the source beam to the UE according to the scheduling information via the target beam.

Upon receipt of the downlink scheduling information in Step ST2907, the UE receives the downlink data under the HARQ process with the source beam according to the scheduling information via the target beam in Step ST2908.

Thus, the downlink data under the HARQ process with the source beam can be communicated via the target beam.

Next, the uplink data will be described. Upon receipt of the beam-switching instruction information in Step ST2905, the UE transmits the scheduling request (SR) to the eNB via the target beam in Step ST2909. The UE transmits the SR to transmit the uplink data under the HARQ process with the source beam.

Upon receipt of the SR in Step ST2909, the eNB determines the uplink scheduling, and notifies the UE of the uplink scheduling information via the target beam in Step ST2910.

Upon receipt of the uplink scheduling information in Step ST2910, the UE transmits the UL data to the eNB according to the scheduling information in Step ST2911. The UE transmits the uplink data under the HARQ process with the source beam from the initial transmission.

Consequently, the data under the HARQ process with the source beam can be communicated via the target beam. Thus, retransmission of the PDCP data via the target beam becomes unnecessary. Even when the beam is frequently switched, the occurrence of retransmission of the PDCP data to be repeated dozens of times can be reduced.

Figure 32:
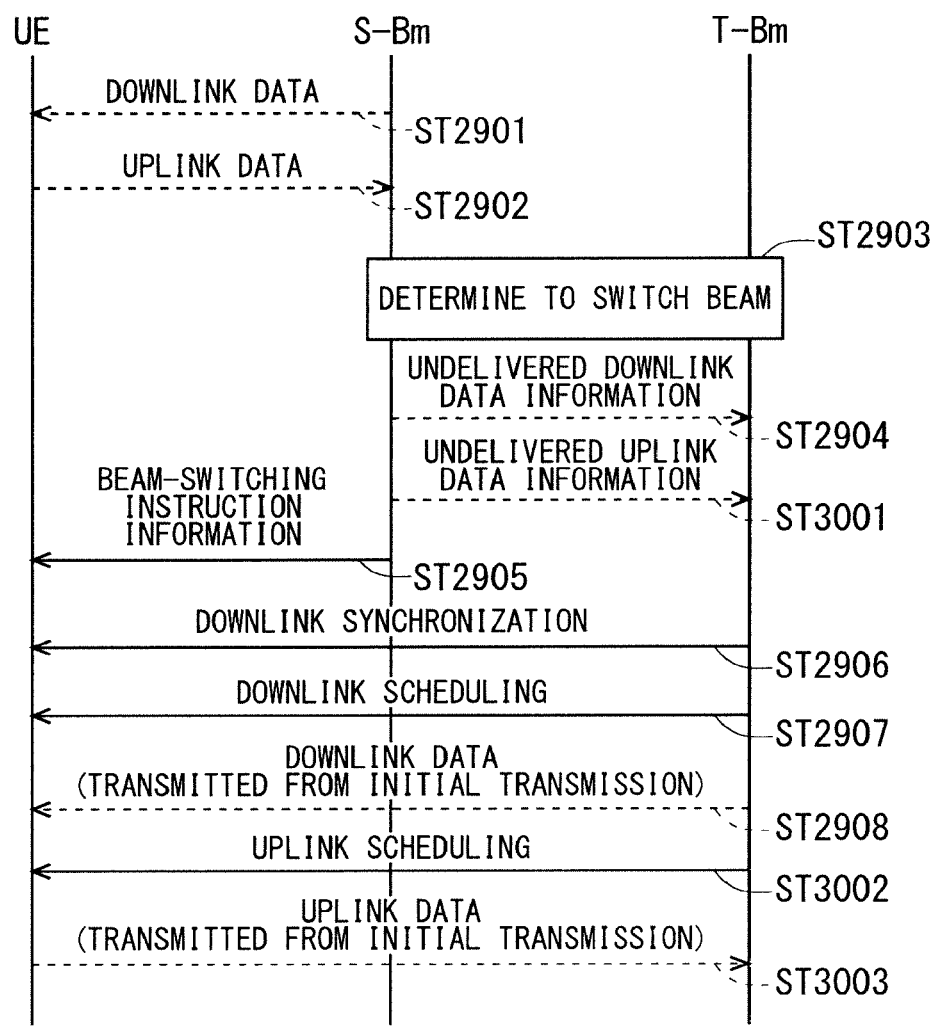
FIG. 32 illustrates another example sequence on the method for applying the target beam from the initial transmission of the data under the HARQ process according to the second modification of the thirteenth embodiment.

Another method will be disclosed. FIG. 32 illustrates another example sequence on the method for applying the target beam from the initial transmission of the data under the HARQ process according to the second modification of the thirteenth embodiment. FIG. 32 illustrates the sequence on the method for eliminating the need for transmitting the SR by the UE when the uplink data is transmitted via the target beam. Since the sequence illustrated in FIG. 32 is similar to the sequence illustrated in FIG. 31, the same step numbers will be assigned to the same Steps and the common description thereof will be omitted. Here, the differences will be mainly described. The description of the downlink data, which is the same as that for FIG. 31, will be omitted. Here, the uplink data will be described.

Upon determination to switch the beam for the UE in Step ST2903, the eNB gives information on the uplink data under the HARQ process with the source beam to the target beam in Step ST3001. The process is performed within the same eNB when the source beam and the target beam are from the same eNB. Here, the information on the uplink data under the HARQ process may be applied from the source beam to the target beam.

The information on the uplink data under the HARQ process with the source beam may be any information with which data to be transmitted via the target beam can be identified.

When transmitting the beam-switching instruction information to the UE in Step ST2905, the eNB performs the uplink scheduling to transmit the uplink data under the HARQ process with the source beam to the UE via the target beam from the initial transmission in Step ST3002. Here, the eNB may use information on the uplink data under the HARQ process with the source beam. The information has been received in Step ST3001. The information may be notified via the target beam.

Upon receipt of the scheduling information via the target beam for the initial transmission of the uplink data in Step ST3002, the UE transmits the uplink data under the HARQ process with the source beam to the eNB according to the scheduling information via the target beam from the initial transmission.

Without transmitting the SR from the UE via the target beam, the uplink data under the HARQ process with the source beam can be communicated via the target beam.

Since the UE need not transmit the SR, the power consumption of the UE can be reduced. Thus, the time from switching the beam to transmitting the uplink data can be shortened.

Figure 33:
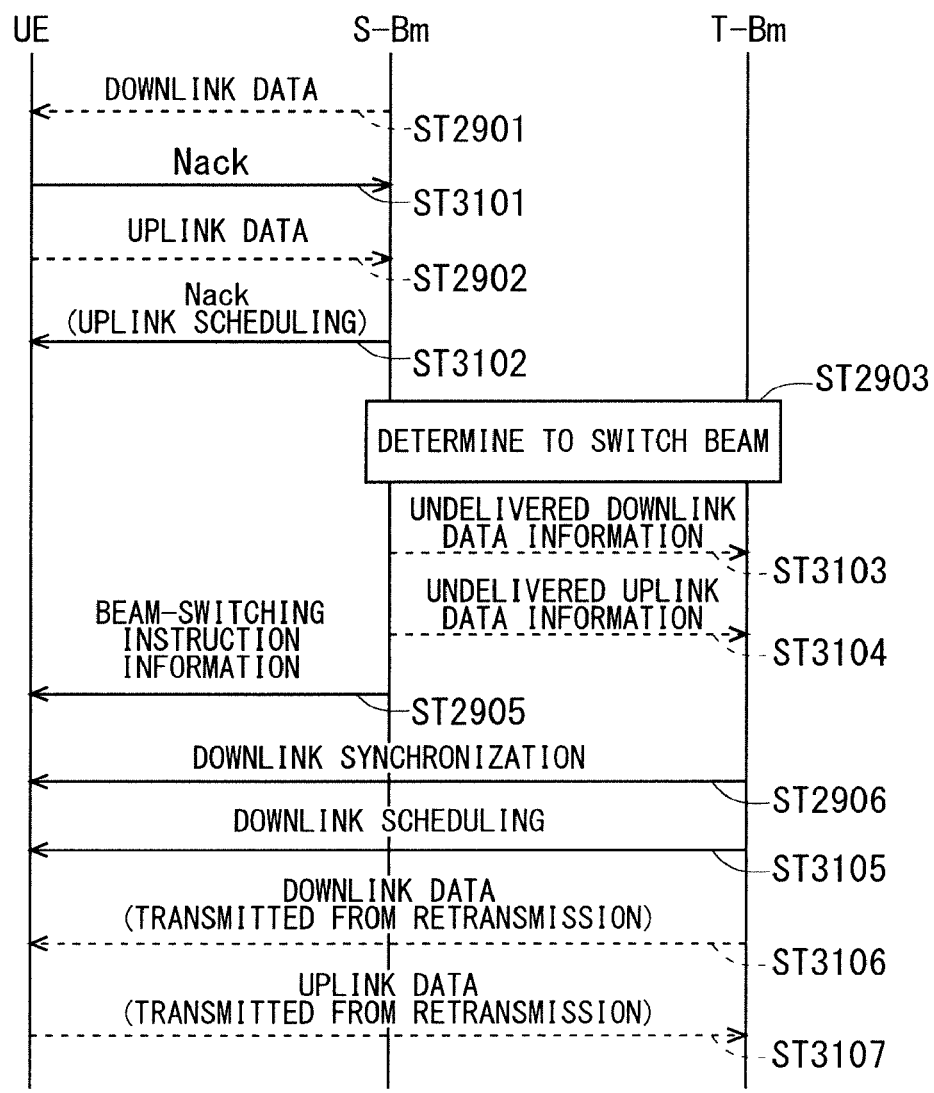
FIG. 33 illustrates an example sequence on a method for applying the target beam from retransmission of the data under the HARQ process according to the second modification of the thirteenth embodiment.

A specific example of a method for performing the HARQ with the source beam and the target beam in the specific example (2) will be disclosed. FIG. 33 illustrates an example sequence on the method for applying the target beam from retransmission of the data under the HARQ process according to the second modification of the thirteenth embodiment. FIG. 33 illustrates the sequence on the method for eliminating the need for transmitting the SR by the UE when the uplink data is transmitted via the target beam. Since the sequence illustrated in FIG. 33 is similar to the sequence illustrated in FIG. 32, the same step numbers will be assigned to the same Steps and the common description thereof will be omitted. Here, the differences will be mainly described.

The downlink data will be disclosed. The UE that has failed to receive the downlink data from the eNB in Step ST2901 transmits Nack that is information indicating transmission failure (unsuccessful transmission) to the eNB via the source beam in Step ST3101.

In Step ST2903, the eNB determines to switch the beam for the UE.

In Step ST3103, the eNB gives the undelivered downlink data info nation to the target beam. The undelivered downlink data information is information on the downlink data under the HARQ process with the source beam. The process is performed within the same eNB when the source beam and the target beam are from the same eNB. Here, the information on the downlink data under the HARQ process may be applied from the source beam to the target beam.

The information on the downlink data under the HARQ process with the source beam may be any information with which data to be transmitted via the target beam can be identified. Since Nack is received from the UE, the information may be information with which data for retransmission can be identified.

In Step ST2905, the eNB notifies the UE of the beam-switching instruction information via the source beam.

Upon receipt of the beam-switching instruction information, the UE synchronizes with the target beam in Step ST2906.

In Step ST3105, the eNB performs the downlink scheduling to transmit the downlink data under the HARQ process with the source beam to the UE via the target beam from retransmission. Here, the eNB may use information on the downlink data under the HARQ process with the source beam. The information has been received in Step ST3103. The information may be notified via the target beam.

The eNB that has notified the UE of the scheduling information for retransmission with the target beam for initial transmission of data in Step ST3105 transmits retransmission data of the downlink data under the HARQ process with the source beam to the UE according to the scheduling information via the target beam.

Upon receipt of the downlink scheduling information in Step ST3105, the UE receives the retransmission data of the downlink data under the HARQ process with the source beam according to the scheduling information via the target beam in Step ST3106.

Thus, the downlink data under the HARQ process with the source beam can be communicated via the target beam.

Although FIG. 33 discloses that the eNB transmits the first retransmission data of the downlink data via the target beam, the application is not limited to the first retransmission data. The same process may be performed on data whose ordinal number is any. When Nack is continued with the source beam, the retransmission data obtained in switching the beam is transmitted via the target beam.

The uplink data will be disclosed. The eNB that has failed to receive the uplink data from the UE in Step ST2902 transmits Nack that is information indicating transmission failure (unsuccessful transmission) to the UE through the HARQ process in Step ST3102. Here, the uplink scheduling information for the retransmission data is notified.

In Step ST2903, the eNB determines to switch the beam for the UE.

Upon determination to switch the beam for the UE in Step ST2903, the eNB gives undelivered uplink data information that is information on the uplink data under the HARQ process with the source beam to the target beam in Step ST3104. The process is performed within the same eNB when the source beam and the target beam are from the same eNB. Here, the information on the uplink data under the HARQ process may be applied from the source beam to the target beam.

The information on the uplink data under the HARQ process with the source beam may be any information with which data to be transmitted via the target beam can be identified. Since Nack is transmitted to the UE, the information may include information with which the scheduling information for the uplink retransmission data can be identified.

Upon receipt of the beam-switching instruction information from the eNB in Step ST2905, the UE retransmits, in Step ST3107, the uplink data to the eNB via the target beam according to the scheduling information for retransmission of the uplink data. The UE receives this scheduling information via the source beam in Step ST3102.

The uplink scheduling information for retransmission that the eNB notifies the UE via the source beam in Step ST3102 may be uplink scheduling information for retransmission via the target beam.

In Step ST3102 in the sequence illustrated in FIG. 33, the eNB transmits Nack to the UE via the source beam, and also notifies the UE of the uplink scheduling information for the retransmission data. As an alternative method, the uplink scheduling information for the retransmission data may be notified via the target beam.

The eNB that has transmitted the beam-switching instruction information to the UE in Step ST2905 transmits the uplink scheduling information for the retransmission data to the UE via the target beam to transmit the retransmission data via the target beam.

Here, the eNB may use information on the uplink data under the HARQ process with the source beam. The information has been received in Step ST3104.

Upon receipt of the uplink scheduling information for the uplink retransmission data, the UE performs transmission from retransmission of the uplink data under the HARQ process with the source beam to the eNB according to the scheduling information via the target beam in Step ST3107.

Consequently, when the reception quality of the source beam is degraded, communication can be performed from the retransmission via the target beam.

Thus, the communication quality can be made superior earlier than that by the communication method via the target beam from the initial transmission.

Figure 34:
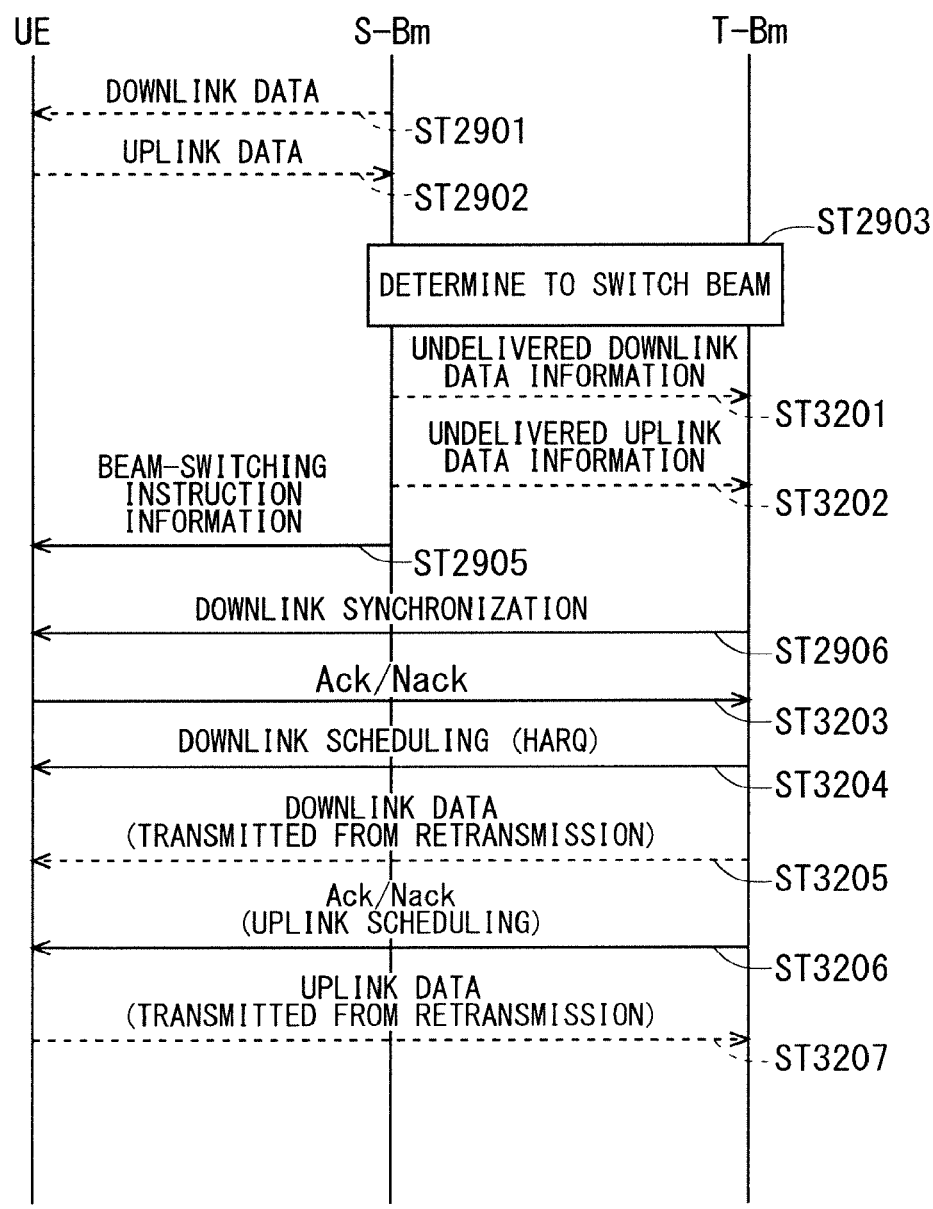
FIG. 34 illustrates an example sequence on a method for applying the target beam from successful transmission (Ack)/transmission failure (Nack) of the data under the HARQ process according to the second modification of the thirteenth embodiment.

Another method will be disclosed. FIG. 34 illustrates an example sequence on a method for applying the target beam from successful transmission (Ack)/transmission failure (Nack) of the data under the HARQ process according to the second modification of the thirteenth embodiment. FIG. 34 illustrates the sequence on the method for eliminating the need for transmitting the SR by the UE when the uplink data is transmitted via the target beam. Since the sequence illustrated in FIG. 34 is similar to the sequence illustrated in FIG. 33, the same step numbers will be assigned to the same Steps and the common description thereof will be omitted. Here, the differences will be mainly described.

The downlink data will be disclosed. In Step ST2901, the eNB transmits the downlink data to the UE. Assume that the UE fails to receive this downlink data.

In Step ST2903, the eNB determines to switch the beam for the UE. In Step ST3201, the eNB gives the undelivered downlink data information to the target beam. The undelivered downlink data information is information on the downlink data under the HARQ process with the source beam. The process is performed within the same eNB when the source beam and the target beam are from the same eNB. Here, the information on the downlink data under the HARQ process may be applied from the source beam to the target beam.

The information on the downlink data under the HARQ process with the source beam may be any information with which data to be transmitted via the target beam can be identified. The information may be information with which data for retransmission can be identified when Nack is subsequently received from the UE.

The UE that has failed to receive the downlink data from the eNB in Step ST2901 needs to transmit Ack/Nack to the eNB with a predetermined timing through the HARQ process. Here, assume that the UE receives the beam-switching instruction information from the eNB in Step ST2905 before transmitting the Ack/Nack.

Upon receipt of the beam-switching instruction information in Step ST2905, the UE synchronizes with the target beam in Step ST2906.

In Step ST3203, the UE transmits Nack to the eNB via the target beam. The UE transmits Ack when successfully receiving the downlink data in Step ST2901. Here, the UE transmits Nack because of its failure in reception, that is, a failure in transmission. The transmission timing of Ack/Nack may be a predetermined timing determined by the reception timing of the downlink data via the source beam.

The eNB derives the timing with which Ack/Nack is transmitted, using the information on the downlink data under the HARQ process with the source beam. The information has been received in Step ST3201. In Step ST3203, the eNB receives Nack from the UE with the derived timing.

Upon receipt of Nack from the UE in Step ST3203, the eNB performs the downlink scheduling to transmit the downlink data under the HARQ process with the source beam to the UE via the target beam from retransmission in Step ST3204. Here, the eNB may use information on the downlink data under the HARQ process with the source beam. The information has been received in Step ST3201.

The eNB that has notified the UE of the scheduling information for retransmission via the target beam in Step ST3204 transmits retransmission data of the downlink data under the HARQ process with the source beam to the UE according to the scheduling information via the target beam.

Upon receipt of the downlink scheduling information in Step ST3204, the UE receives the retransmission data of the downlink data under the HARQ process with the source beam according to the scheduling information via the target beam in Step ST3205.

Thus, the downlink data under the HARQ process with the source beam can be communicated via the target beam.

The uplink data will be disclosed. In Step ST2902, the eNB fails to receive the uplink data from the UE.

In Step ST2903, the eNB determines to switch the beam for the UE.

Upon determination to switch the beam for the UE in Step ST2903, the eNB gives the undelivered uplink data information to the target beam in Step ST3202. The undelivered uplink data information is information on the uplink data under the HARQ process with the source beam. The process is performed within the same eNB when the source beam and the target beam are from the same eNB. Here, the information on the uplink data under the HARQ process may be applied from the source beam to the target beam.

The information on the uplink data under the HARQ process with the source beam may be any information with which data to be transmitted via the target beam can be identified. The information may be information with which data for retransmission can be identified when Nack is subsequently transmitted to the UE.

The eNB that has failed to receive the uplink data from the UE in Step ST2902 needs to transmit Ack/Nack to the UE with an arbitrary timing through the HARQ process. Here, assume that the eNB transmits the beam-switching instruction information to the UE in Step ST2905 before transmitting the Ack/Nack.

Upon receipt of the beam-switching instruction information in Step ST2905, the UE synchronizes with the target beam in Step ST2906.

In Step ST3206, the eNB transmits Nack to the UE via the target beam. The eNB transmits Ack when successfully receiving the uplink data in Step ST2902. Here, the eNB transmits Nack because of its failure in reception, that is, a failure in transmission. The transmission timing of Ack/Nack may be an arbitrary timing.

In Step ST3206, the eNB transmits the uplink scheduling information to the UE together with Nack via the target beam to transmit the uplink data under the HARQ process with the source beam to the UE via the target beam from retransmission. Here, the eNB may use information on the uplink data under the HARQ process with the source beam. The information has been received in Step ST3202.

Although transmitting the uplink scheduling information together with Nack is disclosed, only the uplink scheduling information may be transmitted. The uplink scheduling information may indicate Nack. The scheduling information may include information indicating retransmission.

Upon receipt of the beam-switching instruction information from the eNB in Step ST2905, the UE retransmits, in Step ST3207, the uplink data to the eNB via the target beam according to the scheduling information for retransmission of the uplink data. The scheduling information has been received via the target beam in Step ST3206.

Consequently, when the reception quality of the source beam is degraded, communication can be performed from the transmission of Ack/Nack via the target beam.

Thus, the communication quality can be made superior earlier than that by the communication method via the target beam from the initial transmission.

According to the method disclosed in the second modification, data unsuccessfully transmitted via the source beam can be transmitted via the target beam.

With the appropriate combination of the methods disclosed above, the communication can be performed via the target beam from the initial transmission, the retransmission, or the transmission of Ack/Nack.

Application of these methods with the appropriate combinations with the determined timing to switch the beam enables the beam to be switched with the optimal timing according to, for example, the radio environment.

Thus, the beam can be switched to a more appropriate beam with the appropriate timing even in a circumstance where the beam is frequently switched, and degradation in the communication quality, and the communication latency and the communications blackout that are caused by failure in the switching can be reduced.

The twelfth embodiment to the second modification of the thirteenth embodiment disclose switching of the beam. The methods disclosed in the previous embodiments may be applied with the appropriate combinations to, as the switching of the beam, switching between the beams in the same cell, switching between the beams in different cells, or switching between the beams in different eNBs. Consequently, degradation in the communication quality caused by the process of switching the beam, and the communication latency and the communications blackout that are caused by failure in the switching can be reduced.

The embodiments and the modifications are merely illustrations of the present invention, and can be freely combined within the scope of the present invention. Any constituent elements of the embodiments and the modifications can be appropriately modified or omitted.

While the invention has been described in detail, the foregoing description is in all aspects illustrative and not restrictive. It is therefore understood that numerous modifications and variations can be devised without departing from the scope of the invention.

DESCRIPTION OF REFERENCES 901, 903 MeNB, 902, 904 SeNB, 905, 906, 2402 UE, 907, 909, 912, 914 MAC, 908, 910, 913, 915 RLC, 911, 916 PDCP, 2401 multi-element antenna, 2403, 2404, 2405 coverage.

The invention claimed is:

1. A communication system comprising:
a first base station device,
a second base station device, and
a communication terminal device capable of radio communication with the first base station device and the second base station device, wherein
the communication terminal device is configured to communicate with the first base station device via a first path for direct communication with the first base station device and via a second path for communication with the first base station device through the second base station device,
the communication terminal device is configured to:
transmit transmission data addressed to the first base station device to the first base station device and the second base station device when an amount of the transmission data exceeds a threshold, and
transmit the transmission data not to the second base station device but to the first base station device when the amount of the transmission data is smaller than or equal to the threshold, and
the second base station is configured to:
at a time when the second base station device is set to communicate with the communication terminal device with radio resources that are periodically allocated, change the threshold so that the communication terminal device transmits the transmission data to the first base station device and the second base station device, and
notify the communication terminal of the changed threshold.

2. A communication system comprising:
a first base station device,
a second base station device, and
a communication terminal device capable of radio communication with the first base station device and the second base station device, wherein
the communication terminal device is configured to communicate with the first base station device via a first path for direct communication with the first base station device and via a second path for communication with the first base station device through the second base station device,
the communication terminal device is configured to
transmit transmission data addressed to the first base station device to the first base station device and the second base station device when an amount of the transmission data is larger than or equal to a threshold, and
transmit the transmission data not to the second base station device but to the first base station device when the amount of the transmission data is smaller than the threshold, and
the second base station is configured to:
at a time when the second base station device is set to communicate with the communication terminal device with radio resources that are periodically allocated, change the threshold so that the communication terminal device transmits the transmission data to the first base station device and the second base station device, and
notify the communication terminal of the changed threshold.

3. A communication system comprising:
a first base station device,
a second base station device, and
a communication terminal device capable of radio communication with the first base station device and the second base station device, wherein
the communication terminal device is configured to communicate with the first base station device via a first path for direct communication with the first base station device and via a second path for communication with the first base station device through the second base station device,
the communication terminal device is configured to:
transmit transmission data addressed to the first base station device to the first base station device and the second base station device when an amount of the transmission data exceeds a threshold, and
transmit the transmission data not to the second base station device but to the first base station device when the amount of the transmission data is smaller than or equal to the threshold,
the communication terminal device is configured to, at a time when the second base station device is set to communicate with the communication terminal device with radio resources that are periodically allocated and the amount of the transmission data is smaller than or equal to the threshold:
transmit the transmission data to the first base station device, and
transmit an end signal to the second base station device, and
the end signal represents an end of the communication with the communication terminal device with the radio resources that are periodically allocated.

4. The communication system according to claim 3, wherein the communication terminal device is configured to stop releasing the radio resources that are periodically allocated upon receipt of release stop information indicating stopping release of the radio resources that are periodically allocated.

5. The communication system according to claim 4, wherein the communication terminal device is configured to resume the releasing the radio resources that are periodically allocated upon receipt of release resuming information indicating resuming the release of the radio resources that are periodically allocated.

6. A communication system comprising:
a first base station device,
a second base station device, and
a communication terminal device capable of radio communication with the first base station device and the second base station device, wherein the communication terminal device is configured to communicate with the first base station device via a first path for direct communication with the first base station device and via a second path for communication with the first base station device through the second base station device, the communication terminal device is configured to:
    transmit transmission data addressed to the first base station device to the first base station device and the second base station device when an amount of the transmission data is larger than or equal to a threshold, and
    transmit the transmission data not to the second base station device but to the first base station device when the amount of the transmission data is smaller than the threshold, the communication terminal device is configured to, at a time when the second base station device is set to communicate with the communication terminal device with radio resources that are periodically allocated and the amount of the transmission data is smaller than the threshold:
    transmit the transmission data to the first base station device, and
    transmit an end signal to the second base station device, and
the end signal represents an end of the communication with the communication terminal device with the radio resources that are periodically allocated.

7. The communication system according to claim 6, wherein the communication terminal device is configured to stop releasing the radio resources that are periodically allocated upon receipt of release stop information indicating stopping release of the radio resources that are periodically allocated.

8. The communication system according to claim 7, wherein the communication terminal device is configured to resume the releasing the radio resources that are periodically allocated upon receipt of release resuming information indicating resuming the release of the radio resources that are periodically allocated.

\* \* \* \* \*